United States Patent [19]
Toda et al.

[11] Patent Number: 5,642,343
[45] Date of Patent: Jun. 24, 1997

[54] MAGNETOOPTIC DISC APPARATUS AND RECORDING MEDIUM

[75] Inventors: Tsuyoshi Toda, Kodaira; Kazuo Shigematsu, Saitama; Seiichi Mita, Kanagawa; Toshimitsu Kaku, Sagamihara; Takeshi Maeda, Kokubunji; Fumiyoshi Kirino, Tokyo; Hiroshi Ide, Kodaira; Atsushi Saito, Ichikawa, all of Japan

[73] Assignee: Hitachi, Ltd., Tokyo, Japan

[21] Appl. No.: 87,777

[22] PCT Filed: Nov. 10, 1992

[86] PCT No.: PCT/JP92/01460

§ 371 Date: Jul. 9, 1993

§ 102(e) Date: Jul. 9, 1993

[87] PCT Pub. No.: WO93/10527

PCT Pub. Date: May 27, 1993

Related U.S. Application Data

[63] Continuation-in-part of Ser. No. 720,706, Jun. 25, 1991, abandoned.

[30] Foreign Application Priority Data

| Jun. 29, 1990 | [JP] | Japan | 2-170052 |
| Nov. 11, 1991 | [JP] | Japan | 3-294145 |
| Feb. 13, 1992 | [JP] | Japan | 4-026508 |
| Feb. 13, 1992 | [JP] | Japan | 4-026509 |
| Feb. 13, 1992 | [JP] | Japan | 4-026511 |
| Apr. 21, 1992 | [JP] | Japan | 4-100897 |

[51] Int. Cl.$^6$ .................................................. G11B 7/00
[52] U.S. Cl. ........................... 369/54; 369/59; 369/116
[58] Field of Search ............................. 369/54, 59, 116, 369/124, 58

[56] References Cited

U.S. PATENT DOCUMENTS

| 4,488,277 | 12/1984 | McFarlane et al. | 369/48 |
| 4,516,235 | 5/1985 | Tarzaiski | 369/116 |
| 4,949,311 | 8/1990 | Barnard | 369/54 |
| 4,989,196 | 1/1991 | Ishikawa et al. | 369/54 |
| 5,070,495 | 12/1991 | Bletscher, Jr. et al. | 369/54 X |
| 5,327,411 | 7/1994 | Iwasa et al. | 369/59 |
| 5,345,434 | 9/1994 | Ide et al. | 369/54 X |

FOREIGN PATENT DOCUMENTS

| 59-203244 | 11/1984 | Japan . |
| 59-223955 | 12/1984 | Japan . |
| 60-40570 | 3/1985 | Japan . |
| 61-74178 | 4/1986 | Japan . |
| 61-90348 | 5/1986 | Japan . |
| 61-239441 | 10/1986 | Japan . |
| 63-48617 | 3/1988 | Japan . |
| 63-244330 | 10/1988 | Japan . |
| 63-304427 | 12/1988 | Japan . |

(List continued on next page.)

OTHER PUBLICATIONS

"Application of Pit Edge Recording on PbTeSe Thin Films", 70th Anniversary National Conference of Institute of Television Engineering of Japan, pp. 4–176.

*Primary Examiner*—W. R. Young
*Attorney, Agent, or Firm*—Fay, Sharpe, Beall, Fagan, Minnich & McKee

[57] ABSTRACT

An optical method for recording, reproducing, and erasing a digital signal of a mark length recording system onto/from an optical recording medium such as an optical disc or the like eliminates a fluctuation of the edge position of the reproduction signal due to heat interference between pits, thereby reducing a fluctuation of the edge position due to a fluctuation of external environmental conditions. For this purpose, there are proposed the following methods: 1) the shape of the recording pulse waveform is controlled, 2) the density at which data is recorded to the disc is variably set in accordance with the disc position, 3) a test recording is executed prior to recording user data, and the like. With these methods, a superhigh density optical recording can be realized.

17 Claims, 35 Drawing Sheets

FOREIGN PATENT DOCUMENTS

| | | |
|---|---|---|
| 2-7232 | 1/1990 | Japan . |
| 2-61834 | 3/1990 | Japan . |
| 2-133819 | 5/1990 | Japan . |
| 2-252141 | 10/1990 | Japan . |
| 3-22223 | 1/1991 | Japan . |
| 3-102656 | 4/1991 | Japan . |
| 4-61028 | 2/1992 | Japan . |

FIG. 3(a)
RECORDING CODE TRAIN 20 
RECORDING PULSE TRAIN 21 
RECORDING AUXILIARY TRAIN 22a 
FIG. 3(b)
LASER POWER  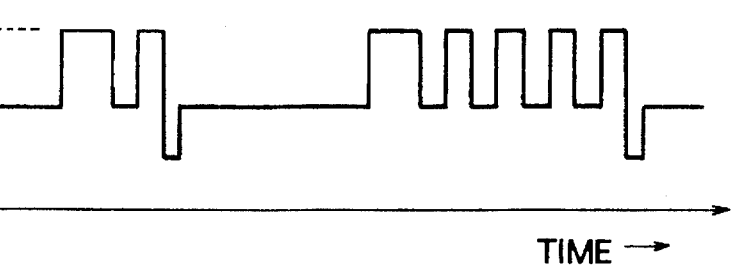
TIME →
FIG. 3(c)
RECORDING MARK 23 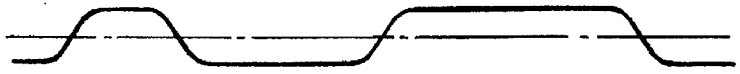
REPRODUCTION SIGNAL 24
REPRODUCTION CODE TRAIN 25 

FIG. 4(a)
RECORDING CODE TRAIN 20 
RECORDING PULSE TRAIN 21 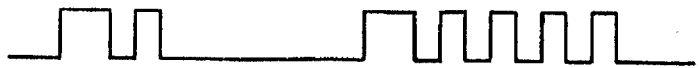
RECORDING AUXILIARY TRAIN 22b 
FIG. 4(b)
↑ LASER POWER
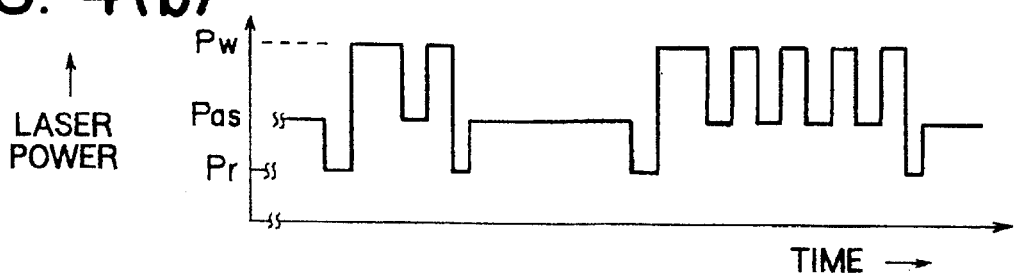
TIME →
FIG. 4(c)
RECORDING MARK 23  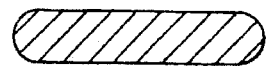
REPRODUCTION SIGNAL 24 
REPRODUCTION CODE TRAIN 25 

$h(a) = R$
$h(d) = Q$
$l(Tw) = P$ $w2 = (R*(1-P)/Q)*w1$ $t2: w1*h(a)$
$t3: w1*h(a)*l(Tw) + w2*h(d)$
$t4: w1*h(a)*l(Tw)^2 + w2*h(d)*(l(Tw)+1)$
$t5: w1*h(a)*l(Tw)^3 + w2*h(d)*(l(Tw)^2 + l(Tw) + 1)$

-----

$t2: w1*R$
$t3: w1*R*P + w2*Q$
$t4: w1*R*P^2 + w2*Q*(P+1)$
$t5: w1*R*P^3 + w2*Q*(P^2 + P + 1)$
$t6: w1*R*P^4 + w2*Q*(P^3 + P^2 + P + 1)$

-----

FIG. 38
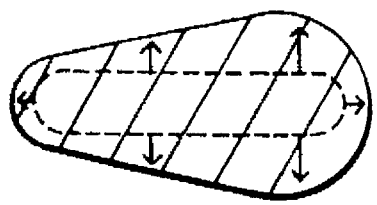
TEAR-SHAPED
MAGNETIC DOMAIN
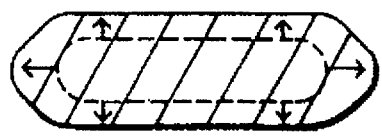
MAGNETIC DOMAIN
OF WIDE SHIFT
AND WIDTH
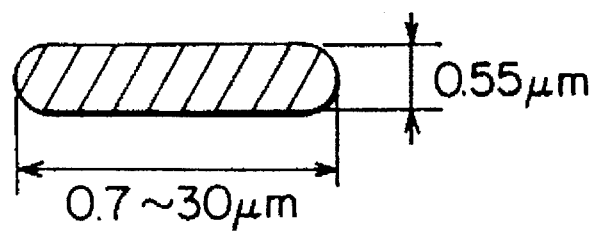
(1.33T ~ 5.33T)
CONTROLLED
MAGNETIC DOMAIN

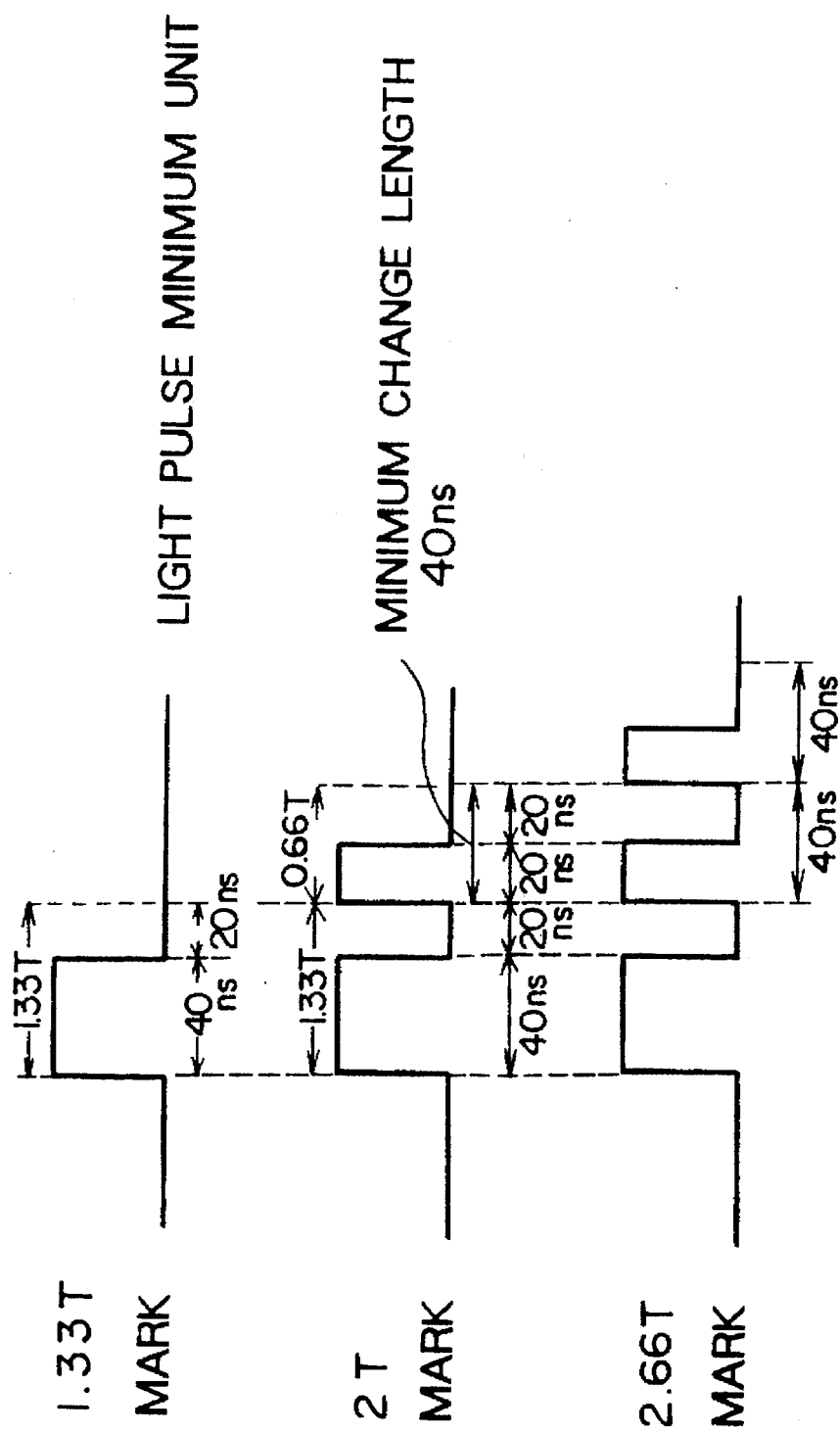

MAGNETOOPTIC DISC APPARATUS AND RECORDING MEDIUM

CROSS REFERENCE TO RELATED APPLICATIONS

This application is a continuation-in-part application of U.S. patent application Ser. No. 07/720,706 filed on Jun. 25, 1991, abandoned.

The contents of the disclosure of the above U.S. patent application are incorporated in the disclosure of the present invention by reference.

TECHNICAL FIELD

The present invention relates to a magnetooptic recording control method which can perform high density optical recording, and also relates to its apparatus.

BACKGROUND ART

In association with the progress of the recent advanced information society, the need for a file memory of large capacity and high density is continually increasing. Attention is paid to optical recording as a means which can satisfy the above need. The memories of the read only type, write-once type, and rewritable type have sequentially been put into practical use and have already been used in applications in which their inherent features can be effectively used. Among them, particularly, the rewritable magnetooptic recording memory has recently been put into practical use.

At present, studies and developments are progressing in many research facilities in order to realize products of mangetooptic recording memories of the next generation. As one of the main studies to realize such products, superhigh density recording can be mentioned. As a method of realizing superhigh density recording, there have been proposed various methods such that a track pitch is reduced, a recording magnetic domain interval is reduced, light of a short wavelength is used, information is recorded in the edge portion of the recording medium magnetic domain, and the like. It is considered to be effective to use a combination of these methods.

An optical disc apparatus is one of the means for recording a digital signal onto a recording medium. According to the optical disc apparatus, a laser beam is converged onto the recording surface by a lens, the intensity of the laser beam is changed in accordance with the information to be recorded, and the reflectance of the region of the recording film to which the laser beam is irradiated or the magnetizing direction in the case of magnetooptic recording is changed by the external magnetization or the like, thereby recording information. In reproducing the recorded information, a laser beam of an intensity which is weaker than the intensity of the recording laser beam is irradiated. A change in light amount is detected from the reflected light from the recording film, or the rotation of the polarization plane due to a difference of the magnetizing direction is detected, thereby reproducing the recorded information. A recording density is mainly determined by the size of the spot of the laser beam which is converged onto the recording surface. Since the spot size is presently as small as about 1 µm, recording of a density which is about ten times as high as that of the magnetic disk can be realized.

On the other hand, a mark length recording method of expressing information at the positions on the front and rear sides of the recording mark, recorded by modulating the irradiation light power, is effective to realize a high recording density because two or more pieces of data are recorded in one recording mark.

In the mark length recording method for recording and/or reproducing information onto/from the optical disc at a high density, various kinds of signal processes are executed upon recording and reproducing of data to realize a highly reliable information.

For example, in general, when the irradiation light power upon recording is small, the shape of the recording mark easily becomes unstable. When the recording linear velocity differs, the heat amount which is applied to a unit area and the heat distribution differ, so that the recording mark shape differs. Therefore, as disclosed in "Application of Pit Edge Recording on PbTbSe Thin Film", The General National Conference of the 70th Anniversary of the founding of The Institute of Television Engineering of Japan, the collection of lectures and papers, page 4 to 176, since a stable recording mark shape is formed and the recording and reproduction are executed, there is executed an adjustment such that the recording irradiation light pulse is slightly largely set and the laser pulse length is set to a short value upon recording so that the mark length is not longer than a target value in accordance with its linear velocity, or the length of the signal pulse after completion of the binarization is reduced upon reproduction, or the like.

The shape of the recorded mark generally depends on the recording sensitivity and heat conductivity of the recording medium, and the intensity distribution, wavefront aberration, or the like of the converged laser beam which is used to record. The characteristics of the recorded mark change when a combination of the disc apparatus and the recording medium changes. Further, the level of irradiation light power upon recording on the apparatus side changes with the elapse of time. Such a phenomenon certainly occurs by a fluctuation amount in a certain range even in the case where a laser power automatic control mechanism (APC) is provided. The recording and reproducing characteristics also fluctuate due to such a factor. Such a fluctuation results in a fluctuation of the recording mark length upon recording and a fluctuation of the pulse interval of the reproduction signal upon reproduction.

Therefore, in the case where the recording correction amount and the recording light power have been preset to predetermined values upon shipping of the apparatus, the set specifications are decided by measuring the recording and reproducing characteristics with respect to a number of combinations of the recording medium and recording apparatus. In this instance, in order to guarantee reliability at the time of detection in all cases, in consideration of a variation range of the recording and reproducing characteristics due to a difference of the combinations, a large allowance is provided with respect to the recording density. As a result, the recording density is sacrificed.

Therefore, in order to absorb the variation amount of the characteristics due to the combination of the recording medium and the recording apparatus and to realize a high recording density, there has been proposed a method whereby a test pattern is previously recorded and information for adjustment of recording conditions is obtained by the reproduction signal. For instance, according to the apparatus disclosed in JP-A-61-239441, the predetermined recording light power level is adjusted. According to the apparatus disclosed in JP-A-61-74178, a predetermined adjustment amount regarding the recording pulse width is adjusted. Further, according to the apparatus disclosed in JP-A-63-304427, the irradiation light power level, the predetermined adjustment amount, and the automatic reproduction equalization coefficient are adjusted in a lump.

Since the optical disc is fundamentally based on the thermal diffusion recording method, there exists a phenomenon (hereinafter called heat interference) such that the recording mark shape changes because of diffusion of the heat distribution due to a plurality of recording pulses before and after the recording mark in correspondence thereto. Such a phenomenon also results in a pulse interval fluctuation of the reproduction signal upon reproduction. Therefore, in order to perform the optimum correction upon recording, it is necessary to also consider the influence by the heat interference. As a countermeasure for such a problem, according to the recording medium disclosed in JP-A-63-48617, the width of each recording pulse is changed in accordance with the interval up to the just-preceding recording pulse.

According to the conventional recording method, as disclosed in JP-A-3-22233, a recording code train of the recording mark is converted into pulses, and a series of pulse trains corresponding to the length of the recording code train is formed and controlled in accordance with the length of the pulse train and the length of the opposite phase of the recording train existing just before the recording code train of the width. The pulse train is divided into three portions, and the pulse width of each pulse is changed, thereby performing the recording.

With respect to the recording density in the radial direction, in case of a write-once film medium, an optical disc apparatus employing a disc whose tracks are divided into zones consisting of a plurality of tracks, wherein information is recorded in the zones so that the same recording linear density is obtained, has already been described in detail in Japanese Patent Application No. 2-133819. However, in such an apparatus, the linear density in each zone on the disc cannot be set to a predetermined value because of the recording and reproducing characteristics of the write-once film. The recording linear density in the zone of the inner rim of the disc is higher than that in the zone of the outer rim.

The above conventional technique pays no consideration to the fluctuation of the recording sensitivity for the recording medium, which occurs due to a fluctuation of the film thickness of the recording medium or a fluctuation of the environmental temperature. There is a problem such that a reduction of the recording capacity occurs because the recording mark cannot be controlled with high precision.

Among the above conventional techniques, the adjusting method in which a recording pulse width is adjusted according to the interval up to the just-preceding recording pulse has the following problems.

That is, in the case where the user wants to realize a high density recording of a degree such that the size of the recording mark shape and the interval between the recording marks are equal to or less than the size of the laser spot converged onto the recording film, the range in which the heat interference of the optical disc exerts an influence is larger than the shortest recording mark length. Namely, in determining the edge position of a certain recording mark, since the heat is diffused, the lengths of a plurality of recording pulse intervals of the recording irradiation light pulses exert an influence, so that even when the recording pulse of the same length is irradiated, the edge position changes due to a combination of the recording patterns which are located at preceding positions with respect to time. Particularly, in the case of a highly sensitive recording medium on which information can be recorded even by a low laser power, heat conductivity is generally large and the range in which heat interference exerts an influence is large.

According to the above recording pulse interval adjusting method, further, a preset adjustment value is used irrespective of the recording conditions at the time of the adjustment. Therefore, an adjustment amount regarding the fluctuation of the recording characteristics cannot be changed; only an adjustment amount corresponding to a deviation amount of the recording characteristics from those at the time of the setting appears as an error in the adjustment, and thus accurate adjustment is not performed.

On the other hand, according to the method of obtaining information for adjustment of the recording conditions, the adjustment is performed on the basis of a unit amount of the recording irradiation light power or the recording pulse width. The fluctuation of the recording mark length due to the heat interference is not reduced.

Hitherto, as a countermeasure for the interference component between codes on the reproducing side, in the field of communication or magnetic recording, a linear equalizer such as a transversal filter or the like is generally used. According to such a linear equalizer, since the frequency band of the signal reproducing system is narrow, edges of the reproduction signal pulse are widened and a linear interference between the codes which overlaps on the waveform near the pulse is reduced.

However, the influence by the heat diffusion mainly appears as a deviation of the time direction of the waveform upon reproduction. Such an influence is a non-linear interference component between codes which cannot be simply expressed as a linear overlap of the fundamental waveform according to the recording information. Therefore, such an edge position fluctuation component cannot be eliminated by the linear equalizer. It is actually very difficult for the reproducing side to cope with such an interference component in a real-time manner.

Even when the conventional method can cope with the fluctuation of the recording characteristics because of the above reasons, the fluctuation of the recording mark length due to the influence by the heat interference cannot be reduced at all, or an adjustment error exists in the fluctuation of the recording mark length due to the influence by the heat interference, and the conventional method cannot cope with the fluctuation of the recording characteristics at all. Particularly, in the magnetooptic mark length recording using a recording medium having a large heat conductivity, the fluctuation components are large. To provide an allowance for such fluctuation components, the recording density cannot help being largely sacrificed.

Further, in order to record information at a high density by using the magnetooptic recording medium, pit edge recording is used wherein information is recorded at both edges of an elliptical domain. Moreover, when recording conventionally as mentioned above, since the medium of the magnetooptic disc has good heat conductivity, the position of the information domain to be recorded next is shifted by being influenced by the heat of the pulse recorded just before the information domain at the inner rim having the slower linear velocity. Consequently, the information cannot accurately be reproduced.

SUMMARY OF THE INVENTION

To realize superhigh density magnetooptic recording, heat flow is controlled and information must be accurately recorded at a desired position and at a desired size, because the magnetooptic disc responds to the temperature with great sensitivity. However, since optical recording is generally performed by thermal recording, the above object must be met with respect to such types of optical recording as phase-change type optical recording, write-once type recording, and the like by which the user can record information, in addition to the magnetooptic recording.

Objects of the present invention, therefore, are as follows.

It is the first object of the invention to provide a recording control method to precisely control the size of the recording magnetic domain, particularly, the magnetic domain length and magnetic domain width, thereby providing a magnetooptic recording control method which is suitable for superhigh density optical recording.

The second object of the invention is to propose a recording and reproducing apparatus for recording information at a high density by using a magnetooptic recording medium. More particularly, it is an object of the invention to provide an effective method of recording to a disc.

The third object of the invention is to maximally suppress a fluctuation of a recording mark due to a fluctuation of the recording sensitivity, and to control the recording mark with high precision.

The fourth object of the invention is to improve the matching between the recording and reproducing apparatus and the recording medium, and to also suppress the fluctuation of the recording sensitivity due to the recording and reproducing apparatus.

The fifth object of the invention is to improve the reliability, memory capacity, and transfer rate of information of the recording and reproducing apparatus.

One of the impediments to realizing the superhigh density of the magnetooptic recording is that the recording magnetic domains which are formed mutually interfere thermally and in an electric signal manner because the interval between tracks and the interval between recording magnetic domains are narrow. Therefore, to realize the superhigh density of the magnetooptic recording, the magnetic domain size must be precisely controlled.

Factors which exert an influence on the size of a magnetic domain include environmental temperature, variations among recording media, fluctuations of laser power, and the like. Upon recording or erasing, these fluctuation factors are detected, feedback is properly performed, and the recording or erasure is executed. Thus, the recording density can be raised without permitting mutual interference among the magnetic domains formed.

Generally, in magnetooptic recording, the data recording region on one disc is divided into a plurality of zones in the radial direction and the track direction. A region for storing information necessary to execute recording control is provided for each zone. By executing at least the recording/reproduction in such a region, the recording conditions are determined.

When user information is recorded, it is recorded so as to equalize the density of data which is recorded in any of the zones divided into a plurality of zones which are obtained by dividing the data recording region on one disc into a plurality of zones in the radial direction and in the track direction. Pit edge recording is most suitable, in which the recording is executed by storing information at the edge portions of the recording domain.

To obtain data which is necessary to execute the recording control, there is considered a method whereby a predetermined pattern is previously stored in a magnetooptic disc driving apparatus, thereby executing the recording/reproduction on the basis of the predetermined pattern. As a region to execute the recording/reproduction as a test, it is desirable in an optical disc such that the data recording region on one disc is divided into a plurality of zones in the radial direction and in the track direction, one track in at least one sector or the whole circumferential portion of one track is used every zone as a test track to obtain various data to execute the recording control.

To obtain information information for controlling the recording, it is sufficient to obtain at least one kind of information selected from a group of the magnetic width and magnetic length of the recording magnetic domain formed and the interval between the magnetic domain. On the basis of this information, the user data is recorded by controlling the laser power upon recording, the width of the recording pulse, or the waveform of the recording pulse.

As an interval to obtain the data for the recording control, it is sufficient that at least at the time of activation of the magnetooptic recording disc drive and at the time of insertion of the disc, the data is finely obtained, and in the cases other than the above cases, the control information is coarsely obtained in comparison to that in the foregoing cases. This is because the information which is obtained here is mainly constructed by the information about the change in environmental temperature. In the above information, the information which is obtained when the disc is inserted also includes a sensitivity variation of the disc in addition to the above information. Consequently, the compatibility of the medium can be assured.

The test track is advantageous to eliminate the influences which are exerted on the recording operations by differing recording conditions resulting from a variation in the disc or from heat flow differences across zones in case of executing the recording or erasing at a constant rotational speed, or the like. The test track can be provided at an arbitrary position in one zone so long as it corresponds to the representative portion of the characteristics of each zone. When considering the user efficiency, the first or end portion of each zone or the central portion of the zone is particularly preferable.

The data recording region of one disc is divided into a plurality of zones in the radial direction and the track direction, and one track in at least one sector or the whole circumferential portion of one track is provided as a test track to collect various data to execute the recording control. By executing the recording/erasure as a test in the test track, a change in recording magnetic domain shape due to a change in environmental condition, a variation among the recording media, or the like can be detected. Therefore, by performing the recording on the basis of such information, a recording magnetic domain of the same shape and same size can be always obtained. By using the method of the invention, a micro recording magnetic domain can be formed without being influenced by disturbances, so that stable recording/reproduction can be executed. Thus, superhigh density magnetooptic recording can be realized.

To improve the matching between the recording medium and the apparatus for recording, a trial writing operation is previously executed at a predetermined position of the recording medium, the reproduction signal which is obtained by the trial writing operation being compared with the trial writing data. After a good result is obtained, the recording of the normal information is started.

On the other hand, the input data bit train of the trial writing data and the normal information are set to the code train of the apparatus for recording. A data train to record the code train onto the recording medium is produced. A laser light source is driven to accurately record information on the recording medium. Since the trial writing improves the conformity between the recording medium and the apparatus for recording, the recording mark of the severe conditions among the recording marks to be recorded is previously written to a predetermined position on the recording medium before the normal information is recorded in order to detect a fluctuation of the recording sensitivity for the recording medium or the like due to a fluctuation of the film thickness or the like of the recording medium in association with the exchange of the recording medium, a fluctuation of the environmental temperature, or a change in characteristics of the apparatus for recording. Further, the reproduction signal which is derived from the recorded trial writing data is compared with the trial writing data. To obtain a good result, the light intensity or energy of the recording waveform to be recorded is changed, thereby improving the conformity between the recording medium and the recording apparatus. Due to this feature, since the optimum recording conditions for the recording medium can be always obtained, erroneous recording of information in association with the fluctuation of the recording sensitivity mentioned above is eliminated, and the recording and reproduction can be performed with high reliability.

The recording and reproduction are executed just after the recording of the normal information or at another certain period, and the input data bit train and the output data bit train are compared. When an erroneous operation occurs, by executing the trial writing operation mentioned above, reliable recording and reproduction can be performed.

Further, in order to maximally reduce the trial writing operation which is executed just after the recording of the normal information or at another certain period, the recording pulse train according to the recording mark and the recording auxiliary pulse are generated. Two light intensities or two energy levels for the recording pulse train and recording auxiliary pulse are used, and the temperature of the recording medium is set to an almost predetermined value by using the above two light intensities or two energy levels, thereby controlling the length and width of the recording mark.

Further, in order to accurately judge the recording state by the trial writing, a check is made to see if the recording conditions are good or not in a state in which the improvement of the amplitude, frequency characteristics, or the like of the reproduction signal is not performed.

To accomplish other objects of the invention, the recording pulse train and the recording auxiliary pulses according to the recording mark of the input data bit train of the trial writing data and the normal information are generated, and the information is recorded onto the recording medium by using two light intensities or two energy levels for the recording pulse train and the recording auxiliary pulses.

To accomplish yet other objects, in a recording medium on which information can be overwritten, the light intensities of the recording pulse train and the recording auxiliary pulses are modulated for the recording power and erasing power.

To further accomplish objects of the invention, just after the input data bit train of the normal information has been recorded, it is reproduced and the input data bit train and the output data bit train are compared.

A trial writing operation is previously performed at a predetermined position of the recording medium. The reproduction signal which is obtained by the trial writing is compared with the trial writing data. Then, the recording of the normal information is started after a good result has been obtained. In this case, the input data bit train of the trial writing data and the normal information are set to the code train of the apparatus for recording, and a data train to record the code train onto the recording medium is produced. Further, in a recording waveform to form a recording region on the recording medium by driving the laser light source, the light intensities or energy levels for the recording pulse train and the recording auxiliary pulses according to the recording mark are controlled.

In an apparatus by which information is recorded and reproduced in a form which can be optically discriminated onto a disc-like recording medium by concentrically forming tracks, the tracks on the disc are divided into zones consisting of a plurality of tracks, the information is recorded so as to equalize the recording linear density in the zones, and at the inner rim of the disc, the recording linear density in the zone is set to be lower than the linear density in the zone of the outer rim.

The linear density can be reduced on the inner rim side, and even when there is heat interference, the information can be accurately read. On the other hand, since the contribution of the track on the inner rim to the memory capacity of the whole disc is not very large, even when the linear density is decreased on the inner rim side, high density can be efficiently realized without significantly reducing the capacity per disc.

According to the invention, the fluctuation of the edge position of the recording mark due to the head interference is adjusted by time-shifting every edge to the front side or back side in accordance with a combination of a plurality of recording pulses located before the recording pulse. The recording is executed by the laser in accordance with the adjusted recording pulse signal, and a predetermined recording signal is recorded and reproduced at predetermined time intervals. The light beam intensity upon recording and the fluctuation of the environmental temperature are detected from the result of the recording and reproduction. In accordance with the result of the detection, the light beam intensity upon recording and an adjustment amount at each edge position are changed. Due to this, high precision recording, without a fluctuation of the recording mark length, is executed under any recording condition. Thus, more accurate edge position control of the recording mark for the high density recording by the mark length recording can be realized.

The fluctuation of the edge position of the recording mark due to the heat interference is adjusted by time-shifting every edge to the front side or back side in accordance with a combination of a plurality of recording pulses just before the recording mark. The recording is performed by the laser in accordance with the adjusted recording pulse signal, so that a variation of the recording mark lengths can be absorbed.

On the other hand, because the recording linear velocity differs depending on the recording radius, a plurality of kinds of adjustment amount tables are prepared in accordance with the recording linear velocity. By using the adjustment amount table corresponding to the linear velocity upon recording, the recording pulse can be accurately adjusted at any position on the recording medium.

When the apparatus is started and the recording medium is exchanged, and at predetermined time intervals, the recording and reproduction are executed by using a predetermined recording signal. The duty factor ratio between the pulse length corresponding to the recording mark of the reproduction signal and the gap length corresponding to the portion other than the recording mark is detected. The light beam intensity upon recording and a deviation from a set value of the temperature of the recording medium are extracted from the duty information. In accordance with the result of the extraction, in the case where the light beam intensity upon recording deviates from the set value, the light beam intensity upon recording is changed so long as the recording pulse can be adjusted by changing the content of the adjustment table or the light beam intensity upon recording. Even when the recording conditions change with the elapse of time, the recording pulse can be accurately adjusted.

More accurate edge position control of the recording mark in the high density recording by the mark length recording can be executed as mentioned above.

The present invention thus proposes a method for stably forming (recording) a micro magnetic domain without heat interference or the like in association with the realization of high density magnetooptic recording. As a method for the above purpose, there have been proposed 1) a method by the waveform of the recording pulse, 2) a method of recording onto a disc, and 3) a method whereby a test recording is executed and the recording control information is obtained by using the result of the test recording. As a magnetooptic disc apparatus, the recording capacity can be increased by using at least one of the above methods. By using a combination of a plurality of methods, even higher density recording can be performed.

On the basis of the above studies, typically as shown in FIG. 1, according to the present invention, there is provided an optical disc apparatus comprising: a light source 8 for irradiating a light beam to an optical disc 1; an encoder 4 to convert an information signal to be recorded into a code train; light source driving means 7 for modulating the light beam in accordance with the code train, for irradiating the light beam as a light pulse train to the optical disc, and for recording the code train as a recording mark by at least one of its heat function and heat interference; a detector 9 for photoelectrically converting the light from the optical disc, thereby obtaining an electric signal waveform; waveform processing means 11 for waveform processing an electric signal waveform; pulse forming means 13 for setting a signal from the waveform processing means to a pulse signal; a discriminator 15 to detect the code train recorded on the optical disc from the pulse signal; a decoder 17 to decode the code train from the discriminator into the information signal; trial writing means 3 for modulating the light beam by a special test signal and forming a test pattern onto the optical disc; means 16 for reproducing the test pattern and comparing with a test signal; and control means 6 for controlling the modulation of the light beam on the basis of the result of the comparison, and for controlling at least the power level, pulse width, and pulse interval of the pulses constituting the light pulse train.

The control of the power level can be realized by selecting the pulse width or pulse interval from predetermined values.

The comparison result reflects at least one element which is selected from the width, length, and mark interval of the recording mark.

It is desirable to record the test pattern from the rewriting means 3 after it has been encoded by the encoder 4 in a manner similar to the data.

It is more desirable to have a change-over switch 12 for supplying the electric signal waveform to the pulse forming means 13 without passing through the waveform processing means 11, and to evaluate the reproduction signal of the test pattern without passing through the waveform processing means.

The light pulse train of one unit forming one recording mark is constructed by, for instance, a head pulse and a subsequent pulse train whose time width differs from that of the head pulse. The control becomes easy so long as at least one of the time width and the time interval of the pulses is equal.

According to a preferred embodiment of the present invention, the light pulse train of one unit forming one of the recording marks has pulses of a power level which is equal to or higher than $P_w$. The light pulse train which does not form the recording marks has a power level which is equal to or less than $P_{as}$. At least one of the front side and the back side of the light pulse train forming the recording mark has a power level which is equal to or less than Pr.

However, the following relations hold:

$P_w > P_{as} > P_r$

Further, the light pulse train of one unit forming one of the recording marks can also be constructed so as to have pulses of two or more power levels. The light pulse train of one unit forming one of the recording marks can also be constructed in a manner such that the power level of the head pulse differs from the power level of the subsequent pulses.

The control means controls the number of pulses of the light pulse train of one unit forming one of the recording marks or changes at least one of $P_w$, $P_{as}$, and $P_r$.

The control means can also control the edge position of the pulses constituting the light pulse train on the basis of at least one of the combinations of the temperature of the optical disc, recording linear velocity to the optical disc, and recording mark based on the information signal to be recorded. It is also possible to construct a table to store information to control the edge position.

The optical disc is divided into a plurality of zones whose recording conditions differ, for instance, in the radial direction, and it is desirable to have a region in every zone to record the test pattern.

The optical disc is divided into a plurality of zones in the radial direction, and it is desirable to construct the zones in a manner such that, in the same zone, the linear recording density is equal, and the linear recording density of the innermost rim of the optical disc is minimized. To equalize the linear recording density, it is preferable to perform the recording by using the light pulse train such that at least one of the pulse width and the pulse interval is changed every zone or in accordance with the radial position of the disc.

In order to control at least one of the pulse width and the pulse interval of the pulses constituting the light pulse train, it is suitable to use a recording clock and to set it to a value which is an integer fraction of or which is an integer times as large as the width of the detection window that is formed by the recording clock.

As for the light source driving means 7, a plurality of unit drive circuits each comprising switching means and a current source that is serially connected with the switching means are arranged in parallel, one constant current source is serially arranged with each unit drive circuit, the light source 8 is connected in series with the constant current source and in parallel with the unit drive circuit, the current source of a plurality of unit drive circuits is constructed so as to supply currents of different values, and the switch means is made operative by a control signal based on the code train, thereby controlling a current value to drive the light source 8. At least one of the current sources of the unit drive circuit can vary the current and can control the light pulse.

It is preferable to use an npn type switching device as the switch means.

According to the present invention, there is further provided an optical information recording and reproducing method whereby an information signal to be recorded is converted into a code train, a light beam is modulated into a light pulse in accordance with the code train, the light pulse train is irradiated to a recording medium, the code train is recorded as a recording mark by at least one of the heat operation and the heat interference of the light pulse train, the light from the recording medium is photoelectrically converted to thereby obtain an electric signal waveform, the electric signal waveform is waveform processed, the signal from the waveform processing means is converted into the pulse signal, the code train recorded on the recording medium is detected from the pulse signal, and the detected code train is decoded into the information signal, wherein the optical information recording and reproducing method is particularly characterized in that the light beam is modulated by a special test signal to thereby form a test pattern onto the recording medium, the test pattern is reproduced and compared with a test signal, and at least one of the power level, pulse width, and pulse interval of the pulses constructing the light pulse train is controlled on the basis of the comparison result.

It is desirable that the test pattern includes the longest length code and the shortest length code.

BRIEF DESCRIPTION OF DRAWINGS

FIGS. 3(a), 3(b), and 3(c) are explanatory concept diagrams of the relation between the recording method and the recording marks according to an embodiment of the invention;

FIGS. 4(a), 4(b), and 4(c) are explanatory concept diagrams of the relation between the recording method and the recording marks according to another embodiment of the invention;

FIG. 38 is a schematic diagram showing a recording magnetic domain shape;

FIG. 40 is a waveform diagram showing the minimum change length.

BEST MODE FOR CARRYING OUT THE INVENTION

Embodiment 1

Figure 1:
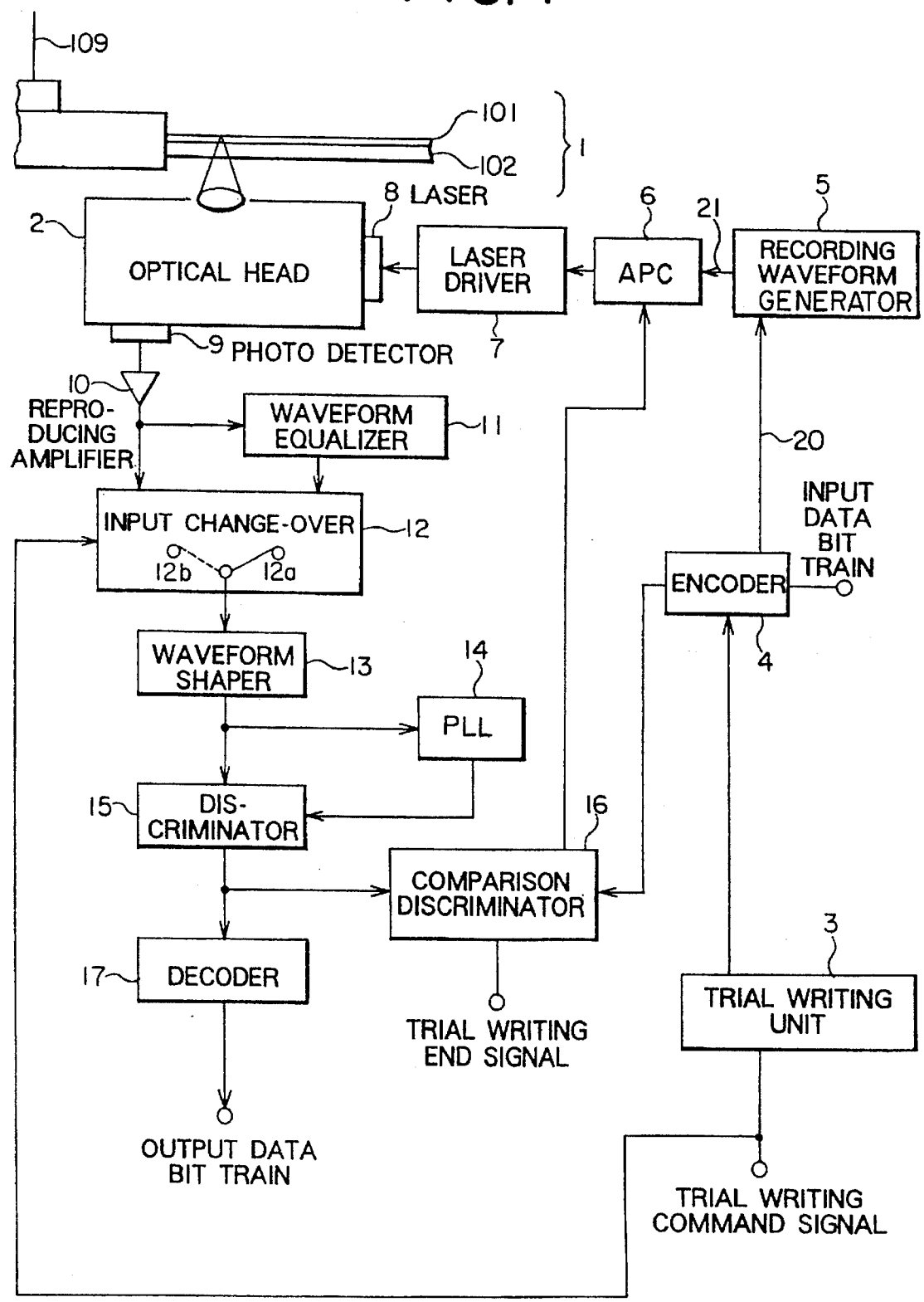
FIG. 1 is an apparatus block diagram for explaining an embodiment of the present invention.

FIG. 1 shows an embodiment of an optical disc apparatus constructed according to the teachings of the present invention. The apparatus includes a recording medium 1 to store information; an optical head 2 to realize the recording and reproduction; and a processing system to convert a reproduction signal derived from the optical head 2 into information. The recording medium 1 is rotated by a motor 109 and is constructed by a recording film 101 and a substrate 102 to support the recording film.

The optical head 2 includes an optical system to converge the light emitted from a laser 8 onto the recording medium 1. When information is recorded, an input data bit train (information) is supplied to an encoder 4, a recording code train which is generated from the encoder 4 is transferred to a recording waveform generator 5, a recording waveform which is obtained by the recording waveform generator 5 is supplied to an APC 6, and light having an intensity corresponding to the recording code train is emitted from the laser 8.

When information is reproduced, the light reflected from the recording medium 1 is transferred to a photodetector 9 by an optical system and converted into an electric signal. The electric signal is supplied to a reproducing amplifier 10 and is sent to a waveform processing circuit 11 such as a waveform equalizer or the like and to an input change-over unit 12. In accordance with a trial writing command signal, the input change-over unit 12 supplies a reproduction signal of either the reproducing amplifier 10 or the waveform equalizer 11 to a waveform shaper 13. The reproduction signal is then converted into a pulse signal indicative of the presence or absence of the signal. The pulse signal is transferred to a discriminator 15 and a PLL 14. A sync signal (a signal synchronized with the fundamental period of the pulse signal) which is outputted from the PLL 14 is supplied to the discriminator 15. The discriminator 15 produces a detection code train from the pulse signal and the sync signal. Then, a data bit train (information) is generated by a decoder 17, and the detection code train of the discriminator 15 is sent to a comparison discriminator 16.

The trial writing operation will now be described. Trial writing data from a trial writing unit 3 which is made operative by the trial writing command is supplied to the encoder 4 and converted into a recording code train. The recording code train of the trial writing data is transmitted through a path similar to that of the recording information and is recorded onto the recording medium 1. In the evaluation of the trial writing data, the input change-over switch 12 which is made operative by the trial writing command signal is switched so as to transfer the output of the reproducing amplifier 10 to the shaper 13. The recording code train from the encoder 4 is compared with the reproduction code train from the discriminator, which generates a control signal to control the APC 6 to control a laser driver 7 to drive the laser 8 so as to eliminate a difference of the reproduction code trains from the recording code train. As a result of such a control, after the difference of the reproduction code trains from the recording train has been decreased to a certain degree and lies within an allowable range, a trial writing end signal is outputted and the trial writing is finished.

After the trial writing end signal has been outputted, the input change-over switch 12 is switched so as to transfer the output of the waveform equalizer 11 to the shaper 13, thereby starting the normal recording and reproducing operation. After the normal recording operation has begun, a check is also made to see if the difference of the reproduction code trains from the recording code trains lies within an allowable range or not. When such a difference cannot be permitted, the foregoing trial writing operation is started. After the trial writing end signal has been generated, the normal recording operation is again continued. The difference between the reproduction code trains and the recording code train can be more accurately detected in the comparison discriminator 16 by setting the input change-over switch 12 to allow the signal of the reproducing amplifier 10 to be generated. In the above operation, however a similar operation can be realized even if the input changeover switch 12 is not used. To accurately detect the difference of the reproduction code train from the recording code train by the comparison discriminator 16, though it is better to use the signal which does not pass through the waveform equalizer 11.

Figure 2:
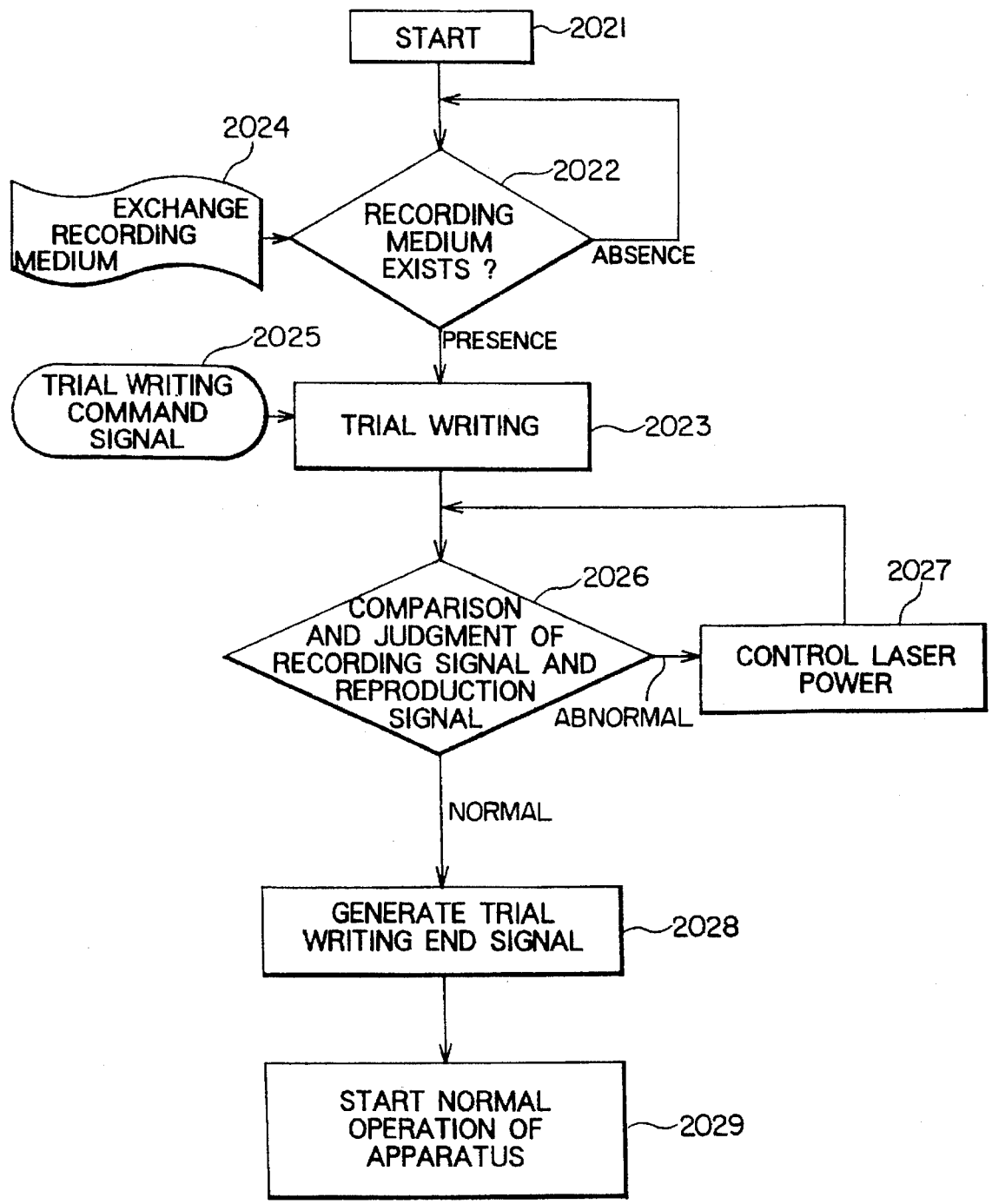
FIG. 2 is a flowchart for explaining the operation of the embodiment shown in FIG. 1.

An example of the operation of the apparatus of the present invention will now be described with reference to FIG. 2. By turning on a power source or the like of the apparatus, the apparatus is activated (2021). First, a check is made to see if the recording medium has been set into the apparatus or not (2022). When there is no recording medium, the apparatus is set to a standby mode.

When the recording medium is set into the apparatus (2024), the trial writing operation is executed to check the conformity between the set recording medium and the apparatus (2025, 2023). As for the trial writing, a recording power, a recording pulse, or the like is controlled so as to reduce, as much as possible, fluctuation of the recording mark which occurs due to fluctuation of the recording sensitivity for the recording medium due to a film thickness fluctuation of the recording medium or an environmental temperature fluctuation. Further, the fluctuation of the apparatus for recording is reduced, the recording signal and the reproduction signal are compared and judged, (2026) the difference between the recording signal and the reproduction signal is suppressed to a range in which the apparatus normally operates, and the trial writing end signal is outputted (2028), thereby starting the normal operation (recording/reproduction of information) of the apparatus (2029).

When the difference between the recording signal and the reproduction signal is large, in step 2026 the laser power is controlled (2027). The trial writing operation is again executed until the apparatus normally operates. When the recording medium is exchanged (2024) as well, the above trial writing operation is executed. Further, when the apparatus normally operates, by comparing the recording signal and the reproduction signal, a highly accurate recording mark can be always recorded.

FIG. 3 explains the relation between an embodiment of a recording method of the invention and the recording mark. FIG. 3(a) shows a recording pulse to control the laser power. An output from the encoder 4, which has been shown in FIG. 1, is a recording code train 20. The recording code train 20 corresponds to a recording mark which is recorded onto the medium. A recording pulse train 20 is generated in a pulse portion of the recording code train 20 by the recording waveform generator 5. For instance, as shown in FIG. 40, as for the recording pulse train 21, the length of the head pulse differs from the lengths of the second and subsequent pulses. The pulse lengths of the second and subsequent pulse trains are set so that at least one pulse corresponds to the minimum change length (the minimum change of the length of the optical pulse when marks of a plurality of kinds of lengths are formed) of the recording mark. Further, the recording pulse train 21 is constructed such that it is possible to almost ignore an influence on a portion near the final trailing position of the pulse of the recording mark from another pulse or a recording pulse train such that a predetermined heat flows in. A recording auxiliary pulse 22a is generated in a gap portion (rest period portion other than the pulse portion) of the recording code train 20. The recording auxiliary pulse 22a is set such that the heat from the final trailing position of the recording pulse train exerts no influence on the temperature at the heat leading position of the next recording pulse train by providing a gap portion in which the laser power is reduced for a certain period of time from a position near the trailing position of the recording code train 20.

FIG. 3(b) shows a change in laser power according to the recording code train in the case where the laser 1 is driven by using the recording pulse train 21 and the recording auxiliary pulse 22a, in which the axis of abscissa indicates the time and the axis of ordinate shows the laser power. The lowest level of the laser power indicates a reproducing power $P_r$ applied upon reproduction. The highest level of the laser power indicates a recording power $P_w$ of the recording pulse train 21. The intermediate level indicates a recording power $P_{as}$ of the recording auxiliary pulse 22a. As shown in FIG. 3(c), the length and width of a recording mark 23 are controlled on the recording medium with high precision. Since the temperature on the recording medium is held constant, the width of the recording mark 23 is controlled within a predetermined range, so that the amplitude of a reproduction signal 24 becomes constant. A reproduction code train 25 is produced by detecting the center of the reproduction signal 24 or by judging by using a threshold value of a certain level.

In the comparison discriminator 16, the lengths of the pulse portions of the recording code train 20 in FIG. 3(a) and the reproduction code train 25 of FIG. 3(c), and the intervals of the pulse leading positions or trailing positions or the like, are compared and evaluated. For instance, in the case where the recording power is too large, the pulse length of the reproduction code train 25 is longer than the pulse length of the recording code train 20. When the recording power is small, on the contrary, the pulse length of the reproduction code train 25 is shorter than the pulse length of the recording code train 20.

Figure 5:
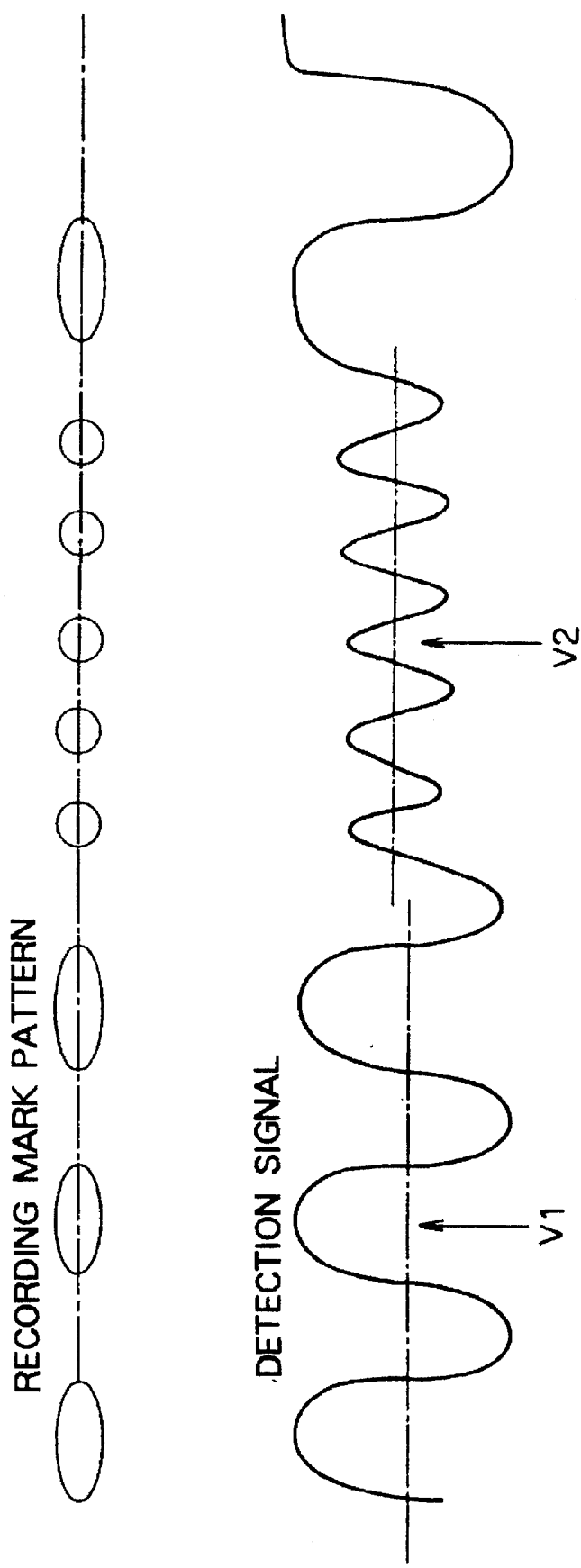
FIG. 5 is an explanatory diagram of a recording pattern of the trial writing of the invention.

A detecting method has already been described in detail in "Digital Signal Recording and Reproducing Apparatus", JP-A-4-61028, filed by two of the present inventors. A new method whereby the scale of a circuit for detection is not so large is further proposed here. As a recording pattern which is used as a test pattern, for example, the shortest recording mark and the longest recording mark which are determined from a recording modulation code as shown in FIG. 5 are alternately recorded. By using 1–7 modulation as a modulating method, lengths corresponding to 1.33T and 5.33T are preferable, in which a bit period assumes T.

Now, assuming that the bit density is set to 0.56 μm/bit, a wavelength of the laser used is set to 780 nm, and the NA of the lens is set to 0.55, the length of the shortest mark is equal to 0.75 μm. The subsequent reproduction waveforms do not include harmonic components and are constructed by only the fundamental waves in consideration of the resolution of the optical system. Generally, the reproduction waveform is influenced by both of the length and width of the mark because the shortest mark is smaller than the diameter of the reproduction spot.

On the other hand, the signal amplitude of the reproduction waveform of the longest mark is determined by only the influence by the width. The interval between the leading and trailing edges of the signal corresponds to the length of mark. By using the recording waveform according to the present invention shown in FIG. 3, the width of the longest recording mark can be almost equalized with the width of the shortest recording mark. Therefore, the difference between the reproduction waveforms of the shortest mark and the longest mark can be regarded as the difference of the lengths.

When a method of direct slicing is used as a binarizing method, whereby mark length recording (in which) information is stored in both edges of the mark) is executed and the information is converted into data pulses, it is necessary to accurately decide the slice level. It is well known that when the widths of marks are equal and the shortest mark length is longer than half of the light spot diameter, such a slice level is preferably set to the half value of the amplitude level of the longest mark length. That is, when the mark length is longer than half of the light spot diameter, so long as the light spot is located at the mark edge, the reproduction signal from the mark edge is not influenced by the edge of the adjacent mark. Therefore, the cross point with the reproduction waveform when slicing by the half value of the amplitude that is decided by the longest mark length corresponds to the edge of the mark.

From the above discussion, in order to detect the mark length from the signal waveform which has been trial written, one can see that it is first necessary to set a reference slice level. For this purpose, the reference level is obtained from the reproduction waveform of the repetitive pattern of the longest mark. As such a method, there is known a method whereby in order to obtain the half value of the amplitude of the longest mark, signals indicative of the upper envelope and lower envelope of the reproduction signal from the mark are formed by an envelope detecting circuit and a mean value of them is obtained and is set to a reference level (JP-A-59-203244).

Figure 6:
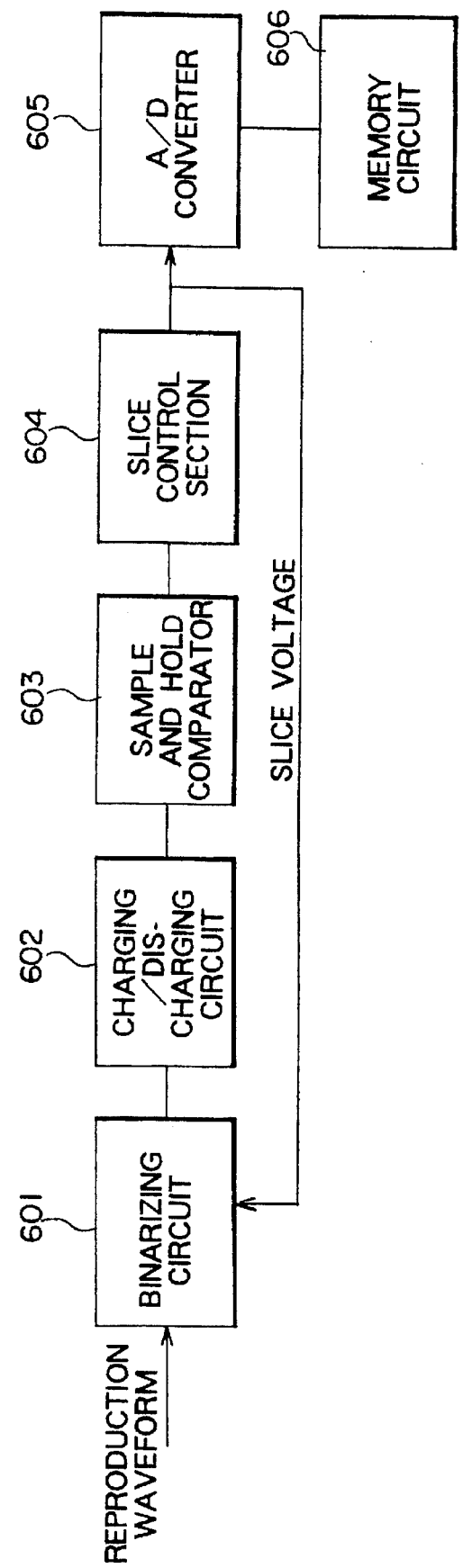
FIG. 6 is a control signal detecting circuit block diagram of the trial writing of the invention.

Another method of setting the slice level will now be shown below. The repetitive pattern of the longest mark is recorded so that the mark length is equal to the length of the mark gap. However, even when the recording conditions are deviated and a balance of the mark length and the mark gap length is slightly deviated, in case of the repetitive pattern of the longest mark, the mean value is almost equal to the value obtained by the foregoing method. As a method of obtaining such a value, a circuit as shown in FIG. 6 is used.

The reproduction waveform is binarized on the basis of the variable slice level by a binarizing circuit 601, thereby forming a pulse. In a charging/discharging circuit 602, an integrating circuit is activated by the leading edge of the pulse and the charging operation is performed. The charges are discharged by the trailing edge.

Then, a sample and hold comparator 603 samples and holds a value of an integrator at the leading timing of the next pulse. A slice control section 604 executes feedback control to the binarizing circuit 601 so as to change the slice level so that the sampled and held value is equal to zero. At a time point when the slice level is decided, the slice level is analog-to-digital converted by an A/D converter 605. The digital signal is sent and stored into a memory circuit 606. The above operation is similarly executed with respect to the shortest mark and the longest mark and obtained values are set to $V_1$ and $V_2$, respectively. The recording conditions are changed so that the difference between them is equal to 0.

Embodiment 2

FIG. 4 shows another embodiment of the recording method according to the present invention. As in FIG. 1, the recording pulse train 21 is generated in the pulse portion of the recording code train 20 by the recording waveform generator 5. The recording pulse train 21 is constructed such that the length of the head pulse and the lengths of the second and subsequent pulses differ, and the pulse lengths of the second and subsequent pulse trains are set so that at least one pulse corresponds to the minimum change length of the recording mark. As a result, influence by the heat from another pulse train on a portion near the final trailing position can be almost ignored for a recording pulse train such that a predetermined amount of heat inflows.

In FIG. 4(a), a recording auxiliary pulse 22b is generated in a gap portion (rest period portion other than the pulse portion, and which corresponds to the interval of the recording mark) of the recording code train 20. By providing a portion of the recording auxiliary pulse 22b such that the laser power is reduced in a period of time before the leading position of the recording code train 20 and for a predetermined period of time from the trailing position of the recording code train 20, the heat from the final trailing position of the recording pulse train hardly changes the temperature at the heat leading position of the next recording pulse train.

FIG. 4(b) shows a change in laser power according to the recording code train in case of driving the laser 1 by using the recording pulse train 21 and the recording auxiliary pulse 22b, in which the axis of abscissa indicates the time and the axis of ordinate shows the laser power. The lowest level of the laser power indicates the reproducing power $P_r$ upon reproduction. The high level upon recording indicates the recording power $P_w$ of the recording pulse train 21. The low level upon recording indicates the recording power $P_{as}$ of the recording auxiliary pulse 22b. The length and width of the recording mark 23 are controlled with high precision on the recording medium by using a recording waveform as shown in the graph. On the other hand, since the temperature on the recording medium is held constant, the change in width of the recording mark 23 is controlled within a predetermined range, so that the amplitude of the recording portion of the reproduction signal 24 is almost constant. By judging on the basis of the center or a certain level of the reproduction signal 24, the reproduction code train 25 is generated.

A temperature component on the disk surface which is controlled by the above recording waveform will now be considered. The highest arrival temperature reached by the recording pulse is set to $T_{max}$, and the temperature increase due to the reproduction laser power is set to $KP_r$ by using a special coefficient K. The environmental temperature of the apparatus is set to $T_r$. The temperature increase by the recording laser power is expressed by $K'(P_w - P_{as})$ by using a specific coefficient K'. Further, a function which expresses a decrease ratio of the temperature after completion of the irradiation of the recording pulse for a time t is set to f(t). A function which expresses a ratio at which the temperature rises after the auxiliary pulse has been irradiated is set to g(t). The origin of the time t is set to an end time point of the recording pulse. A temperature T(t) can thus be expressed as follows.

$$(T_{max} - T_r - KP_r)f(t) + T_r + KP_r + K(P_{as} - P_r)g(t) = T(t) \quad \text{equation 1}$$

Now, assuming that the detection window width by the 1-7 modulation is set to $T_w$, both the shortest mark length and the shortest gap are equal to $2T_w$. The most severe condition when considering the heat balance mentioned above relates to the case where the mark gap is shortest. Therefore, the shortest time until the next mark portion starts after the mark gap finishes relates to the case where t is equal to $2T_w$. The longest time is equal to $8T_w$. To set conditions such that the heat when the previous mark was recorded does not exert an influence irrespective of the pattern of the next mark, it is desirable for T(t) to have a predetermined value C within a range from $2T_w$ to $8T_w$. Moreover, to set conditions such that the widths of all of the marks are equal, it is necessary that the predetermined value C be the highest arrival temperature resulting from a temperature increase $K'X(P_w-P_{as})$ being added by the recording pulse of the next mark, which coincides with the highest arrival temperature $T_{max}$ which is reached by the previous mark. As a predetermined value C, a temperature which is finally reached, such that the heat is obtained at least within a range from $2T_w$ to $8T_w$, is necessary to prevent the previous mark from exerting an influence on the subsequent mark. Such a temperature is obtained in the equation (1) as a limit of the equation (2).

$$f(t) \to 0 \quad g(t) \to 1 \quad \text{equation 2}$$

Eventually, C is obtained as follows.

$$\begin{aligned} C &= T_{max} - K(P_w - P_{as}) \\ &= T_r + KP_r + K(P_{as} - P_r) \end{aligned} \quad \text{equation 3}$$

Now, assuming that a difference between T(t) and C is set to E(t).

$$E(2T_w) = K'(P_w - P_{as})f(2T_w) - \\ (1 - f(2T_w) - g(2T_w)) \times K(P_{as} - P_r) \quad \text{equation 4}$$

To determine the flow of heat, the output change of the heat source is considered. Therefore, when it is assumed that a power change of the recording pulse is set to $P_w'$ and a power change of the recording auxiliary pulse is set to $P_{as}'$, the equation (4) can be rewritten as follows.

$$P_w' = P_w - P_{as}$$
$$P_{as}' = P_{as} - P_r \quad \text{equation 5}$$

The equation (4) is consequently obtained as follows.

$$E(2T_w) = K'P_w'f(2T_w) - (1 - f(2T_w) - g(2T_2))KP_{as}' \quad \text{equation 6}$$

In the above equation, the first term of the right side denotes the influence by the recording pulse of the previous mark and the second term denotes the influence by the recording auxiliary pulse. By shutting off the recording auxiliary pulse, the coefficient of the second term is controlled. When the recording auxiliary pulse is not shut off, however, the second term is fixed equal to zero and the influence by the recording pulse cannot be eliminated in principle. It will be understood from the equation (6) that in order to eliminate the influence by the recording pulse of the previous mark, $E(2T_w)$ must exist in a temperature error such that it hardly influences on the shift of the mark edge. To satisfy the above condition, a combination of $P_w'$, $P_{as}'$, $f(2T_w)$, and $g(2T_w)$ must be considered. On the other hand, a combination of $P_w'$ and $P_{as}'$ is determined from another viewpoint. From the equation (3) showing the relations in the stationary state among the recording auxiliary pulse, the recording pulse, and the environmental temperature, the following equation (7) is obtained.

$$T_{max} = T_r + KP_r + KP_{as}' + K'P_w' \quad \text{equation 7}$$

As for $T_{max}$; when the spot shape, the linear velocity, and the heat conductivity characteristics of the medium are determined, the width of the mark is decided. Further, when the foregoing recording pulse waveform is determined, the mark length is decided. Therefore, $T_{max}$ must be suppressed to a constant value to control the width and length of the mark to predetermined values. That is, the right side of the equation (7) must be constant. When the environmental temperature and the reproducing power are determined, the sum of $P_w'$ and $P_{as}'$ must be constant. Factors to decide K are the spot shape, linear velocity, and heat conductivity characteristics of the medium. Factors to decide K' are the same as these, and a recording pulse waveform.

From the equation (6), to reduce the error, since the functions f(t) and g(t) are functions showing ratios of decrease and increase of the temperature, they have only values within a range from 1 to 0. In consideration of the above fact, it is convenient that $KP_{as}'$ and $K'P_w'$ are almost equal because the allowable widths for f(t) and g(t) are widened. The functions f(t) and g(t) are decided by the conductivity characteristics of the heat of the medium. As mentioned above, f(t) is determined by the relation between the linear velocity and the heat conducting speed, while g(t) is decided by the heat capacity of the film and the linear velocity.

It is now assumed that the decrease and increase ratios of the temperature are expressed by exponential functions of the time t and their time constants are set to tau1 and tau2, and the auxiliary light shut-off time is set to $t_0$.

$f(t) = \exp(-t/tau1)$      equation 8
$g(t) = 1 - \exp(-(t - t0)/tau2)$      equation 9
$t \geq t0; \quad g(t) = 0 \quad t < t0$ As will be explained below, it is very convenient that the recording waveform is synchronized with the recording clock in order to realize the circuit. Therefore, the time t is expressed by setting the detection window width $T_w$ of the 1-7 modulation to a unit.

Figure 7:
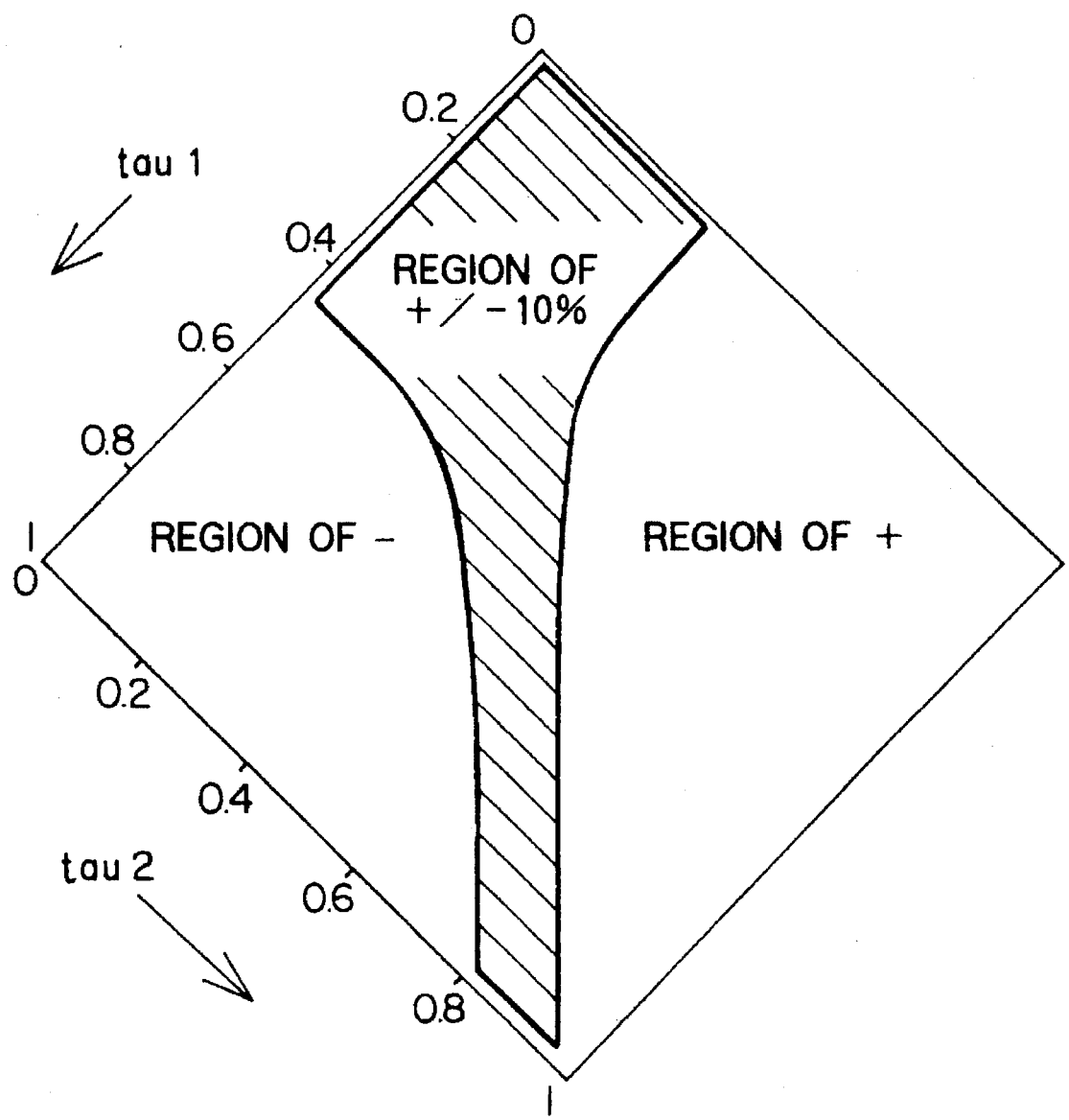
FIG. 7 is an explanatory diagram showing the relation between the heat time constant and the temperature error after the heat is shut off.

Now, it is assumed that $KP_{as}'$ is set to 80 degrees, $K'P_w'$ is set to 100 degrees, the shut-off time is set to $T_w$, and a temperature error to $T(2T_w)$ lies within a range of ±10 degrees. Then, a combination of tau1 and tau2 which satisfies the above conditions is as shown in FIG. 7. These numerical values indicate conditions such that the edge shift lies within 10% of $T_w$ when $T_w$ is equal to 40 nsec and the linear velocity is equal to 9.4 m/sec, when a medium disclosed in JP-A-61-90348 and a magnetooptic recording film are used. The square region shows a region in which a stationary state is soon derived because the attenuation increase ratio is high. The region in which the heat balance is obtained by the shut-off corresponds to the hatched region. In order to reduce the temperature error even when each element of four combinations fluctuates, it is desirable to select the square region as the region. There, when tau1 is set to 0.4 or less, the influence by $K'P_w'$ is remarkably suppressed, so that the allowable ranges for the shut-off time and tau2 are widened. When mark length recording is used as a recording method and MCAV recording is executed, although the absolute time of $T_w$ changes due to the radial position, by previously standardizing the shut-off time and time constants by $T_w$, all of the above results are satisfied.

Embodiment 3

Another embodiment of the recording pulse will now be described. In the above embodiments, in FIGS. 3(a) to 3(c) and 4(a) to 4(c), in order to record the shortest mark of the 1-7 modulation, a combination of the head pulse of the time width $T_w$ and one of the subsequent recording clock pulses is used. As for the recording clock, the clock of period $T_w$ is generally employed, in view of circumstances of the circuit. Actually, when the transfer rate is close to 4 MB/sec, it is difficult to form clocks of a double period. However, when the number of power levels corresponding to the recording pulses is equal to one and the shortest mark is recorded by using such a combination of pulses, and in order to increase the mark length by $T_w$ at every subsequent recording clock pulse, the heat characteristics of the recording medium are limited. When considering the above time constant, such a situation corresponds to the case of a relatively large value.

Figure 8:
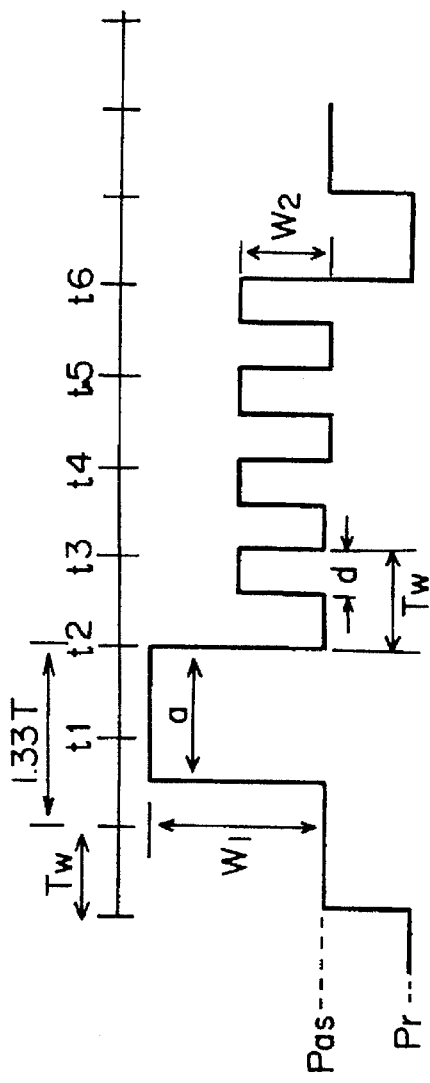
FIG. 8 is a diagram for explaining an embodiment of a recording waveform.

As a waveform which can correspond even in case of the media of various heat characteristics, as shown in FIG. 8, the shortest mark is recorded by a pulse of a recording power change amount $W_1$ of a length a. The shortest mark having a desired width and a length of 1.33T can be recorded by a combination of the recording auxiliary pulse of the level of $P_{as}$ and the above recording pulse. When the subsequent mark is recorded every $T_w$, it is recorded as a recording power change amount $W_2$ by using the foregoing recording clock. To set the width of the mark to a predetermined value irrespective of the mark length, the highest arrival temperature of each recording clock is set to a predetermined value. In FIG. 8, a temperature at each point for a period of time from timing $t_2$ to $t_6$ is obtained.

Figure 9:
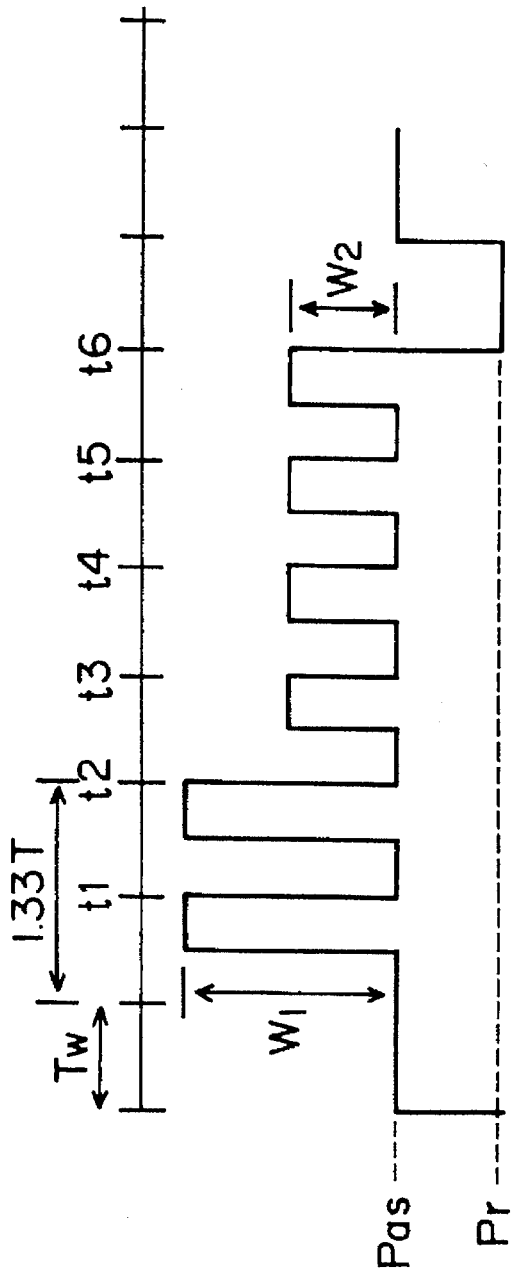
FIG. 9 is a diagram for explaining another embodiment of the recording waveform.

Now, assuming that a function which expresses an increase in heat by the pulse irradiation is set to h(t) and a function which expresses a heat decrease by the pulse stop is set to 1(t), the increase in heat by the recording pulse has the form shown in FIG. 9. For simplicity of explanation, using P, Q, and R, and in consideration of $W_2$ being obtained so as to equalize the temperatures at timings $t_2$ and $t_3$, a relation shown in FIG. 9 is obtained.

$W_2 = R(1-P)W_1/Q$      equation 10

Due to this, the temperatures for the period of time from $t_4$ to $t_6$ are also almost equal.

A pulse width of a is formed from the pulse width of $2T_w$ by using a delay line or the like. By using the power levels of two recording pulses, the highest arrival temperature for each pulse can be equalized. However, as will be obviously understood from the equation (1), the above method has a drawback such that even when one medium is chosen, since there are fluctuations of the recording pulse widths a and d and fluctuations of the recording apparatus such as changes in leading characteristics of the laser drive circuit and the like, Q and R change, so that the temperature at each clock timing differs and cannot be corrected.

However, as shown in FIG. 9, the recording clock is used as it is, the power to record the shortest mark and the power of the subsequent pulse are respectively changed to $W_1$ and $W_2$, and the power $W_1$ to form the shortest mark of the length of 1.33T is obtained by the recording auxiliary pulse at the $P_{as}$ level and two recording clocks. When the arrival temperature for a period of time from timing $t_1$ to $t_5$ is obtained and $W_2$ is obtained from the conditions such that the temperatures at $t_2$ and $t_3$ are equalized, $W_2 = (1-P)W_1$      equation 11

In the above case, when the characteristics of the medium are not changed, the influence by the fluctuation of the recording pulse width and the fluctuations of the recording apparatus, such as changes in leading characteristics of the laser drive circuit and the like, can be eliminated by the trial writing of the present invention because the temperature change at each timing is changed at a uniform rate. That is, since the temperature change is constant irrespective of mark length, it is possible to correct by changing the recording auxiliary pulse. To synchronize with the recording clock in FIG. 8, it is sufficient to set $T_w$ to a. In the above case, when the width and length are matched, it is difficult to control the width.

The relations among the trial writing operation and various kinds of fluctuation factors will now be described by using the equation (7). When the environmental temperature fluctuation changes from $T_{r1}$ to $T_{r2}$, $P_{as}'$ of the auxiliary light is also changed, thereby keeping $T_{max}$ constant. With respect to the film thickness fluctuation of the recording medium and the recording sensitivity fluctuation, the recording temperature changes. However, since it is possible to consider that $T_{max}$ effectively changes from $T_{max1}$ to $T_{max2}$, the $P_{as}'$ of the auxiliary light is changed, thereby compensating for the change. In the recording power fluctuation, although $P_r$ and $P_{as}' P_w'$ change, $T_{max}$ can be also made constant by changing the change $P_{as}'$ of the auxiliary light. For this purpose, $KP_{as}'$ must have a value similar to $K'P_w'$. The recording characteristic fluctuations caused by the recording and reproducing apparatus correspond to the fluctuations of K and K'. However, in those cases as well, $T_{max}$ can be made constant by appropriately changing the $P_{as}'$ of the auxiliary light.

Embodiment 4

Figure 10:
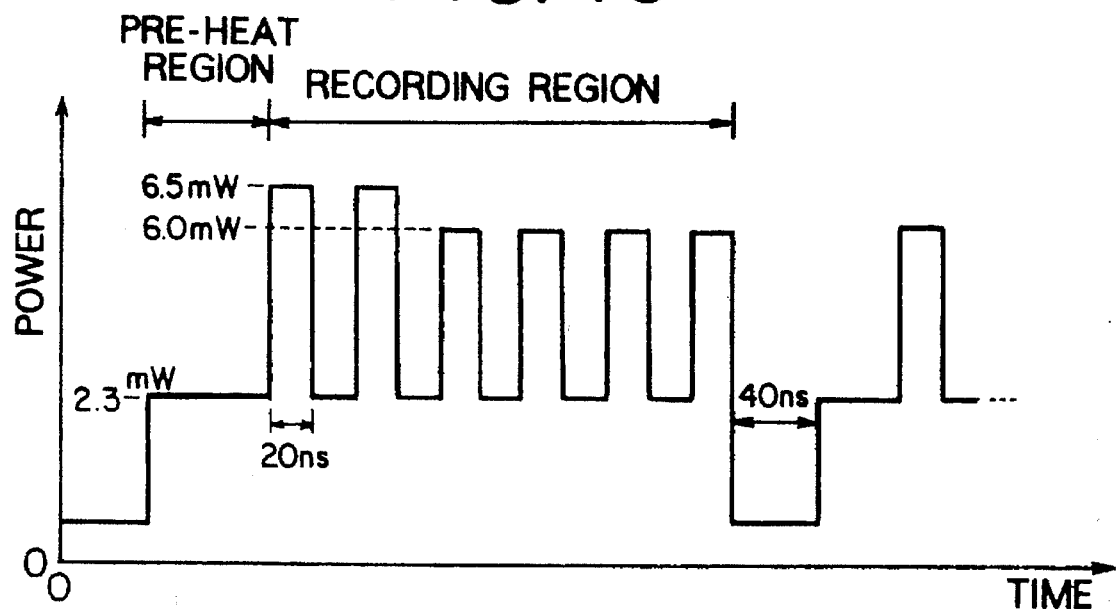
FIG. 10 is a diagram showing a recording signal waveform.

FIG. 10 is a schematic diagram showing a shape of the recording pulse used. The recording powers of the head and second pulses in the recording region are set to 6.5 mW at the innermost rim position of the disc such that the rotational speed of the disc medium is equal to 3000 r.p.m. and the recording powers of the third and subsequent pulses are set to 6 mW. The pre-heating power is set to 2.3 mW and the pulse width and the gap interval are set to 20 nsec. The gap interval is set from the recording clock. Although the disc medium of the embodiment has been shown with respect to the case where the head pulse is set to be high, the head pulse may be low in accordance with the structure of the recording medium.

The recording was performed onto the disc by using the light pulse of FIG. 10. The position of low power between the recording pulses is provided just after the recording pulse, and its period is set to 40 nsec. These values are determined by the structure of the medium of the magnetooptic disc. By deciding the parameters or the like by experimentally recording, compatibility among the media can be assured.

Figure 12:
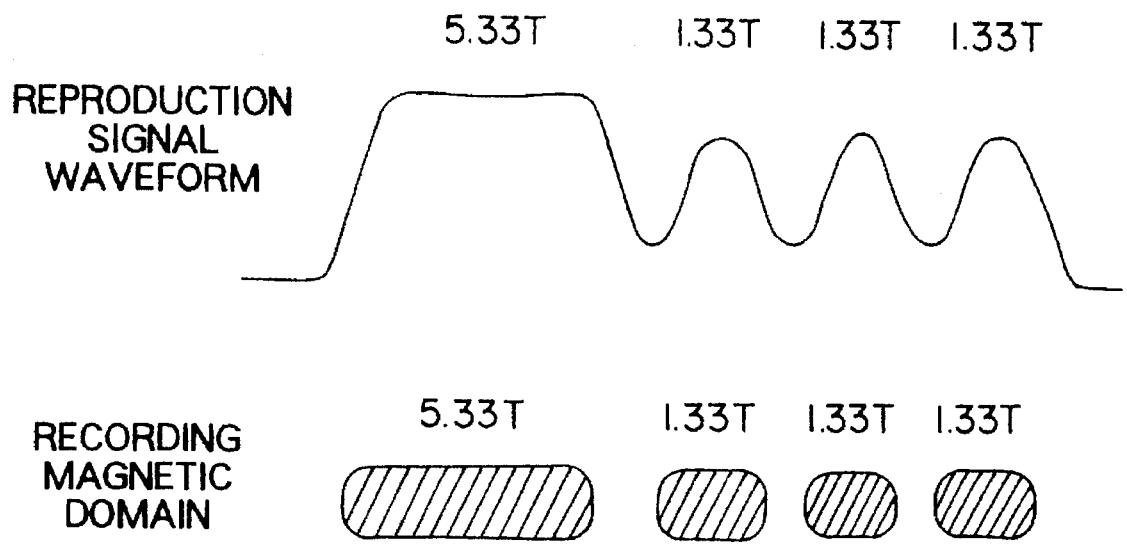
FIG. 12 is a schematic diagram showing a reproduction signal waveform and a recording magnetic domain shape.

FIG. 12 shows a schematic diagram of a reproduction signal waveform and a recording magnetic domain when the shortest mark of 1.33T is recorded after the longest mark of 5.33T by using the (1,7) RLL modulating method. The width of the magnetic domain thus formed is equal to 0.7 μm, the shortest length of the magnetic domain is equal to 0.75 μm, and the longest magnetic domain length is equal to 3.0 μm. It will be understood from the diagram that neither the shortest magnetic domain nor the longest magnetic domain influence each other, the magnetic domain width is constant independently of the length of pattern, and that even in the case where three of the shortest magnetic domains of 1.33T were formed after the magnetic domain of 5.33T, since the length of each magnetic domain of 1.33T is equal, those magnetic domains are not influenced by the heat from the previous magnetic domain.

Figure 13:
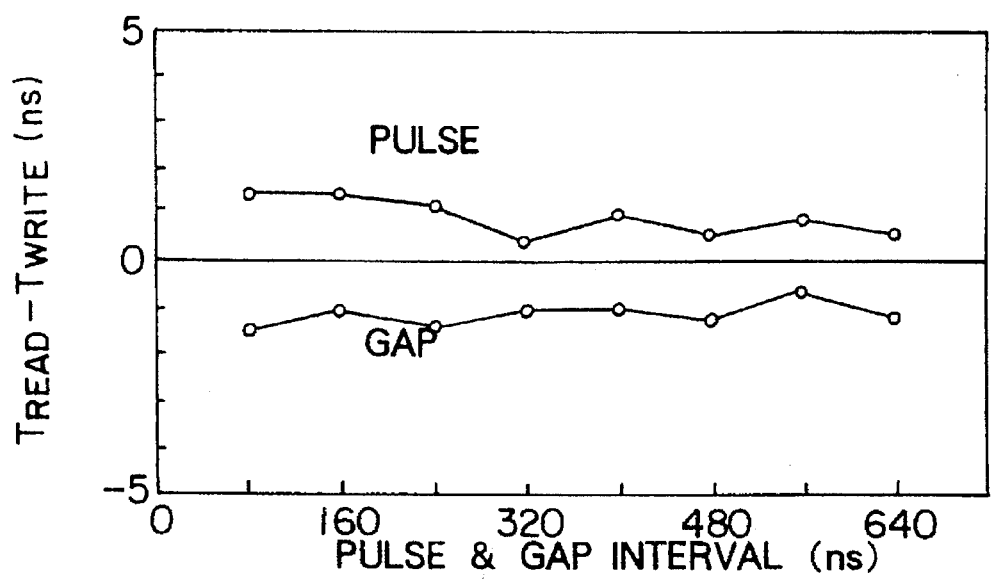
FIG. 13 is a diagram showing a pattern dependency of an edge shift.

FIG. 13 shows differences between the pulse widths of the recording signals when various kinds of patterns based on the (1,7) modulation have been recorded, and the widths of the reproduction signals. From the diagram, the edge shift is independent of the length of the magnetic domain formed and is equal to or less than 5% of the detection window width.

Even after the recording, reproducing, and erasing operations have been repeated $5 \times 10^7$ times, changes in carrier level and noise level are not discovered.

Figure 11:
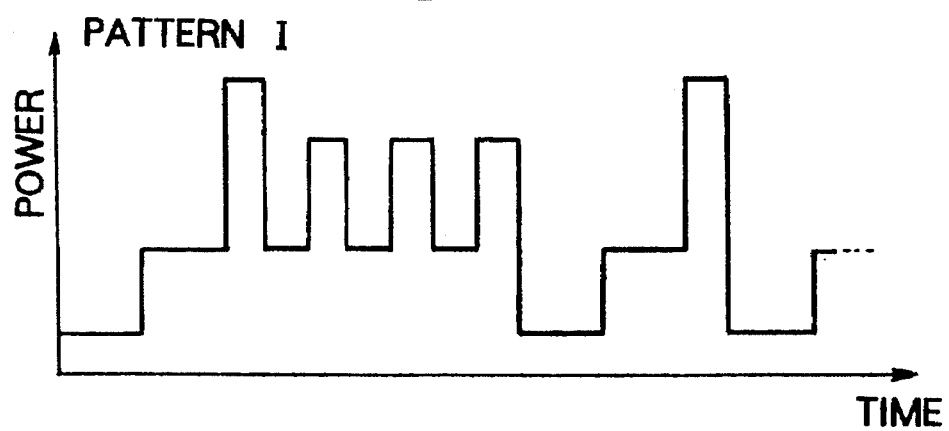
FIG. 11 is a diagram showing a recording signal waveform.
Figure 14:
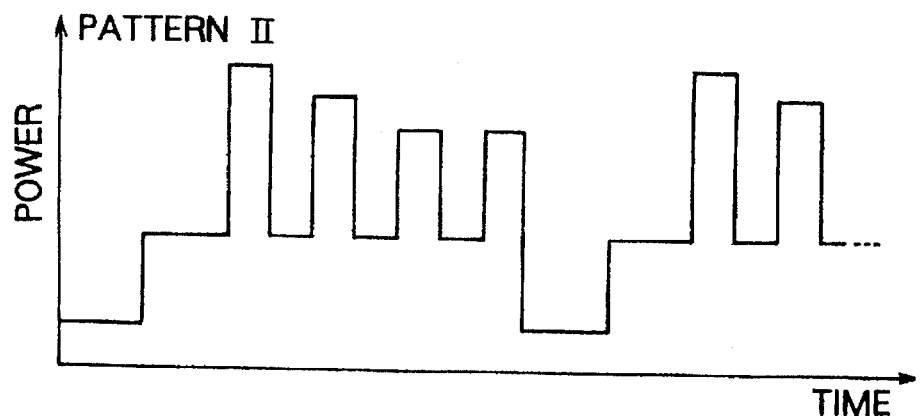
FIG. 14 is a diagram showing a recording signal waveform.

A similar effect is obtained by using the waveform of any one of the waveforms shown in FIGS. 11 and 14 as a pulse shape other than that shown in FIG. 10. The pulse and gap intervals are set to 20 nsec. It is proper to set the width of the head pulse to 7.5 mW for the pattern I and to 6.7 mW for the pattern II. However, these values are selectively determined in accordance with the heat structure of the medium which is used.

In case of a disc having a structure of four layers comprising a PC substrate, $SiN_x$ (75 nm), TbFeCoNb (25 nm), $SiN_x$ (20 nm), and $Al_{97}Ti_3$ (50 nm), by contrarily setting the head power to a low value of 5.5 mW and the powers of the second and subsequent pulses to a high value of 5.95 mW, the shift can be suppressed to ±2 nm or less.

Embodiment 5

Figure 15:
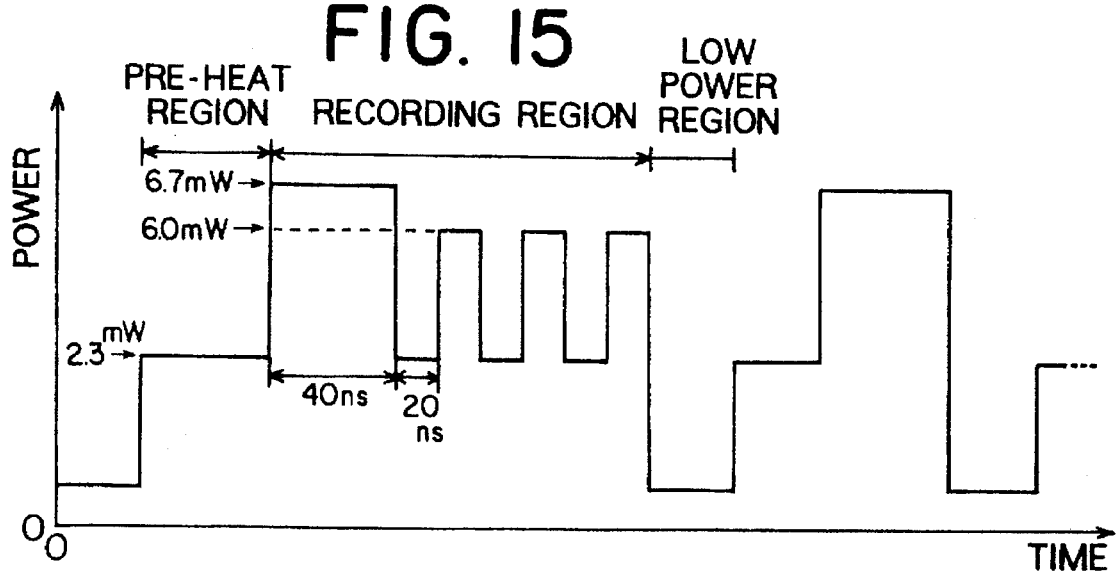
FIG. 15 is a diagram showing a recording signal waveform.

FIG. 15 is a schematic diagram showing a shape of the recording pulse used. For a disc medium having a rotational speed of 3000 r.p.m., the recording power of the head pulse at the innermost rim position of the disc is set to 6.7 mW and the powers of the subsequent pulses are set to 6 mW. The preheating power is set to 2.3 mW, the head pulse width is set to 55 nsec, and both of the subsequent pulse widths and gap intervals are set to 20 nsec. The recording is executed by using such pulses.

Figure 16:
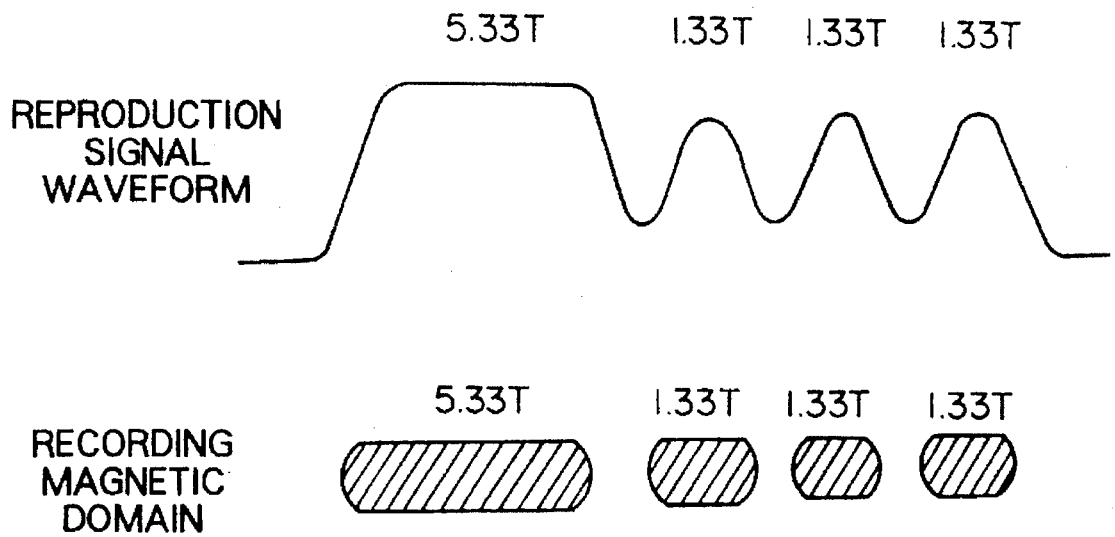
FIG. 16 is a schematic diagram showing a reproduction signal waveform and a recording magnetic domain shape.

FIG. 16 shows a schematic diagram of the reproduction signal waveform and recording magnetic domain when the shortest magnetic domain of 1.33T has been recorded after the longest magnetic domain of 5.33T by using the (1,7) RLL modulating method. The width of the magnetic domain formed is equal to 0.7 μm, the shortest magnetic domain length is equal to 0.75 μm, and the longest magnetic domain length is equal to 3.0 μm. It will be understood from the diagram that the shortest magnetic domain and the longest magnetic domain do not influence each other; the magnetic domain width is constant, independent of the length of pattern; and even in the case where three of the shortest magnetic domains of 1.33T were recorded after the magnetic domain of 5.33T, since the length of each of the magnetic domains of 1.33T is equal, it is not influenced by the heat from the previous magnetic domain.

Figure 17:
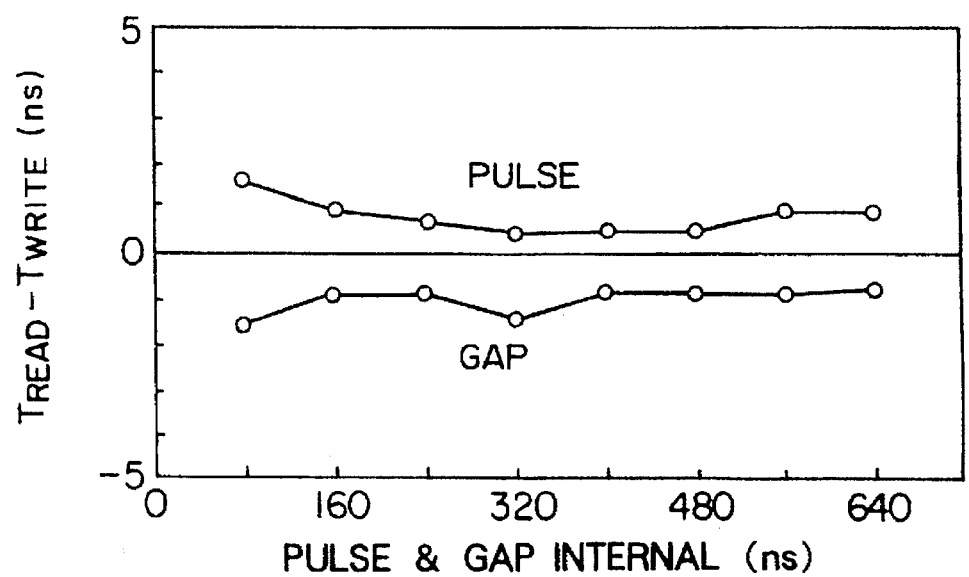
FIG. 17 is a diagram showing a pattern dependency of an edge shift.

FIG. 17 shows differences between the pulse widths of the recording signals and the widths of the reproduction signals when various kinds of patterns based on the (1,7) modulation have been recorded. From the diagram, the edge shift is equal to or less than 5% of the detection window width without dependence on the length of the magnetic domain formed.

Even after the recording, reproducing, and erasing operations have been repeated $5 \times 10^7$ times, changes in the carrier level and noise level are not discovered.

Figure 18A:
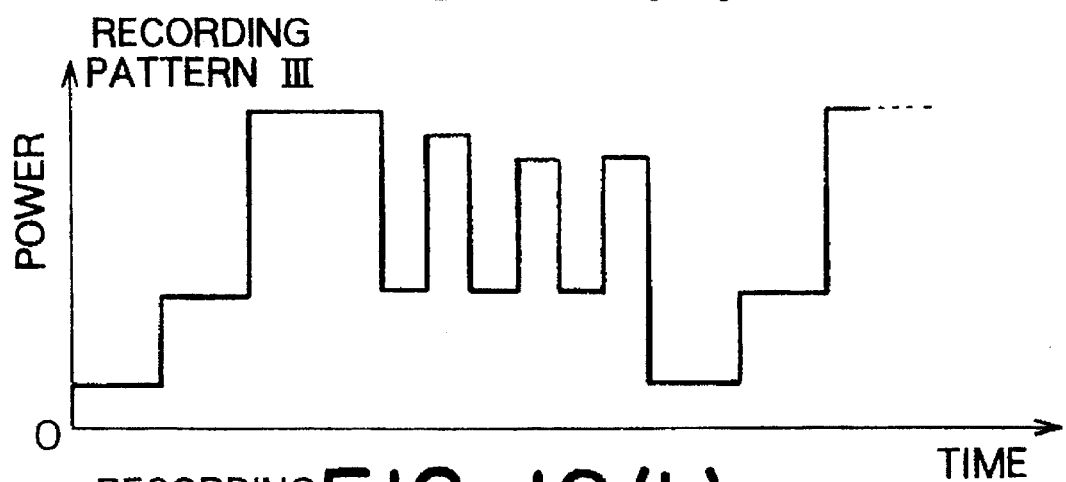
FIGS. 18(a), and 18(b) are diagrams showing recording signal waveforms.
Figure 18B:
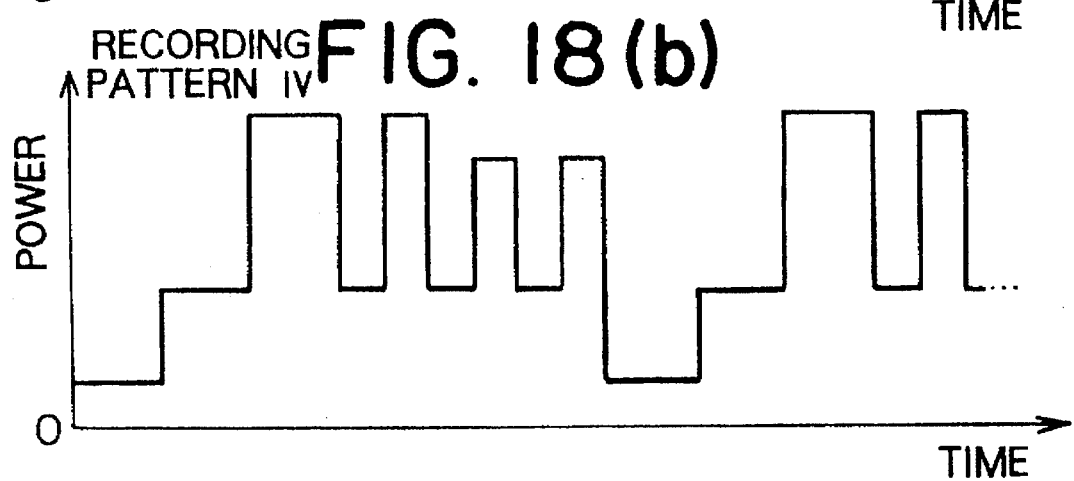

A similar effect is seen even by using a waveform of any one of the shapes shown in FIG. 18 as a pulse shape, without being limited to that shown in FIG. 15. In the case where the magnetooptic recording medium has a structure such that it can be easily warmed and cooled, in order to give both of the preheating and recording characteristics to the head pulse, it is necessary to set the pulse width to be longer than the subsequent pulses. It is desirable to set the pulse width to a value which is an integer number of times as large as, or is a factor of an integer of, the recording clock.

FIG. 19 shows a specific construction of a laser drive circuit to realize the trial writing of the present invention.

Figure 19A:
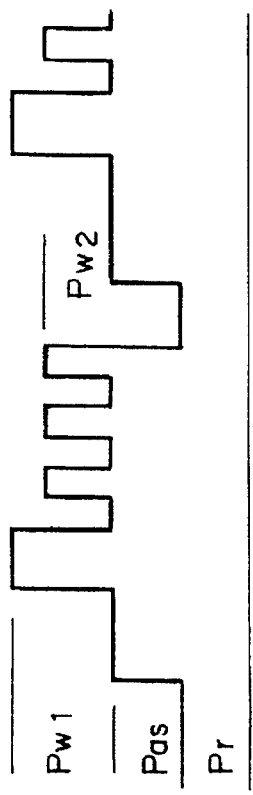
FIGS. 19(a), 19(b), 19(c), and 19(d) are diagrams for explaining an embodiment of a laser drive circuit.
Figure 19B:
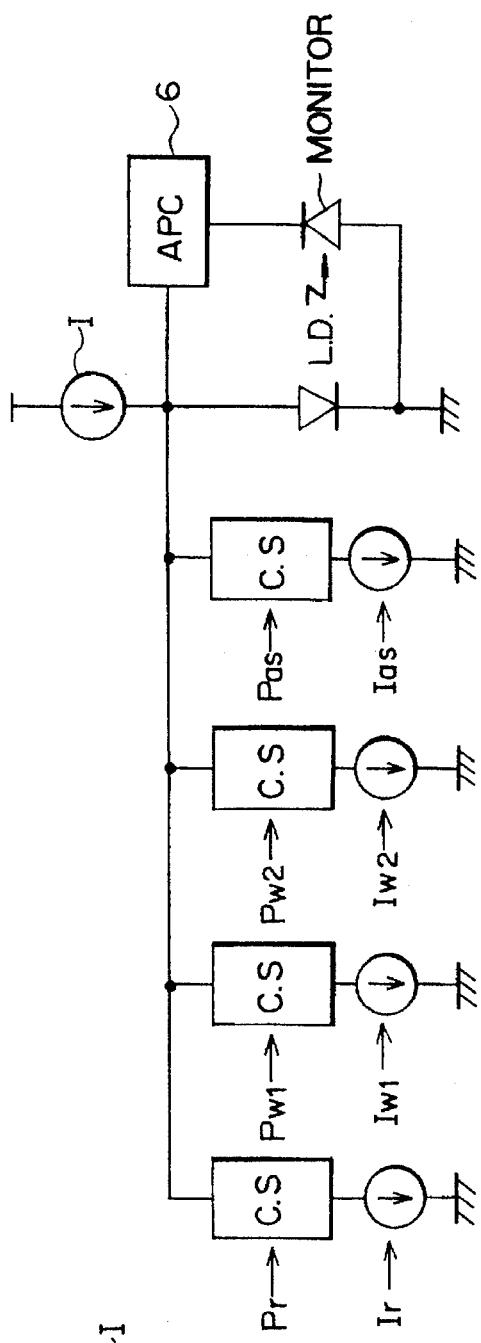

For the powers $P_{w1}$, $P_{w2}$, $P_{as}$, and $P_r$ of the recording waveforms shown in FIG. 19(a), current sources $I_{w1}$, $I_{w2}$, $I_{as}$, and $I_r$ are set by a drive circuit shown in FIG. 19(b) so that the laser beam has a predetermined power in consideration of the photoelectric current converting efficiency of the laser and the efficiency of the optical head, respectively. Only $I_{as}$ is variable because it is controlled by the trial writing.

Figure 19C:
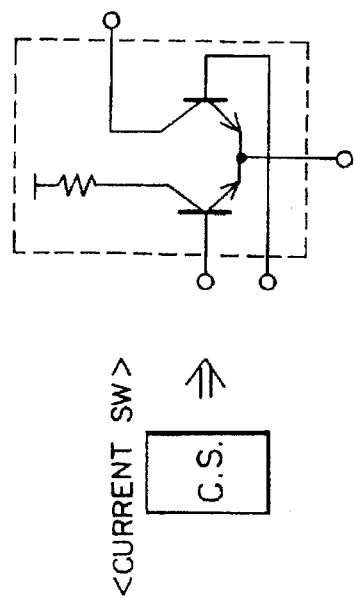
Figure 19D:
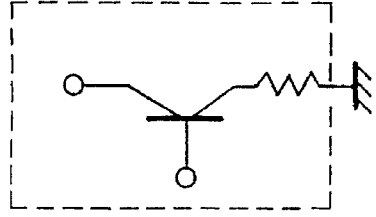

Whether each current is supplied to the laser or not is controlled by each recording pulse by a current switch CS. As shown in FIG. 19(c), the current switch circuit does not use a pnp type transistor to raise the response speed by the +driving but performs the switching operation by the npn type transistor, so that it has a special drive circuit construction. Namely, a current source I shown in FIG. 19(d) is constructed in a manner such that the maximum current constantly flows and the current flowing in the laser is decreased by only the current value components of the current sources $I_r$, $I_{w1}$, $I_{w2}$, and $I_{as}$ existing on the current switch side by the current switch CS. Therefore, the pulses $P_r$, $P_{w1}$, $P_{w2}$, and $P_{as}$ that control the current switches must have polarities inverted with respect to the polarities of the optical recording waveforms.

In the trial writing of the present invention, the foregoing recording pattern is recorded in one track in every sector indicative of a delimiter of the data by changing the magnitude of the recording auxiliary pulse. Now, assuming that the diameter of the disc is equal to 5.25 inches and the linear velocity is set to about 0.56 μm/bit, the number of sectors is equal to 32 even at the inner rim according to the MCAV recording method. For example, in a single trial writing operation, the auxiliary light is changed by five levels. Such a large changing operation is executed when the disc is first loaded and when the disc is exchanged. Subsequently, it is checked in what amount which is largely changed, located and the interval of the amount detected is further divided and changed by five levels.

Figure 20:
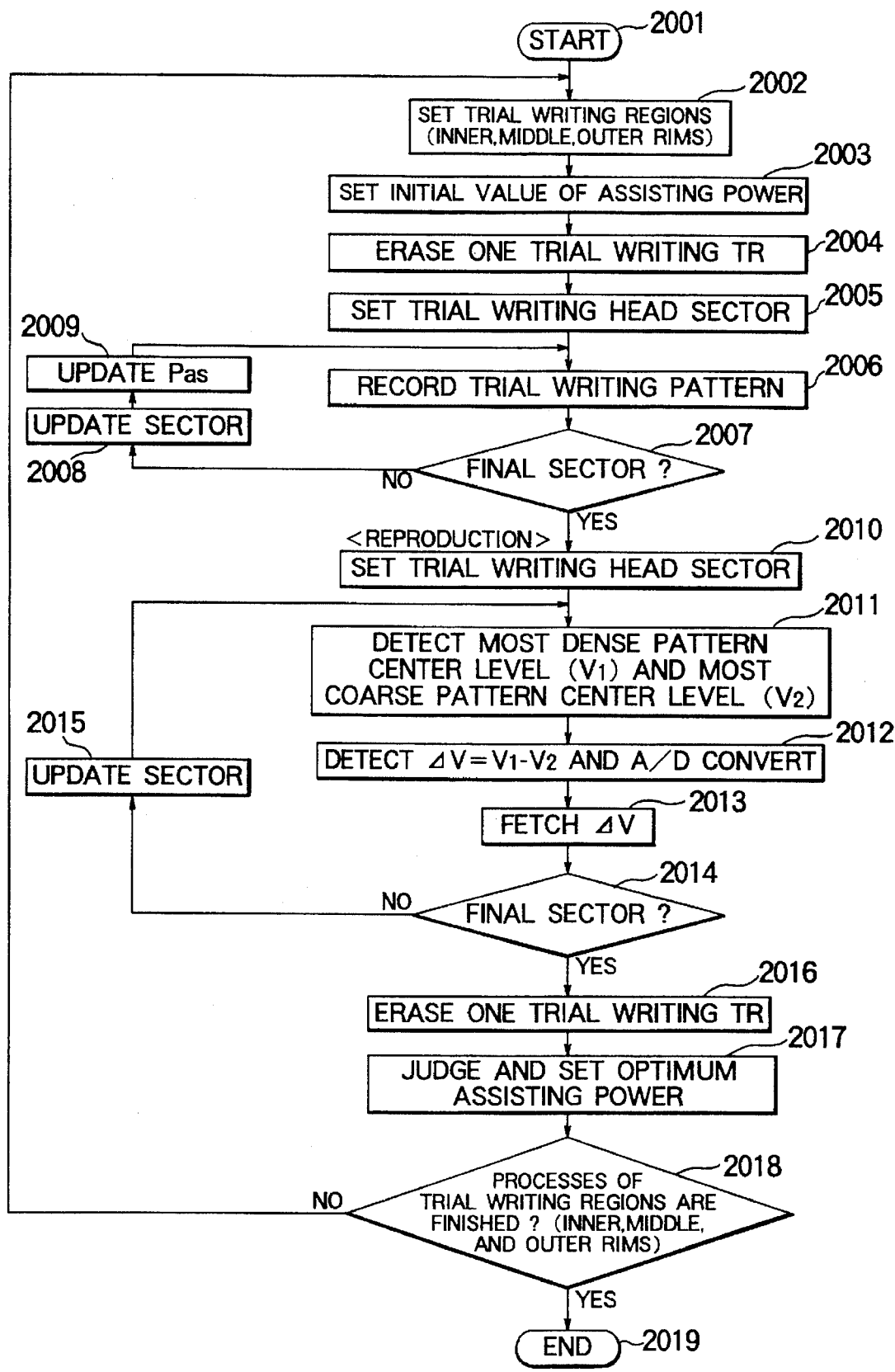
FIG. 20 is a flowchart for a procedure of trial writing.

FIG. 20 shows a trial writing procedure. As the frequency of the trial writing operation, the most severe condition exists for a period of time from the turn-on of the power source of the apparatus to a time point at which the heat is balanced. Although it depends on the heat generating conditions of the current of the like, the temperature rises by up to about 10° C. for five minutes. By initially setting, it is possible to sufficiently control at every five minutes.

Figure 25:
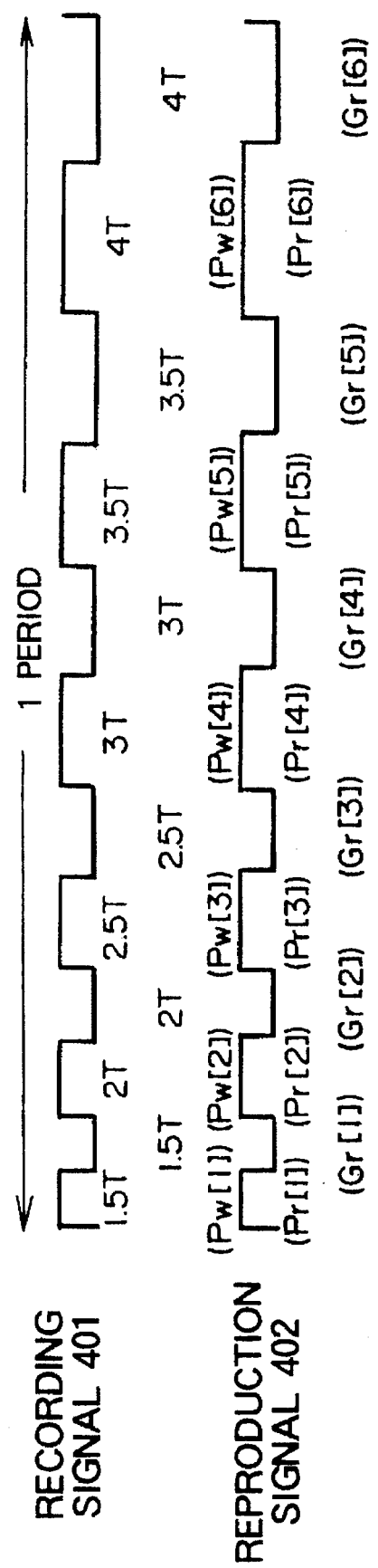
FIG. 25 is a diagram for explaining a state in which each edge position of a recording signal is adjusted by using information of an edge shift amount and an influence by the edge shift is suppressed.

In FIG. 20, the trial writing operation is executed when the optical disc is exchanged, when the power source of the apparatus is turned on, or at a proper time point during the operation of the apparatus (2001). A region of the medium in which the trial writing operation is executed is selected (2002). As a trial writing region, for example, a special region (trial writing track region) is set into the track of the outer rim, inner rim, or middle rim of the optical disc. One track in the test region is erased (2004) in consideration of the case where data for trial writing or the like has already been recorded in the test region. Subsequently, a trial writing test pattern is recorded onto the track. As a test pattern, for example, a pattern shown in FIG. 5 or 25 is recorded by a recording pulse train shown in FIG. 3, 4, 8, 10, 11, 14, 15, 18, or the like. In the illustrated embodiment, the pattern of FIG. 5 is used, the power $P_{as}$ of the recording auxiliary pulse is changed every sector, and data of one circumference of the track is recorded (2005 to 2009).

The recorded test pattern is subsequently reproduced (2010, 2011) and evaluated. The evaluation is performed by calculating a difference $\Delta V$ between the center level $V_1$ of the reproduction waveform of the most dense test pattern, and the center level $V_2$ of the reproduction waveform of the most coarse pattern (2012). The value of $\Delta V$ is fetched every sector (2013 to 2015). After that, the recorded test patterns are erased (2016). The value of $P_{as}$ in the sector of the minimum $\Delta V$ is set to the optimum power of the recording auxiliary pulse (2017). In the preferred embodiment, the above operations are executed with respect to the outer rim, inner rim, and middle rim of the optical disc, respectively (2018). After completion of those operations, the ordinary data recording operations are started (2019).

Embodiment 6

Figure 21:
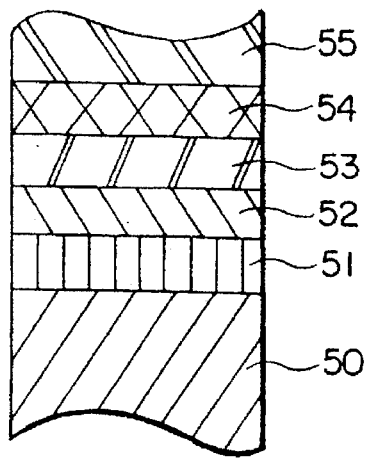
FIG. 21 is a schematic diagram showing a cross sectional structure of a magnetooptic disc.
Figure 22:
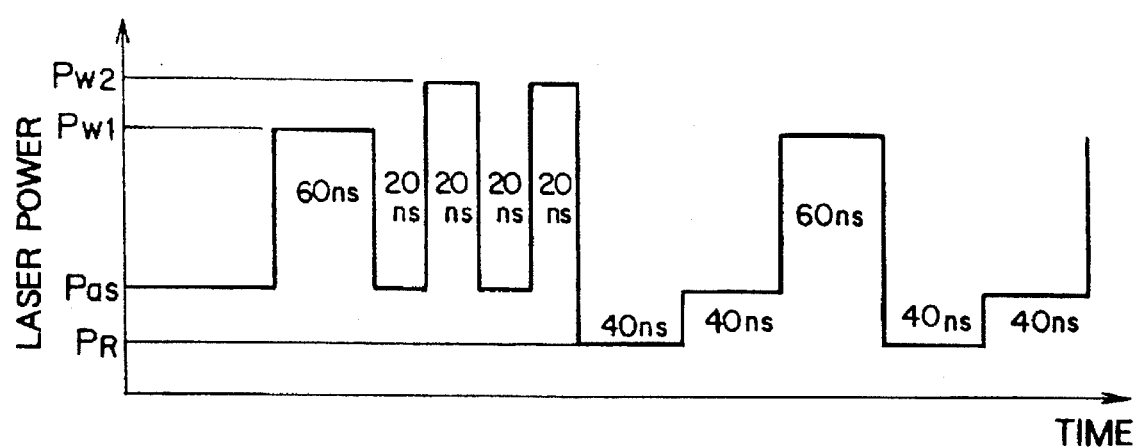
FIG. 22 is a diagram showing a shape of a recording pulse waveform.

FIG. 21 is a schematic diagram showing a cross sectional structure of the disc used in a preferred embodiment of the invention. As for the disc, a recording medium is formed by a sputtering method onto a plastic or glass substrate having concave and convex guide grooves. The medium is formed by continuously laminating an $SiN_x$ film of 80 nm, a TbFeCoNb film having a perpendicular magnetic anisotropy of 25 nm, an $SiN_x$ film of 20 nm, and an $Al_{96}Ti_4$ film of 50 nm without breaking the vacuum during the laminating processes. The layers are continuously laminated to suppress formation of an impurity layer such as oxygen or the like in the layer interface. The above laminate structure is shown as merely one example.

The effect of the invention is not lost by the laminate structure. On the contrary, since a micro magnetic domain can be stably formed by the present invention, superhigh density optical recording can be realized. Although the magnetooptic disc of a 4-layer structure has been shown here, the effect of the invention is not limited by the number of layers of the laminate structure.

The recording operation is executed for the above disc by using a waveform having a pulse shape shown in FIG. 21. The pulse width of the recording waveform is synchronized with the write clock of the disc apparatus. Such a synchronized pulse width is easily used to make the clock signal and to realize the low costs of the apparatus, and also has a feature such that the precision of the clock is high.

The recording waveform is constructed by four power levels. The first level is a read (reproducing) level and $P_r=1.5$ mW. The second level is an assisting (auxiliary) level and $P_{as}=2.7$ mW. The third level is a first recording level and $P_{w1}=5.1$ mW. The fourth level is a second recording level and $P_{w2}=5.9$ mW. The (1,7) RLL modulating method is used as a signal modulating method and the recording is executed.

As for the pulse width, the shortest bits of 1.33T are formed by the above modulating method by using a pulse width of 60 nsec and a laser power of $P_{w1}$. After that, the bits of 2T are formed by $P_{w2}$ of 20 nsec through the $P_{as}$ level of 20 nsec. The pulses of 2.66T to 5.33T are formed by repeating the above processes hereinafter. The pulse width and laser power are variable in accordance with the structure of the disc or material which is used, and are determined in consideration of the matching between the apparatus and the disc. That is, $P_{w1}=P_{w2}$ or $P_{w1}>P_{w2}$.

The magnetic domains recorded by the above method are reproduced (by using a front/back edge independent reproducing method). The window margin is equal to 30% and the shift is equal to or less than ±2 nsec. A random pattern is used for measurement.

Although a material of $SiN_x$ has been used in the above embodiment, in general a dielectric material of an inorganic compound which is not optically absorbed (for example, at least one kind of compound which is selected from silicon nitride, aluminum nitride, and silicon oxide) can be used.

Further, although $Al_{96}Ti_4$ has been used in the embodiment as a metal layer to reflect the light and to control the heat flow, it is also possible to use at least one kind of element which is selected from Au, Ag, Cu, Al, Pd, and Pt. Further, to control the heat conductivity, it is also possible to use a film in which in addition to the other elements mentioned above, at least one kind of element which is selected from Nb, Ti, Ta, and Cr is added by an amount within a range from 0.5 at % to 30 at %.

Embodiment 7

Another embodiment of the present invention will now be described with reference to the drawings.

First, the shifting process of the edge position and its suppressing principle will be explained.

Figure 23:
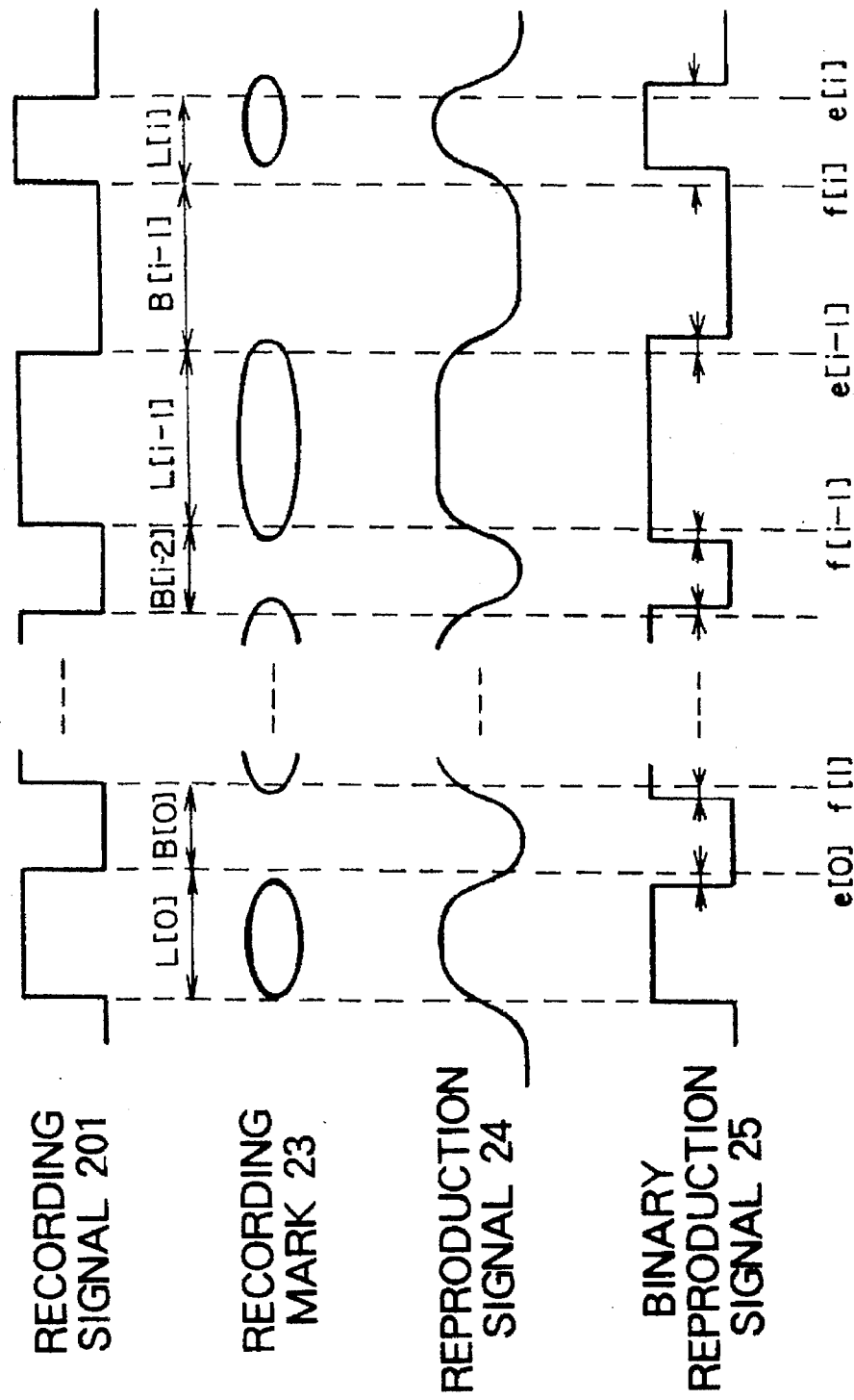
FIG. 23 diagrammatically shows a state in which an edge position is shifted by heat interference.

FIG. 23 diagrammatically shows a state in which the edge position is shifted by the heat interference.

In FIG. 23, the lateral direction shows the elapse of time or spatial coordinates on the recording medium on which the light spot moves. A recording signal 201 shows a time shift of an intensity of the light spot which is irradiated onto the recording medium by modulating the recording information. The recording mark 23 shows a shape of the recording mark formed on the recording medium by the recording signal 201. The reproduction signal 24 is obtained by scanning the light spot onto the recording mark with a light intensity of the read level, and receiving the reflected light from the recording medium at that time by the photodetector and photoelectrically converting the reflected light. The binary reproduction signal 25 is obtained as a result of the binarization of the reproduction signal which reflects the recording mark shape in accordance with whether the signal level is higher or lower than a predetermined level.

FIG. 23 shows the first leading edge of the recording signal 201, the edge position on the front side of the leftmost side of the recording mark 23, and the first leading edge position of the binary reproduction signal 25 in a lump. L[i] and B[i] denote a length of each pulse interval (from the leading edge to the trailing edge) and a length of the gap interval (from the trailing edge to the leading edge) of the recording signal 201, respectively, and i denotes the serial number (the first value is 0) from the first recording pulse (binary reproduction pulse).

According to the optical information recording method whereby the recording mark is fundamentally formed by the heat which is given by the light spot as an information recording mechanism, the heat given by the light spot is diffused in the recording medium in the cooling process, so that an ambient temperature of the light spot rises. Therefore, in the case where the size and interval of the recording mark are set to small values in order to record at a high density, each pulse shape of the recording signal not only determines each of the corresponding recording mark shapes but also influences the shapes of the ambient recording marks. On the contrary, the shape of each recording mark is not decided by only the recording pulse shape corresponding thereto, but is also influenced by the shape of the recording pulse which is adjacent with respect to time.

As a result of the recording mark being influenced by the recording pulse which is adjacent with respect to time, a deviation occurs between the pulse interval of the recording signal 201 and the edge position of the recording mark 23. Thus, relative deviations e[i] and f[i] between each of the edge signals of the recording signal and each of the edge positions of the binary reproduction signal 25 occur. The function e[i] denotes a deviation amount between the trailing edge of the recording signal 201 and the trailing edge of the binary reproduction signal 25; f[i] indicates a deviation amount between the leading edge of the recording signal 201 and the leading edge of the binary reproduction signal 25; i indicates serial numbers (the initial value is 0) from the leading edge and trailing edge of the first recording pulse (binary reproduction pulse); and f[0] is set to 0.

In this instance, the edge deviation amounts e[i] and f[i] change in dependence on the heat conducting characteristics of the recording medium and its recording density. However, for example, in the case where the recording linear velocity is set to about 10 to 20 m/sec and the recording mark length as a recording density is about half the light spot diameter for a magnetooptic recording medium, which is most general and has a structure comprising a TbFeCo magnetic film, a dielectric film, a protecting film and a reflective film, the edge deviation amounts can be expressed by the following equations by using the pulse length L[i] of the recording signal and the gap length B[i].

$$e[i]=Se(B[i-1], L[i-1]) \qquad \text{equation 12}$$

$$f[i]=Sf(L[i-1], B[i-1]) \qquad \text{equation 13}$$

where Se( ) and Sf( ) indicate functions. That is, e[i] is determined by the pulse interval L[i] just before and the gap interval B[i−1] before it, and f(i) is decided by the gap interval B[i−1] just before and the pulse interval L[i−1] before it.

With respect to e[i], the influences occur before the pulse interval L[i−1] and after the gap interval B, and with respect to f[i], the influences occur before the gap interval B[i−2] and after the pulse interval L[i]. Thus, no problem occurs even when no consideration is paid.

Figure 24:
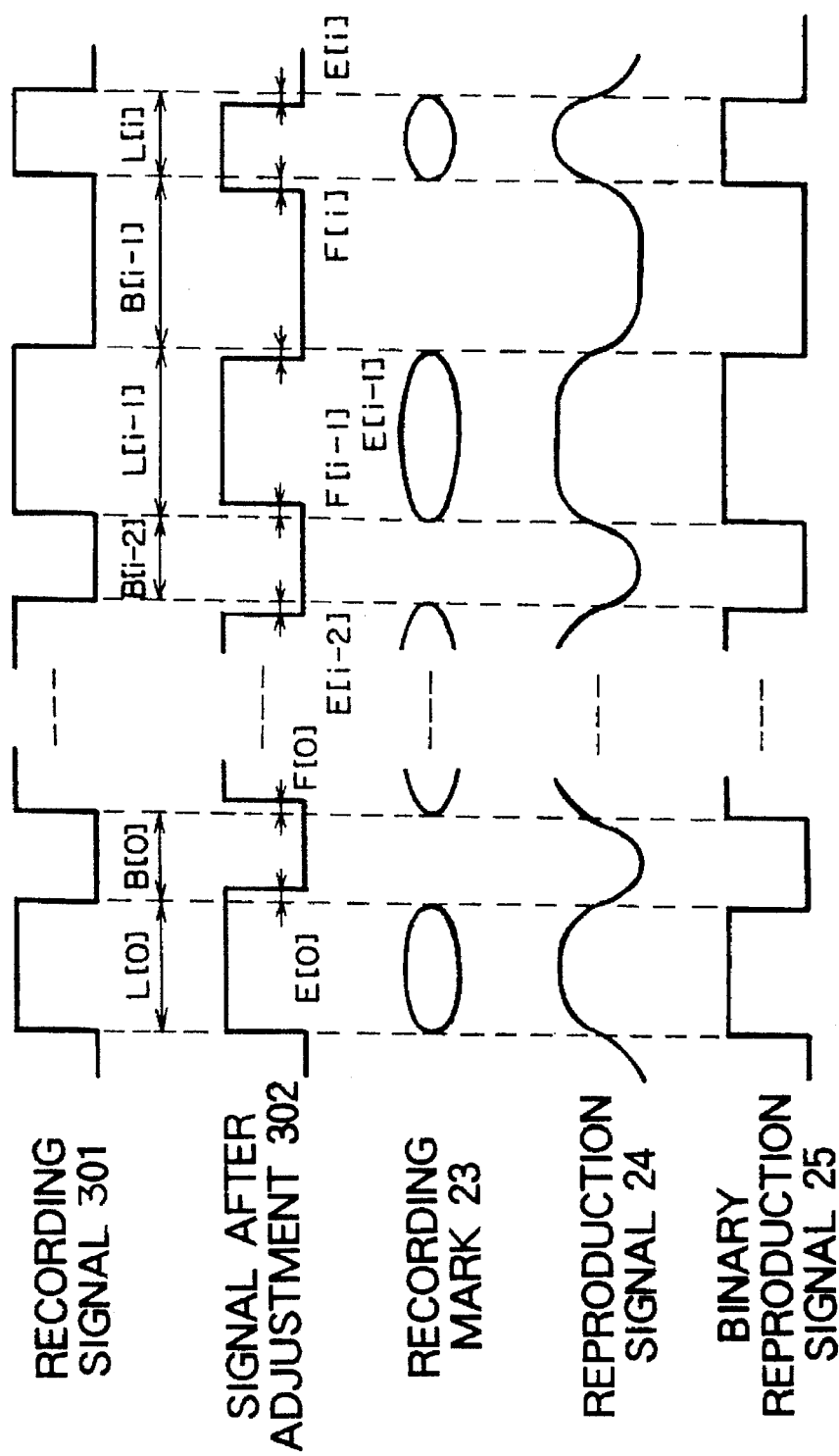
FIG. 24 is a schematic diagram showing a state in which the edge position is shifted due to the heat interference.

A state in which the information of the edge shift amount mentioned above is used, each of the edge positions of the recording signal is adjusted, and the influence by the edge shift is suppressed, will now be described by using FIG. 24. In FIG. 24, the lateral direction indicates the elapse of time or spatial coordinates on the recording medium to which the light spot moves. A recording signal 301 denotes an electric signal which is obtained by modulating the recording information. A signal 302 after completion of the adjustment shows a time-dependent change of the electric signal level in which the leading and trailing edge positions of the recording signal 301 have been shifted in accordance with the recording pattern. The intensity of the light spot which is irradiated onto the recording medium is modulated by the above signal.

The recording mark 23 denotes the shape of the recording mark formed on the recording medium by the adjusted signal 302. The reproduction signal 24 is derived by reading the recording mark 23 using a light spot having a light intensity of the read level and by receiving the reflected light from the recording medium and photoelectrically converting the reflected light by the photodetector. The binary reproduction signal 25 denotes an electric signal which is obtained as a result in which the electric signal which reflects the recording mark shape has been binarized in accordance with whether its signal level is higher or lower than a predetermined level.

The first leading edge of the recording signal 301, the edge position on the front side of the leftmost side of the recording signal 23, and the first leading edge position of the binary reproduction signal 25 are expressed in a lump. L[i] and B[i] show a length of each pulse interval (from the leading edge to the trailing edge) of the recording signal 301 and a length of the gap interval (from the trailing edge to the leading edge). E[i] and F[i] denote deviation amounts from the edge positions of the recording signal 301 with respect to each of the trailing edges and leading edges of the adjusted signal 302, respectively. Further, i denotes a serial number (the initial value of 0) from the first recording pulse (binary reproduction pulse).

The adjusting principle of the recording pulse edge position is as follows. A deviation certainly occurs at the edge position of the recording mark 23 for the edge position of the recording signal 301. However, on the contrary, by previously deviating each of the edge positions of the original recording signal and obtaining the adjusted recording signal 302, each edge position of the binary reproduction signal 25 is deviated for the edge position of the recording signal 302 but coincides with the edge position of the original recording signal 301. The deviation amount of the edge position of the recording mark 23 from the edge position of the recording signal 301 can be obtained by using the above relational equations with reference to the recording patterns. Therefore, the deviation amount of the edge position and the deviation amount of the binary reproduction signal for the recording signal can be obtained by using the inverse functions of the above relational equations in a manner such that their signs are opposite and their magnitudes are the same amount. That is, by providing the inverse functions Cf( ) and Ce( ) such that $$\beta = Cf(\alpha, \gamma) \qquad \text{equation 15}$$

for $$\gamma = Sf(\alpha, \beta) + \beta \qquad \text{equation 14}$$

and $$\beta = Ce(\alpha, \gamma) \qquad \text{equation 17}$$

for $$\gamma = Se(\alpha, \beta) + \beta \qquad \text{equation 16}$$

E[i] and F[i] can be obtained by the following forms.

$$F[i] = B[i-1] + E[i-1] - \\ Cf(L[i-1] + F[i-1] - E[i-1], B[i-1] + E[i-1]) \qquad \text{equation 18}$$

$$E[i] = L[i] + F[i] - Ce(B[i-1] + E[i-1] - F[i], L[i] + F[i]) \qquad \text{equation 19}$$

In the equations (18) and (19), the edge position deviation amounts are included in the functions Ce( ) and Cf(). However, by sequentially obtaining the deviation amounts E[0], F[1], F[2], E[2], . . . in accordance with this order, for instance, when F[i] is derived, E[i−1] and F[i−1] in the equation 18 are calculated at the preceding time point. When E[i] is obtained, in the equation 19, F[i] and E[i−1] are calculated at the preceding time point. Therefore, F[i] and E[i] can be calculated by the equations 18 and 19, respectively.

Subsequently, the principle of the method of detecting a change in light beam intensity upon recording and a temperature change of the recording medium and corresponding to their changes will now be described.

Even in the case where the light beam intensity upon recording or the temperature of the recording medium changes, a deviation also occurs between each edge position of the recording signal and the edge position of the recording mark. For instance, when the light beam intensity upon recording decreases, the recording mark decreases as a whole. The position of the front edge of the recording mark is deviated to the back side. The position of the back edge of the recording mark is deviated to the front side.

The deviation amount of each edge position of the recording mark differs with every recording mark which is formed. Therefore, in order to reduce the deviation of the edge position of the recording mark which occurs in the case where the light beam intensity upon recording changes by the method of changing the edge adjustment amount of every recording pattern as mentioned above, it is necessary to change the functions for edge adjustment as mentioned above for every light beam intensity upon recording, so that the scale of the circuit system increases. Therefore, in order to prevent the edge positional deviation by a simpler system, when a change in light beam intensity upon recording is detected, an adjustment so as to return the light beam intensity upon recording to the original value is executed.

On the other hand, even when the temperature of the recording medium decreases, the recording mark also decreases as a whole. In such a case as well, the position of the front edge of the recording mark is deviated to the back side and the position of the back edge of the recording mark is deviated to the front side, respectively. As for such a temperature fluctuation, the temperature cannot be directly controlled to be constant so long as a temperature adjusting mechanism is not provided in the apparatus. The edge position fluctuation characteristics of the recording mark in association with the temperature fluctuation show a tendency which is fairly close to that in the case where the light beam intensity upon recording changes in a range in which the fluctuation amount from a presumed temperature is small. Therefore, in such a range, the light beam intensity upon recording is changed. At a time point when the value largely fluctuates from the set value, the function for edge position adjustment upon recording is switched.

To detect the above changes, predetermined recording signals are recorded every other predetermined time interval in the special region on the recording medium. Just after the signal is recorded, the recorded signal is reproduced and the deviation amount of each edge position is detected. From the result of the detection, the change in the light beam intensity upon recording and the temperature change of the recording medium are separated and detected.

FIG. 25 shows an example of a recording signal pattern which is used in the above case. As a recording signal 401, a plurality of edge intervals in the range of the recording mark lengths which can be obtained in the ordinary information recording are arranged from the shorter or longer edge interval in a manner such that the pulse width is equal to the pulse interval just after the pulse, and a signal which is obtained by repeating such an arranging process a plurality of times is used. The signal in such an arranging process is repeated a plurality of times to raise the accuracy of the measurement result by reducing the influence of the noise component included in the result of the detection by an averaging process. There is shown an example here in which the recording signal is constructed and code modulation is executed to the recording information by 2-7 RLLC (Run Length Limited Code). $P_w[1]$, $P_w[2]$, . . . denote edge intervals of the recording signal pulses. $G_w[1]$, $G_w[2]$, . . . denote edge intervals of the recording signal gaps. The symbol T existing in another edge interval expression of the recording signal 401 denotes a time duration per one information bit.

A reproduction signal 402 shows the reproduction signal waveform after completion of the binarization when the recording mark written by such a recording signal is read out. $P_r[1]$, $P_r[2]$, . . . denote edge intervals of the reproduction signal pulses. $G_r[1]$, $G_r[2]$, ... denote edge intervals of the reproduction signal gaps.

Figure 26:
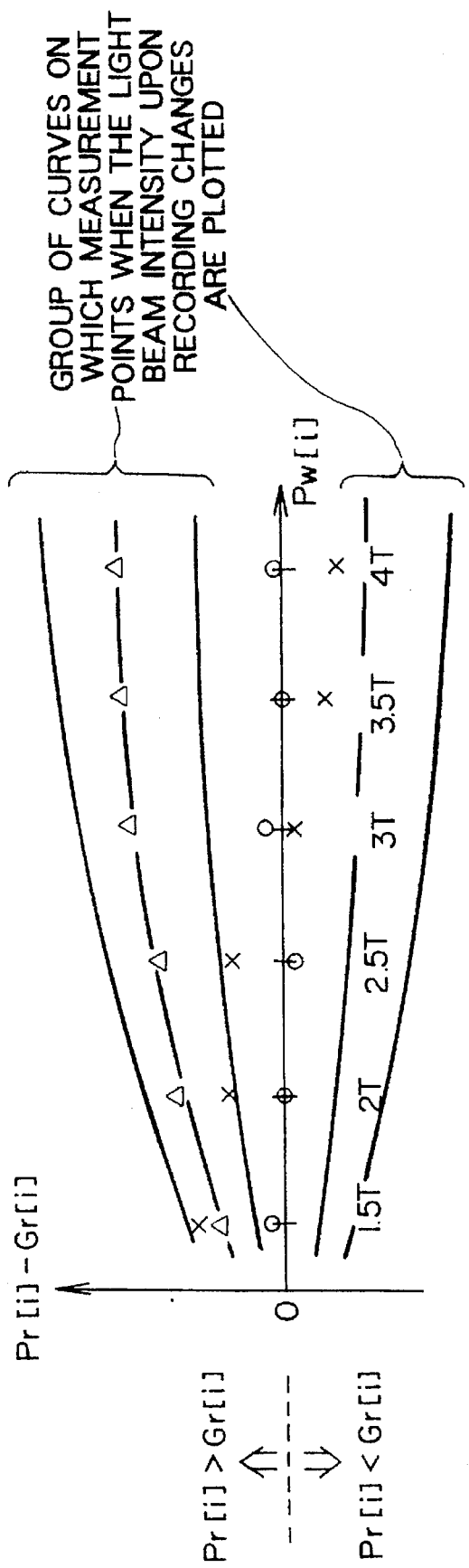
FIG. 26 is a diagram showing an example of a recording signal pattern for measurement of recording conditions.

FIG. 26 shows means for separating and detecting a light beam intensity change upon recording and a temperature change of the recording medium from the relation between the recording signal 401 and the reproduction signal 402. The axis of abscissa denotes the pulse interval $P_w[i]$ of the recording signal 401. The axis of ordinate indicates a result which is obtained by subtracting the gap interval $G_r[i]$ from the pulse interval $P_r i$ of the reproduction signal 402, in which a measurement point in each recording situation is plotted. When all measurement points are higher than the 0 level, the light beam intensity upon recording has changed in the direction larger than the set value or the temperature of the recording medium has changed in the direction higher than the presumed value. On the contrary, when all measurement points are lower than the 0 level, the light beam intensity upon recording has changed in the direction larger than the set value or the temperature of the recording medium has changed in the direction higher than the presumed value.

When the light beam intensity upon recording changes, the measurement points are located on one of a group of predetermined curves. Therefore, in the case where the light beam intensity upon recording has changed, by previously examining a group of curves which are drawn by the measurement points and by storing information of such a group of curves into the apparatus, it can be determined whether it is possible to process by changing the light beam intensity upon recording by discriminating whether all of the measurement points are located on one of those curves or not. When all of the measurement points are not located on one curve, a check is made to see if the measurement points are deviated to the right lower side from the curve or to the left lower side. From the result of the discrimination, a check is made to see if the temperature of the recording medium has increased or decreased. In accordance with the result of the judgment, the edge position adjustment table upon recording is changed.

An embodiment including the adjustment of the edge position and the judging principle of the recording conditions as mentioned above will now be described.

Figure 27:
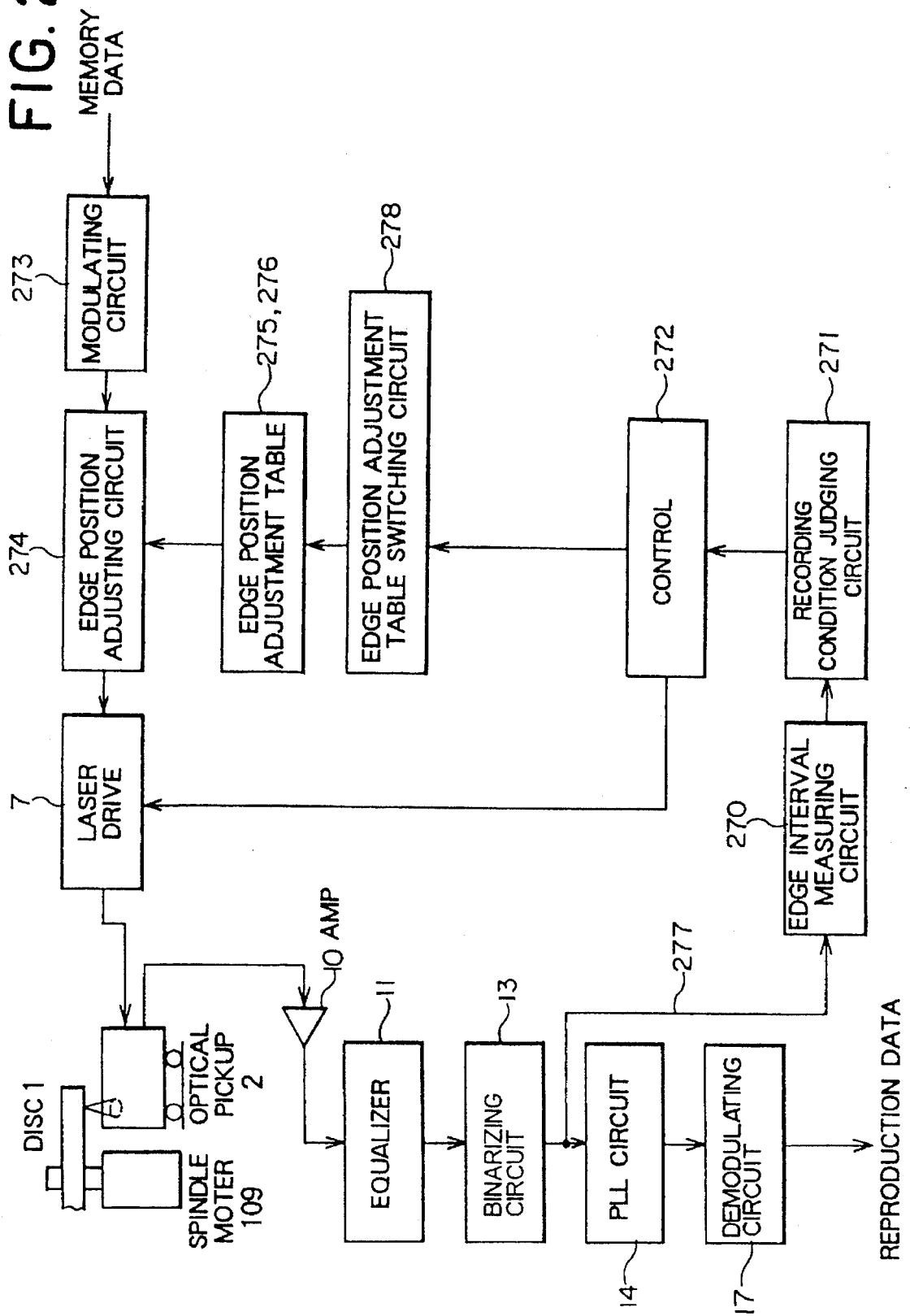
FIG. 27 is a diagram for explaining means for separating and detecting a light beam intensity change upon recording and a temperature change of a recording medium from the result of the measurement.

FIG. 27 is a block diagram showing a construction of such an embodiment.

In FIG. 27, the optical disc 1 is rotated at a constant angular velocity by the spindle motor 109. A laser beam for recording and reproducing is converged onto the recording film surface of the disc 1 by the optical pickup 2 through the converging lens. The optical pickup 2 can be moved in the radial direction of the disc in correspondence to the recording position of the information.

The signal detected by the detector in the optical pickup 2 is amplified to a desired level by the amplifier 10. After that, the waveform of the signal is equalized by the equalizing circuit 11 and a resolution of the reproduction signal is assured. Then, the signal is converted into a reproduction binary signal 277 as a digital signal by a binarizing circuit 13. The binary signal is separated into the data signal and the clock signal by the PLL (Phase Locked Loop) circuit 14 and reproduction data is derived by a demodulating circuit 17.

The above portion corresponds to a data reproduction signal processing system of an optical disc system using the ordinary mark length recording method. In addition to the above component elements, the reproduction signal processing system of the present invention has a circuit system for detecting a change in light beam intensity upon recording and a change in temperature on the recording medium, and for calculating and updating a pulse interval adjustment amount upon recording and a recording power.

The above circuit system comprises an edge interval measuring circuit 270 and a recording condition judging circuit 271. First, the reproduction binary signal 277 is transmitted through the edge interval measuring circuit 270 and each pulse interval and gap interval of the signal are measured. The results of the measurement are supplied to the recording condition judging circuit 271. A change amount of the light beam intensity upon recording and a temperature change amount on the recording medium are separated and detected and the results are transmitted to a controller 272.

Figure 28:
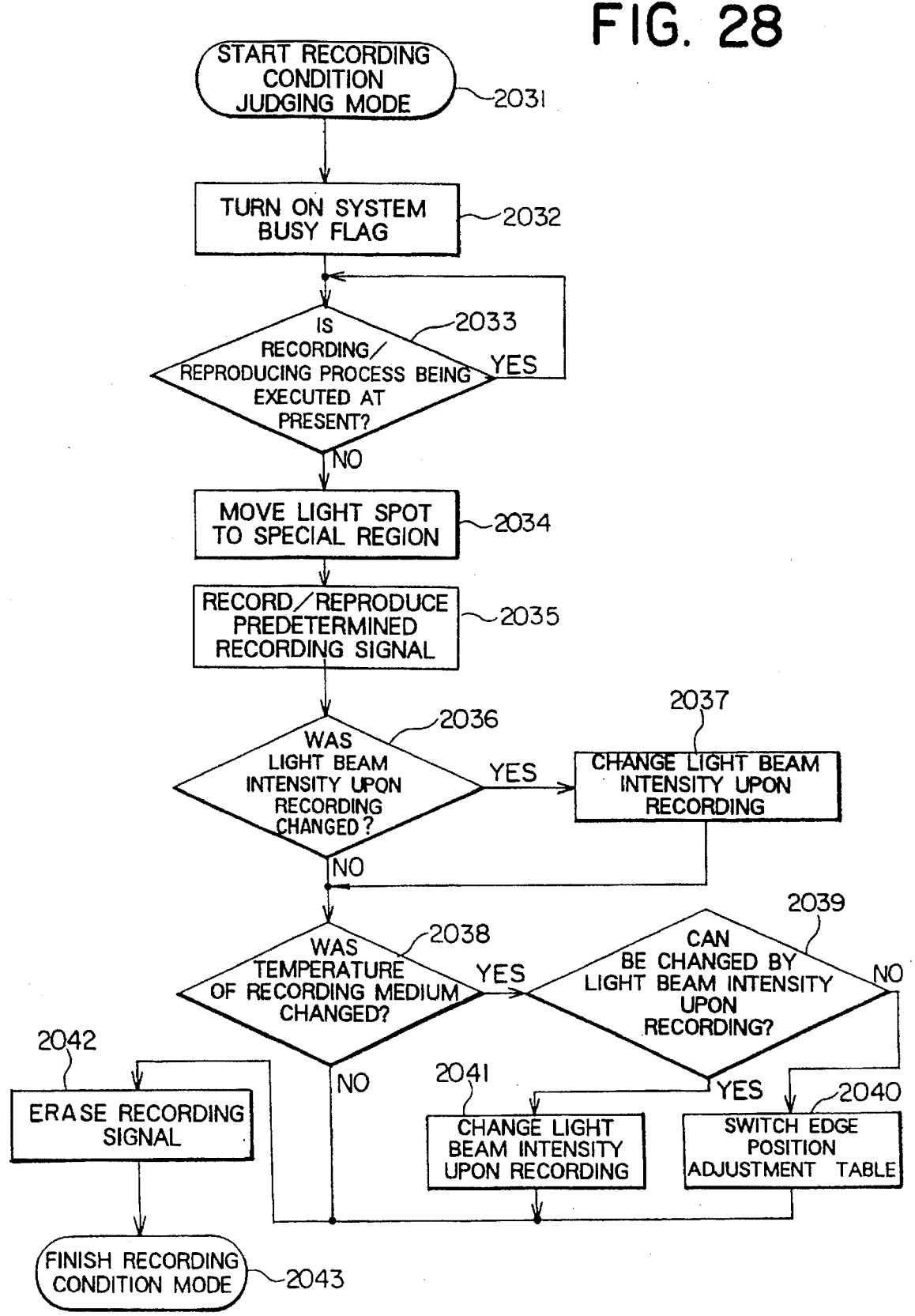
FIG. 28 is a flowchart of the recording condition judging mode.

The recording condition judging circuit operates in a recording condition judging mode which is instructed from the controller every other predetermined time interval other than the ordinary information recording and reproducing modes. FIG. 28 shows a flow in the recording condition judging mode.

During the operation of the system, a predetermined time interval is monitored by the controller 272 in the system and the above mode is started every other such time interval (2031). First, in the beginning of such a mode, the system is set into a busy state, thereby setting a state in which the ordinary recording and reproducing operations are not accepted (2032). If there is an operation (recording, reproduction) which is at present being processed by the system, the apparatus waits for the end of such a process (2033).

The light spot is subsequently moved to a special region to record and reproduce a predetermined recording signal to examine the recording conditions (2034). Such a region is set at a plurality of positions of different rotational radii per one recording medium.

After completion of the movement, the predetermined recording signal used for examining the recording conditions is generated and recorded onto the recording medium. The recording mark is subsequently reproduced (2035). At that time point, the edge interval measuring circuit 270 and the recording condition judging circuit 271 operate by receiving commands from the controller. The results of the judgment (2036) are transmitted to the controller 272. On the controller side, the light beam intensity upon recording is changed (2037, 2041) or the changing operation (2040) of the pulse interval adjustment amount upon recording is executed in accordance with the results of the judgment.

For instance, in the case where it is determined as a result of the judgment that the light beam intensity upon recording changed in the direction larger than the set value and its change amount exceeded the allowable amount, the light beam intensity upon recording is reduced by a slice amount $\Delta P$. Similarly, as a result of the judgment, when it is decided that the light beam intensity upon recording changed in the direction smaller than the set value and its change amount exceeded the allowable amount, the light beam intensity upon recording is increased by the slice amount $\Delta P$.

On the other hand, from the result of the judgment, when it is decided that the temperature on the recording medium changed in the direction higher than the presumed value and its change amount exceeded the allowable range, the light beam intensity upon recording is reduced by the slice amount $\Delta P$ within a range in which it is possible to process by changing the light beam intensity upon recording. When exceeding the range in which it is possible to process due to the change in the light beam upon recording, together with the decreasing operation of the light beam intensity upon recording by the slice amount $\Delta P$, the pulse interval adjustment amount is changed (2040). Similarly, as a result of the judgment, when it is determined that the temperature on the recording medium changed in the direction lower than the presumed value and its change amount exceeded the allowable range, the light beam intensity upon recording is increased by the slice amount ΔP within a range in which it is possible to process by the change in the light beam intensity upon recording. When exceeding the range in which it is possible to process by the change in the light beam intensity upon recording, together with the operation to increase the light beam intensity upon recording by the slice amount ΔP, the pulse interval adjustment amount upon recording is changed (2040).

As a result of the judgment, when it is decided that each change amount does not exceed the allowable range, none of the recording conditions is changed.

The operations corresponding to the results of the judgment as mentioned above are executed. The signals in the special recording regions are erased (2042). The busy state of the system is canceled. The operating mode is returned to the ordinary information recording and reproducing mode.

The time interval to generate the recording condition judging mode is determined on the basis of the fluctuation time of the light beam intensity change upon recording and the temperature change on the recording medium. For instance, when considering the light beam intensity upon recording, it is necessary to set into a time interval during which the light beam intensity upon recording does not change by more than the change slice width of ΔP or more.

Returning to FIG. 27, the signal recording system will now be described. When information is recorded, the recording information is code modulated by a modulating circuit 273 so as to match with the characteristics of the optical information recording system. For the code modulated recording signal, each edge position is adjusted in accordance with the edge interval information until just before in an edge position adjusting circuit 274 and edge position adjustment tables 275 and 276. The adjusted recording signal is supplied to the laser driver circuit 7, the laser intensity in the optical pickup 2 is modulated in accordance with the signal, and information is recorded onto the disc 1. The contents in the edge position adjustment tables 275 and 276 are changed by an edge position adjustment table switching circuit 278 in the case where as a result of the recording condition judging mode, it is decided that it is necessary to change the edge adjustment amount and the recording linear velocity changed.

In FIG. 27, with respect to the optical disc 1, spindle motor 109, optical pickup 2, amplifier 10, equalizing circuit 11, binarizing circuit 13, PLL circuit 14, demodulating circuit 17, modulating circuit 273, and laser driver 7, it is sufficient to use the component elements of the constructions and functions which are used in the conventional optical disc apparatus and their detailed descriptions are omitted.

The other component elements will now be described hereinbelow.

Figure 29:
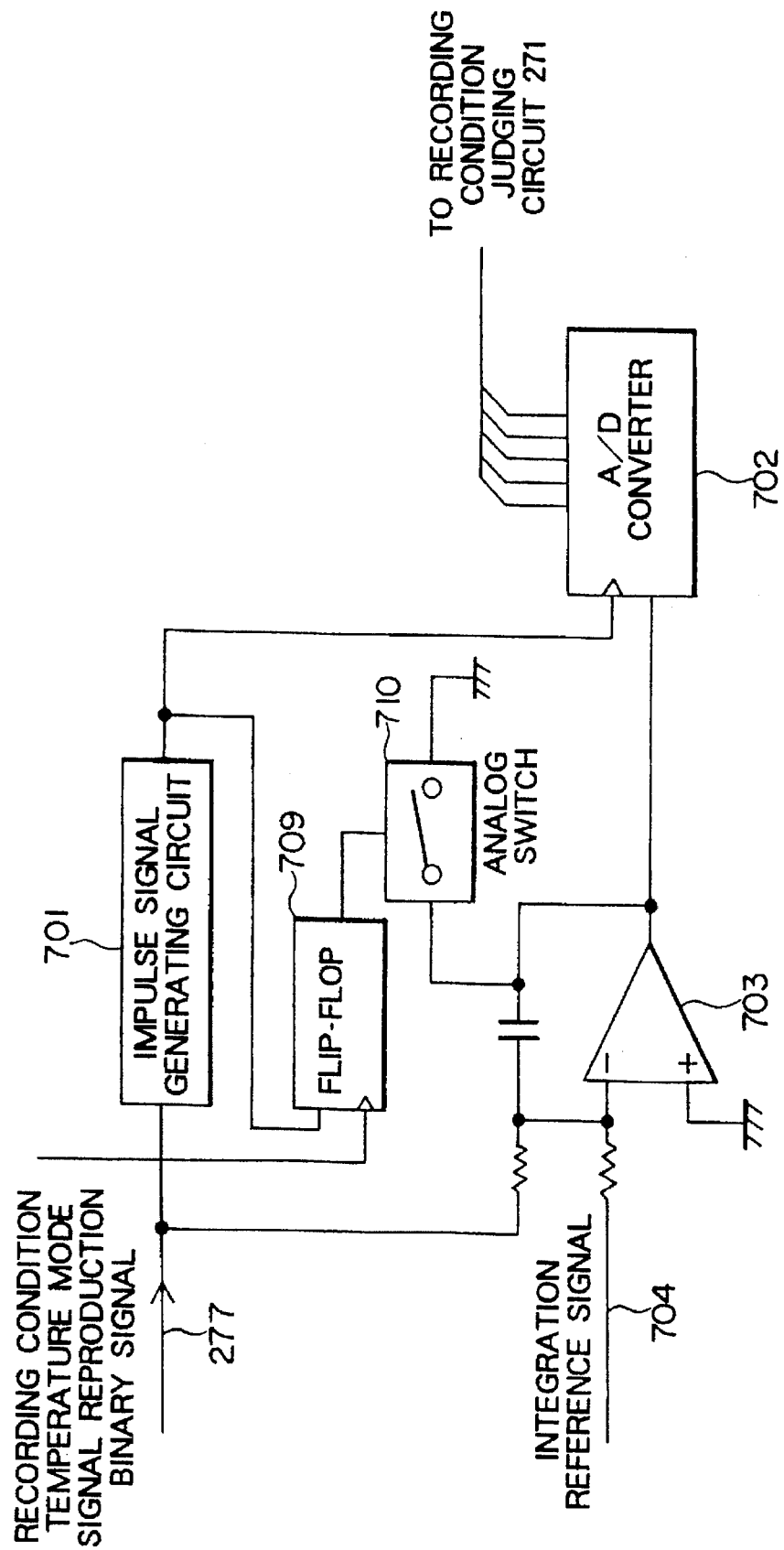
FIG. 29 is a diagram showing an example of a construction of an edge interval measuring circuit.

FIG. 29 is a diagram showing an example of a construction of the edge interval measuring circuit 270 in FIG. 27.

The reproduction binary signal 277 output from the binarizing circuit 13 is also supplied to an impulse signal generating circuit 701. The impulse signal generating circuit 701 generates an impulse-like signal waveform every time the polarity of the input signal changes. The output signal is supplied to the recording condition judging circuit 271 and an A/D converter 702 as a signal indicative of the polarity inversion timing.

On the other hand, the reproduction binary signal 277 is also supplied to an integrating circuit 703 which is constructed by an amplifier. An integration reference signal 704 indicative of the level of −(VH+VL)/2 is also supplied to the integrating circuit 703, in which the "H" level of the reproduction binary signal 7 is set to VH and the "L" level is set to VL. A signal indicative of a difference between the reproduction binary signal 277 and an integration reference signal is generated from the integrating circuit 703 and transferred to the A/D converter 702.

The signal from the controller is supplied to a flip-flop 709. A signal indicative of the timing for inversion of the polarity is also supplied as a clock signal to the flip-flop 709. An output of the flip-flop 709 is used to detect the first leading edge of the reproduction binary signal 277 from the start of the measurement of the edge interval and to switch an analog switch 710 for an interval measuring period of time and to make the integrating circuit 703 operative.

The A/D converter 702 uses the signal indicative of the polarity inversion timing as a timing clock to execute the digital converting operation, and converts an output signal of the integrating circuit 703 into a digital signal. The result of the conversion is outputted as a plurality inversion interval signal and is sent to the recording condition judging circuit 271. The converting precision of the A/D converter 702 is set so that its output value has enough precision as a pulse interval adjustment amount and also has a quantizing precision and bit number such as not to cause an overflow.

Figure 30:
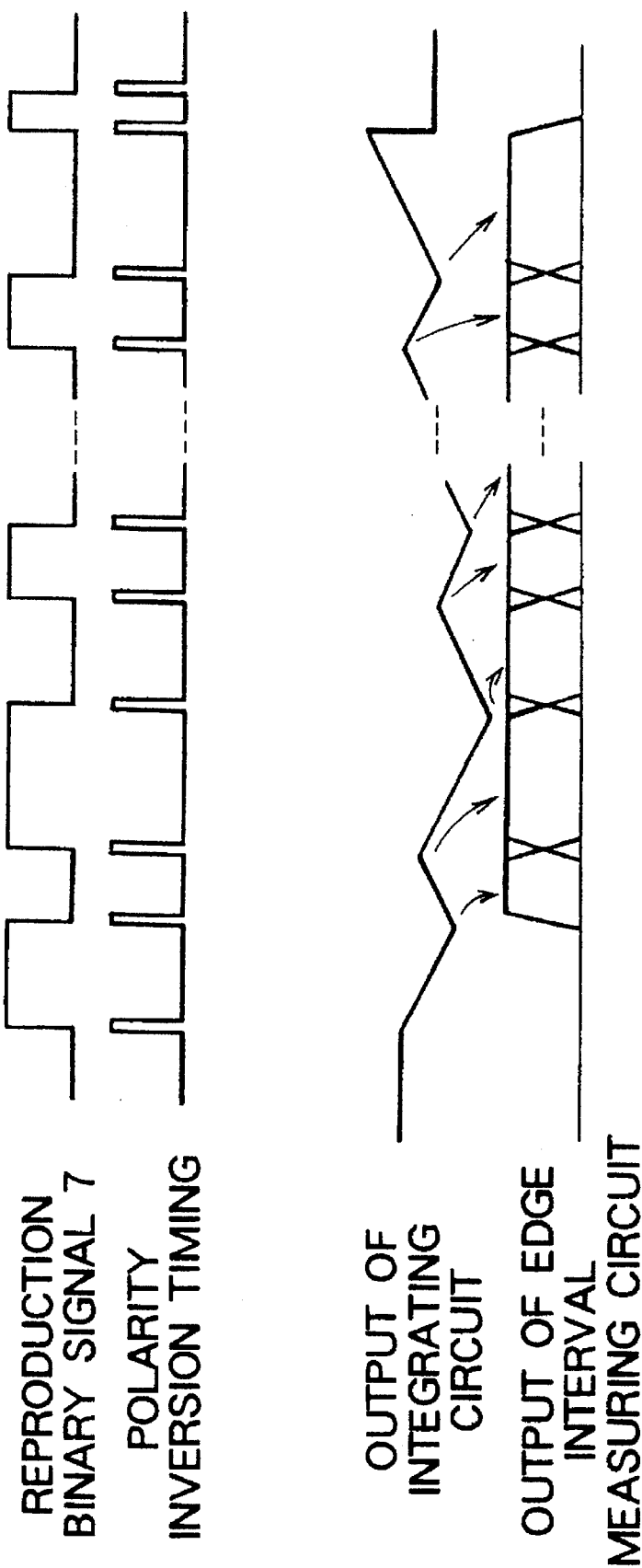
FIG. 30 is a diagram for explaining the operation of the edge interval measuring circuit.

The operation of the edge interval measuring circuit 270 in FIG. 29 will now be described with reference to FIG. 30. The reproduction binary signal 277 is an output signal of the waveform shaper 13 and is set to the "H" or "L" level in accordance with the presence or absence of the recording mark at the irradiation light spot position on the recording film surface. The reproduction binary signal 277 is transmitted through the impulse signal generating circuit 701 and becomes the signal indicative of the polarity inversion timing to generate the impulse waveform at the timing when the polarity changes. This signal is used as a trigger signal in the A/D converter 702.

The integrating circuit 703 calculates the pulse interval of the reproduction binary signal 277. Generally, assuming that an input signal of the integrating circuit 703 is set to X(t), the following output signal Y(t) is obtained.

$$Y(t) = \int_0^t X(\tau)d\tau + Y(0) \qquad \text{equation 20}$$

That is, an initial value Y(0) (output signal level at a time point when the edge interval measuring circuit starts the operation) of the output signal Y(t) is equal to 0 due to the operation of the analog switch 710. Therefore, by using the pulse intervals $P_r[1]$, $P_r[2]$, . . . of the reproduction signal 402 in FIG. 25 and the gap intervals $G_r[1]$, $G_r[2]$, . . . , the output signal level $V_0$ of the integrating circuit 703 is $$V_0 = A(-P_r[1] + G_r[1] - P_r[2] + G_r[2] + \ldots - P_r[i] + G_r[i]) \qquad \text{equation 21}$$

at a time point when the polarity of the reproduction binary signal 7 is inverted from "L" to "H".

The output signal level $V_0$ is $$V_0 = A(-P_r[1] + G_r[1] - P_r[2] + G_r[2] + \ldots - P_r[i]) \qquad \text{equation 22}$$

at a time point when the polarity of the reproduction binary signal 277 is inverted from "H" to "L".

"A" in the above equations denotes a constant which is decided by an amplification factor of the integrating circuit 703. That is, the output signal level at that time point indicates the result of an integration of the pulse intervals when the "H" level is expressed by a negative value and the "L" level is expressed by a positive value with regard to the pulse interval of the reproduction binary signal 277.

The A/D converter 702 converts the integration signal level at that time point into the digital value and supplies the result of the conversion to the recording condition judging circuit 271. Namely, its output is given by the following equation (23 or 24) in accordance with the equations 21 and 22.

$$B(-P_r[1]+G_r[1]-P_r[2]+G_r[2]+ \ldots -P_r[i]+G_r[i]) \quad \text{equation 23}$$

or $$B(-P_r[1]+G_r[1]-P_r[2]+G_r[2]+ \ldots -P_r[i]) \quad \text{equation 24}$$

(B is a constant)

Figure 31:
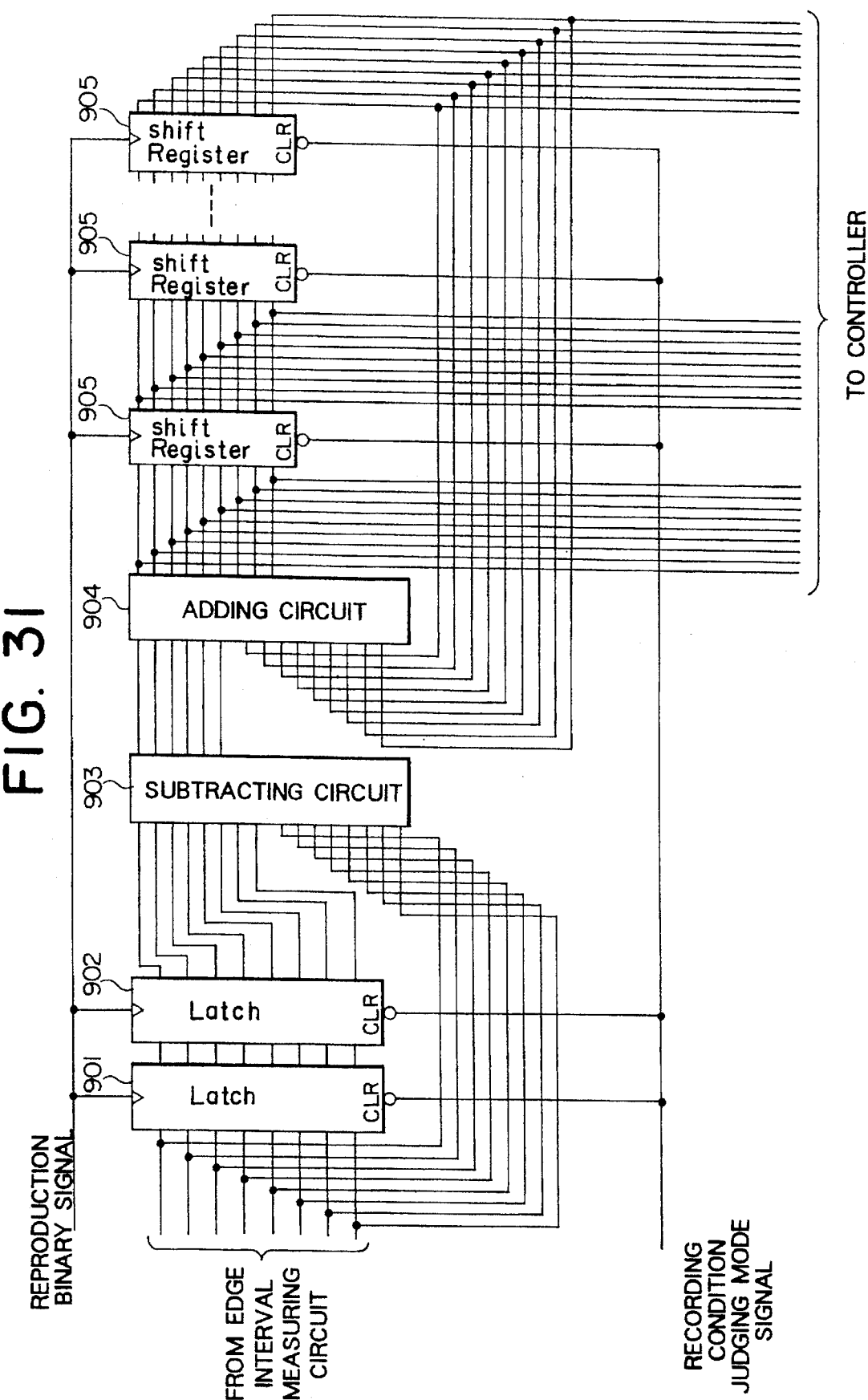
FIG. 31 is a diagram showing an example of a construction of the recording condition judging circuit.

FIG. 31 shows an example of a construction of a recording condition judging circuit 271 in FIG. 27.

The circuit 271 performs a calculation of each $P_r[i]-G_r[i]$ in FIG. 26 and a calculation to obtain the sum for its repetitive signal and transmits the result of each calculation to the controller 272.

Latch circuits 901 and 902 and a subtracting circuit 903 correspond to a section to obtain the value of each $B(P_r[i]-G_r[i])$ from the edge interval data that is expressed by the equations 23 and 24 and that is sent from the edge interval measuring circuit 270. The reproduction binary signal 277 is supplied to the latch circuit 901 as a signal for trigger timing. The edge interval data is sampled and held at the leading edge of the trigger timing signal. That is, when the reproduction binary signal 277 rises, the data which is expressed by the equation 23 is held and outputted. In the latch circuit 902, the data is delayed by a time of only one trigger.

The subtracting circuit 903 subtracts an output of the latch circuit 901 from an output of the latch circuit 902 of the edge interval data and generates the result of the subtraction. Since an output of the latch circuit 902 and an output of the latch circuit 901 denote the result that is expressed by the equation (23) and is deviated by only one trigger timing, $B(P_r[i]-G_r[i])$ is obtained by the output of the subtracting circuit 903.

An adding circuit 904 and a shift register 905 calculate the sum of each $B(P_r[i]-G_r[i])$ in the repetitive data. The number of stages of the shift registers 905 is designed so as to be equal to the number of pulses in one period of the recording signal shown in FIG. 25. An output line is outputted every stage and transferred to the controller. At a time point when the last reproduction signal 402 is read out, the output result at each stage of the shift register indicates the sum of $B(P_r[i]-G_r[i])$ in the repetitive data every i. Therefore, a check is made to see if the light beam intensity upon recording or the temperature of the recording medium have changed or not on the basis of a judgment reference shown in FIG. 26 by using the above result.

Figure 32:
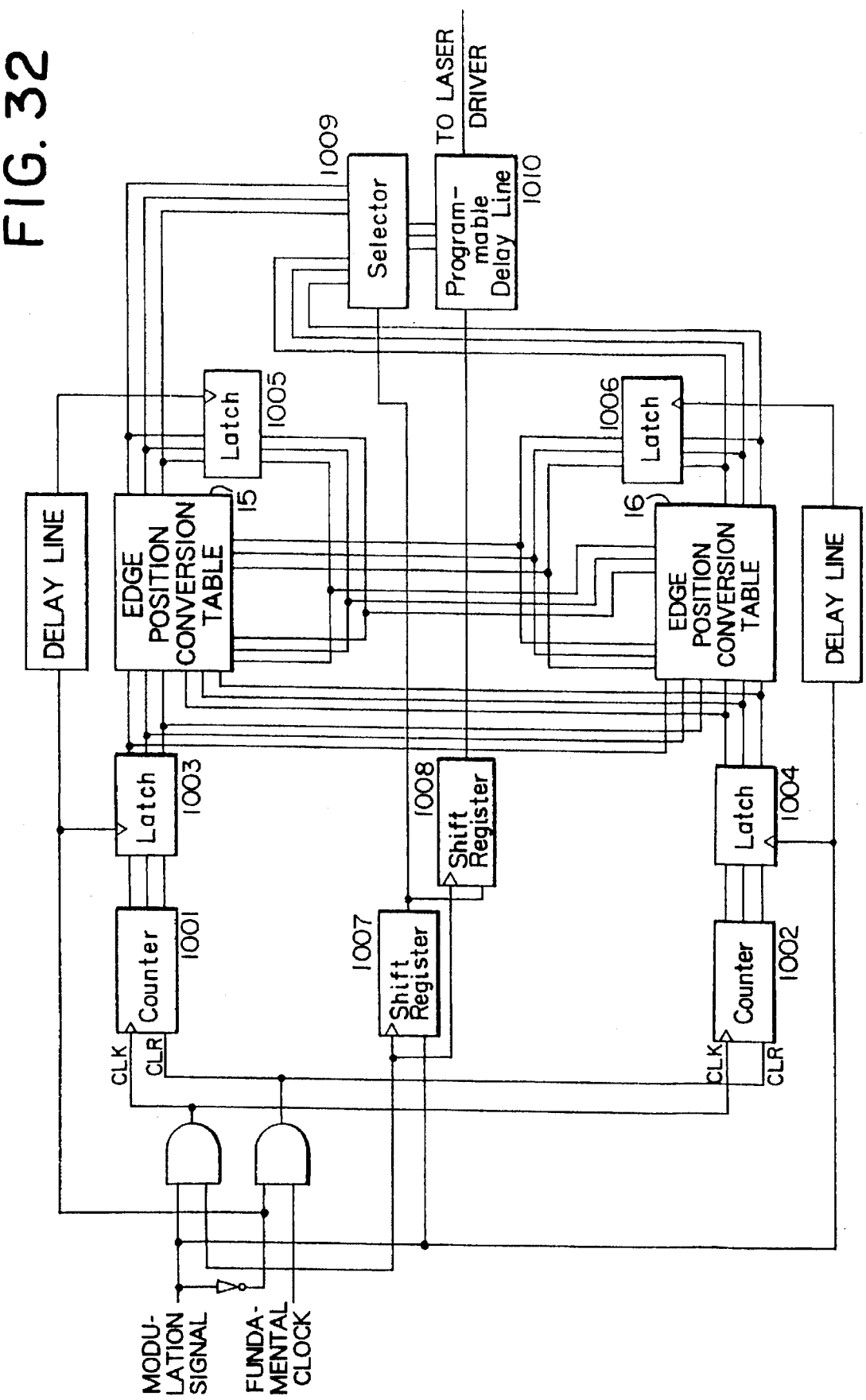
FIG. 32 is a diagram showing an example of a construction of an edge position adjusting circuit and an edge position adjustment table.

FIG. 32 shows an example of a construction of the edge position adjusting circuit 274 and edge position adjustment table 275 in FIG. 27.

In the above circuit, the functions Cf( ) and Ce( ) in the equations (18) and (19) are obtained by referring to the contents in edge position adjustment tables 15 and 16 which are constructed by memory devices such as RAMs or the like. That is, when F[i] is obtained, pulse/gap intervals L[i−1] and B[i−1] of the recording signal 301 as elements of the first and second parameters in the function Cr( ) and amounts indicative of edge position adjustment amounts F[i−1] and E[i−1] as results of the conversion just before F[i] is obtained are supplied by an address signal line which is inputted to the edge position adjustment table 275, so that F[i] is outputted as a function value from a data signal line. Similarly, when E[i] is obtained, the pulse/gap intervals B[i−1] and L[i] of the recording signal 301 as elements of the first and second parameters in the function Cd( ) and amounts indicative of the edge position adjustment amounts E[i−1] and F[i] as results of the conversion just before E[i] is obtained are inputted by the address signal line which is inputted to the edge position adjustment table 16, so that E[i] is outputted as its function value from the data signal line.

Counter circuits 1001 and 1002 detect to which number of fundamental clock intervals of the modulation signal the pulse/gap intervals of the signal transmitted from the modulating circuit 273 correspond, and are connected to address lines of the edge position adjustment tables. On the other hand, latch circuits 1003, 1004, 1005, and 1006 are used to adjust the timings of the edge position adjustment table 275 and each of the address signal lines which are inputted. Shift register circuits 1007 and 1008 are used to adjust the timings of the modulation signal and the edge position adjustment amounts. A selecting circuit 1009 alternately switches the edge position adjustment amounts on the leading side and trailing side. A programmable delay line circuit 1009 delays the edge position by a time corresponding to only the edge position adjustment amount, thereby adjusting the edge position. Therefore, an output signal of the programmable delay line circuit is supplied as an adjusted signal 302 to the laser driver circuit 7.

Figure 33:
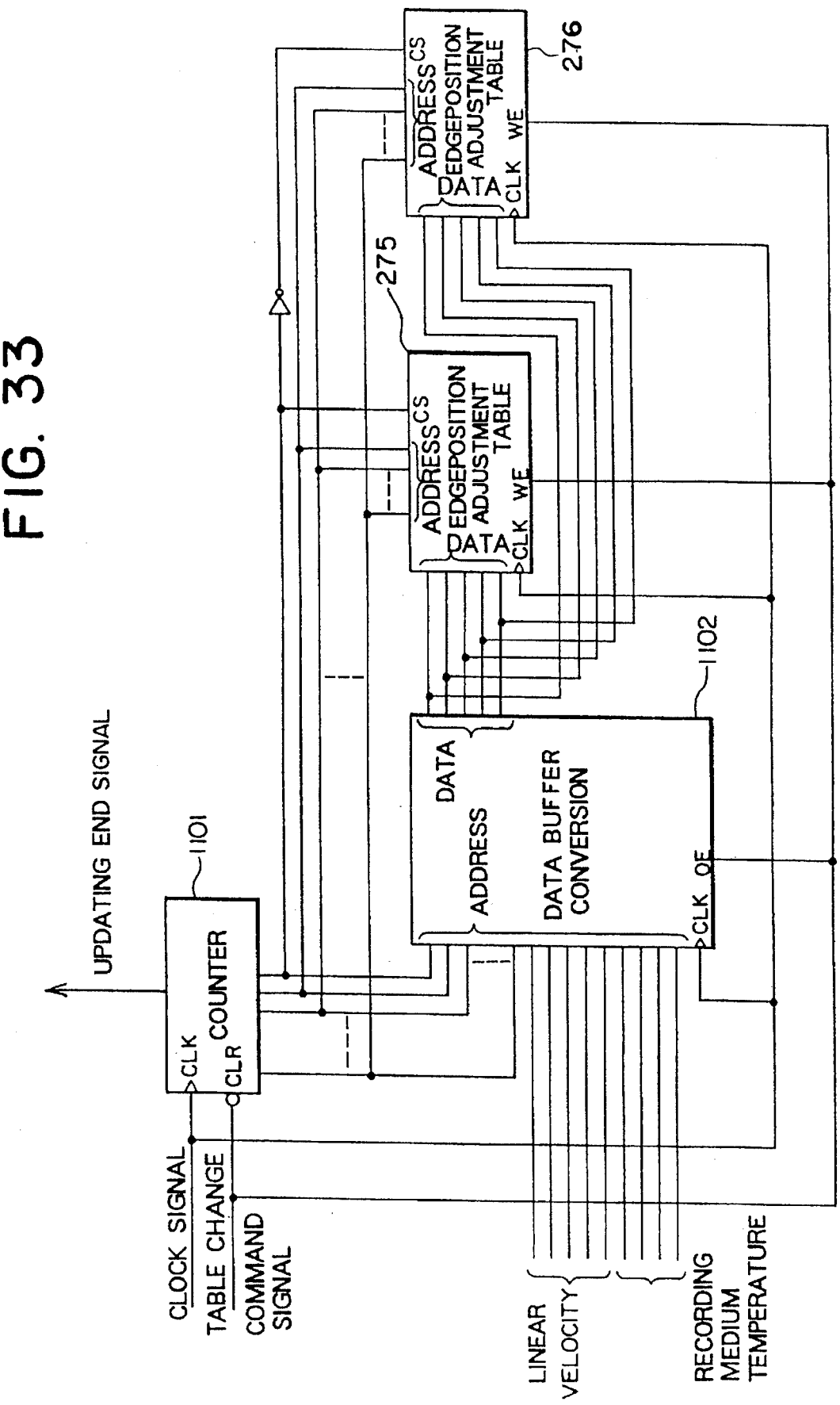
FIG. 33 is a diagram showing an example of a construction of an edge position adjustment table switching circuit.

FIG. 33 shows an example of a construction of the edge position adjustment table switching circuit 278 in FIG. 27.

The switching circuit 278 is constructed by: a data buffer 1102 which switches the contents in the edge position adjustment table in accordance with the temperature change of the recording medium and in which data of the edge position adjustment amount of every recording linear velocity in the use range and every temperature of the recording medium has been stored; and a circuit to control the switching operation of the data buffer.

As a result of the detection in the recording condition judging mode, when it is decided that it is necessary to change the contents of the edge position adjustment table, and in the case where the light spot moves and the linear velocity changes, a table change command signal is supplied from the controller 272 to a counter circuit 1101 and the changes of the contents in the edge position adjustment tables 275 and 276 are started. In the content changing operation, first, the moving velocity of the light spot on the recording medium and the temperature of the recording medium detected in the recording condition judging mode are supplied to the data buffer 1102 for conversion table, thereby deciding which one of the edge position adjustment tables stored in the data buffer 1102 for conversion table is selected. Each edge adjustment amount is transmitted from the data buffer 1102 for conversion table for every address number which is supplied from the counter circuit 1101 and is stored into each conversion table. One of the output signals of the counter circuit is used as a table switching signal to select either one of the edge adjustment amount tables 275 and 276. The remaining signals are used as address signals of the data buffer 1102 for conversion table and the edge position adjusting circuits 275 and 276.

An embodiment of the present invention has been described above. By using such a recording pulse edge adjustment amount calculating method, it is possible to eliminate the fluctuation amount of the edge position in the reproduction waveform due to the heat interference which occurs since the preceding recording pattern differs in the same recording pulse.

As special regions which are used to measure the recording conditions, regions at a plurality of positions on the inner rim side, outer rim side, and intermediate rim side of the disc are used. Such regions can be specifically provided or also be provided in general data recording regions. When recording data has already existed in the data recording regions in the latter case, other space regions are used or a process to temporarily save the information written in the data recording region into another location such as a memory in the controller or the like is executed in order to use such a data recording region.

The present invention can be applied to all information recording systems and recording media that operate according to principles based on heat. The present invention, particularly, relates to a control method of the recording conditions such as recording power and recording pulse interval, which are effective for a rewritable information recording apparatus and media. Particularly, the invention is a technique which is indispensable to assure the reliability of the recording data when a high heat diffusing effect is present and is sensitive to the recording conditions, namely, such that it appears as a difference of the recording characteristics due to a slight change in the recording power, environmental temperature, construction of the recording medium, characteristics of the recording apparatus, and the like. For instance, the present technique has practical use in, for example, a magnetooptic disc, an overwritable magnetooptic disc using an exchange coupling force, an overwritable optical disc using a phase change, and the like.

As described above, according to the present invention, the test recording is executed, the result of the test recording is arithmetically processed, the signal to record and control is obtained, and the edge position can be controlled to a desired position by the edge position adjusting circuit on the basis of such a signal.

According to the present signal recording and reproducing method, a fluctuation component regarding the edge position of a reproduction signal due to heat interference can be eliminated. On the other hand, in order to cope with the case where the light beam intensity upon recording or the temperature of the recording medium has changed, optimum recording conditions are always realized. The recording of a higher density using mark length recording can be easily realized without a severe adjustment upon manufacturing. Moreover, the reliability regarding the recording data is remarkably improved.

Embodiment 8

This embodiment relates to a method of realizing high density recording by changing a recording density in accordance with the disc position.

In a recording method such as an MCAV in which the rotational speed of the disc-shaped recording medium is set to a predetermined value and the recording is executed while changing the linear velocity in association with a change in recording radial position, in order to record and reproduce data with high reliability while assuring the capacity, it is desirable that magnitudes of phase jitters are equal over the inner and outer rims of the disc.

Phase jitter is mainly divided into two components such as phase oscillation which occurs due to random noise such as laser noise, amplifier noise, and the like of the disc medium in case of the foregoing edge recording, and an edge shift such that the edge position of the domain changes due to a difference in the patterns of the recording domain lengths and due to the heat interference between patterns. Since the medium of the magnetooptic disc has good heat conductivity, particularly, at the inner rim of slow linear velocity, the medium is influenced by the heat of the pulse recorded just before, so that a phase shift occurs in the position of the information domain to be recorded next, and increases larger than the phase oscillation. Thus, the information cannot be accurately reproduced.

Figure 39:
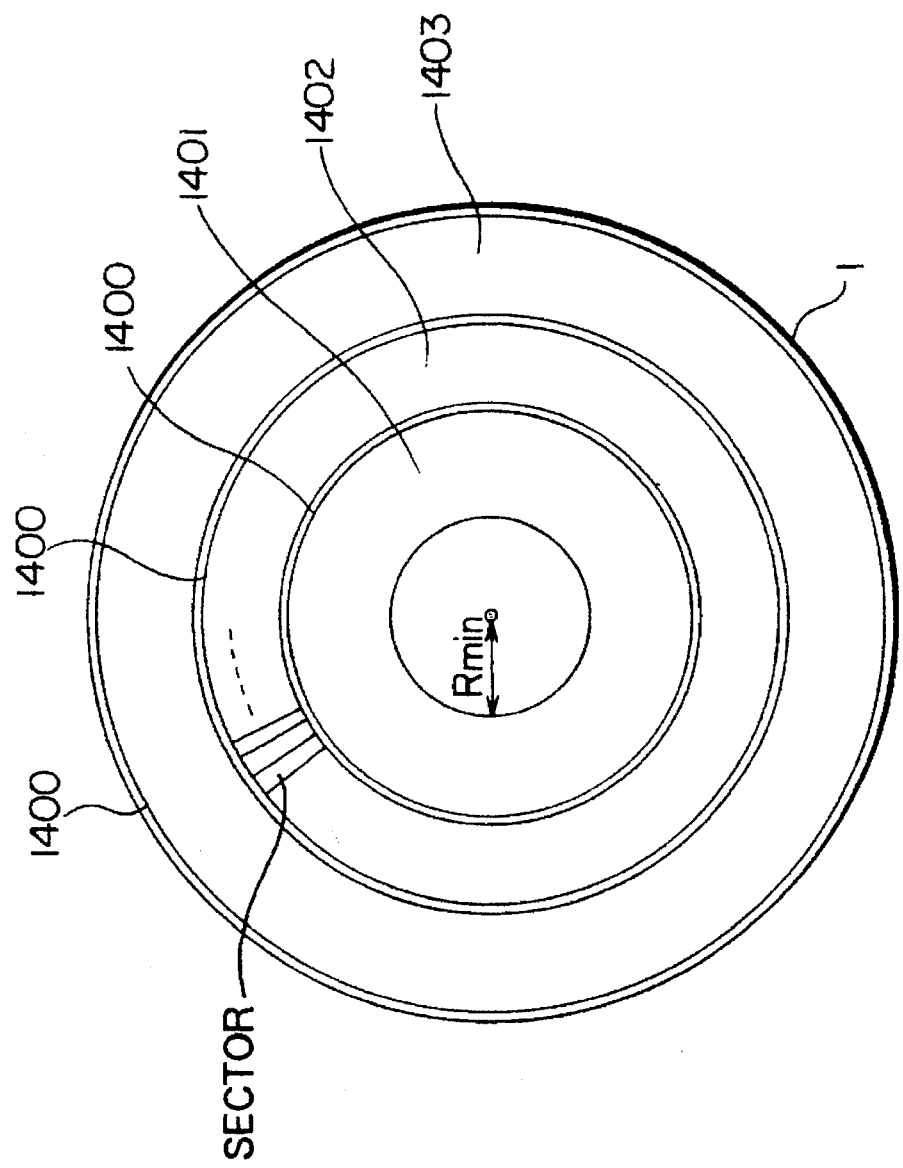
FIG. 39 is a plan view of an optical disc of the present invention.

Consideration will now be made with respect to a method of deciding the linear density in the case where an almost concentric track of the magnetooptic disc is divided into zones 1401, 1402, and 1403 comprising a plurality of tracks as shown in FIG. 39. The linear recording density in each zone is equal. It is now assumed that a radial position of the innermost rim zone of the magnetooptic disc is set to $R_{min}$, a linear density of the nth zone from the inside is set to $L_n$, the number of sectors of the innermost rim is set to $N_i$, the number of data bytes per sector is set to B, a track pitch is set to p, the number of tracks in the zone is set to M, and a use efficiency of data is set to $\eta$. In this instance, a capacity of the innermost rim zone is $$2\pi \times R_{min} \times L_i \times \eta = N_i \times B \qquad \text{equation 25}$$

In the nth zone, $$2\pi \times (R_{min} + n \times M \times p) \times L_n \times \eta = (N_i + n) \times B \qquad \text{equation 26}$$

A difference between the linear density of the nth zone and the linear density of the (n+1)th zone is $$L_n + 1 - L_n = n(B - 2\pi \times M \times p \times L_n \times \eta)/2\pi \times (R_{min} + M \times p) \times \eta \qquad \text{equation 27}$$

Therefore, the linear density can be controlled by the magnitude relation between B and $2\pi \times M \times p \times L_n \times \eta$. That is, according to the present invention, since the user wants to improve the linear density on the outer rim side rather than the inner rim side on which the degree of occurrence of the phase shift is large, the number M of tracks and the track pitch P are selected so as to obtain the following relation.

$$L_n < B/(2\pi \times M \times p \times \eta) \qquad \text{equation 28}$$

Figure 36:
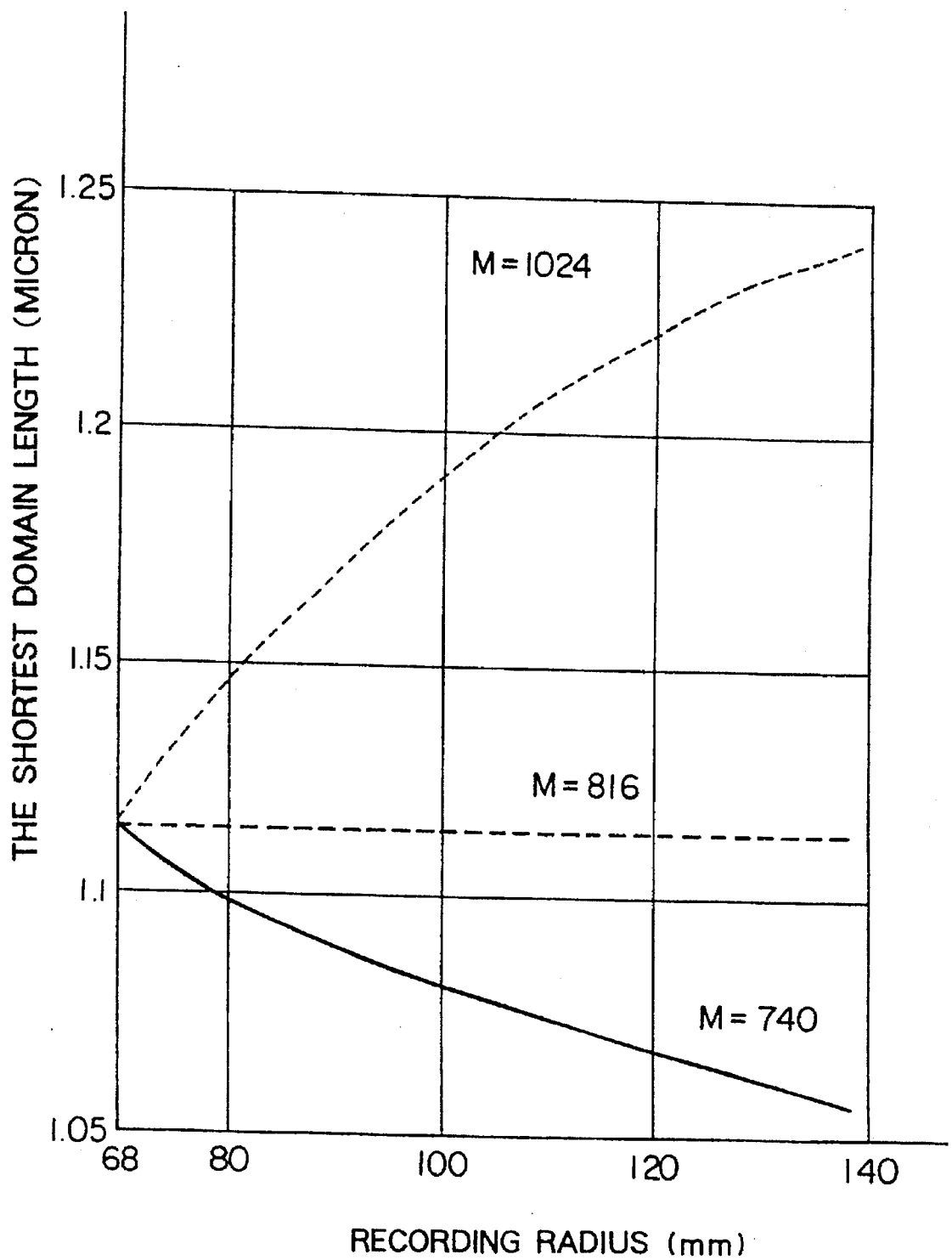
FIG. 36 is a graph showing the relation between the recording radius and the shortest domain length.

For example, by increasing by one sector/track every zone using the 2-7 modulation and assuming that a track pitch is equal to 1.6 μm and a recording radius of the innermost rim is equal to 67.9 mm and the number of inner rim sectors is equal to 52, a value changes as shown in FIG. 36 in dependence on the value of M. The shortest pit length of the 2-7 modulation is used as an axis of ordinate in place of the linear density. As the shortest pit length is small, the linear density increases.

Figure 34:
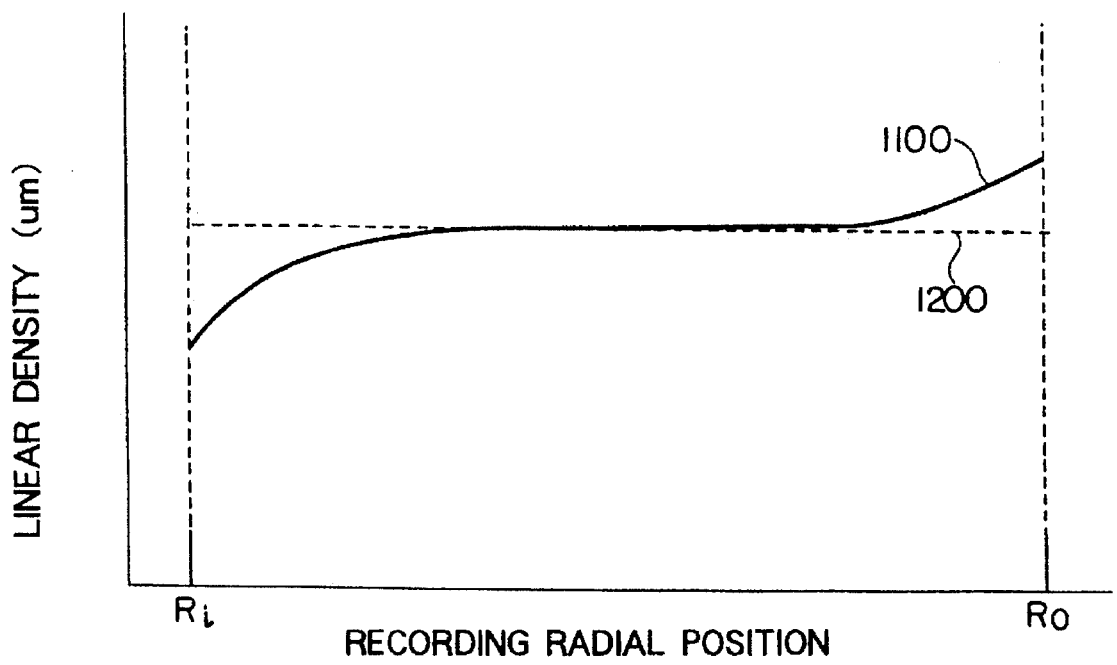
FIG. 34 is a graph showing the relation between the recording radial position and the linear density.
Figure 35:
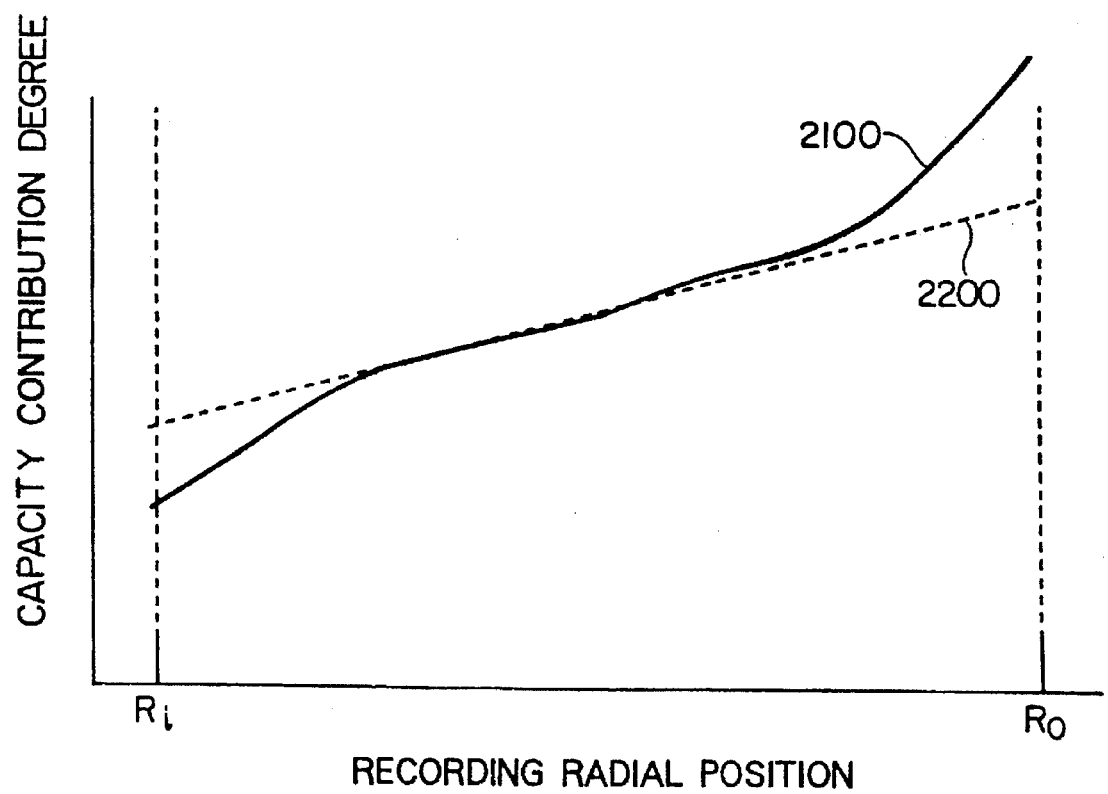
FIG. 35 is a graph showing the relation between the recording radius and the capacity contribution degree.

The results of the above examination will now be considered from a viewpoint of the recording capacity. As shown by a solid line 1100 in FIG. 34, when the linear density at the recording radial position is controlled so as to increase the linear density at the outer rim and to reduce the linear density at the inner rim, a contribution degree of the memory capacity is as shown by a solid line 2100 in FIG. 35. FIG. 35 shows a capacity per track in which the linear velocity is multiplied to the length of circumference for the radial position. A whole memory capacity is obtained by integrating such a capacity from the radius $R_i$ to $R_o$. In FIGS. 34 and 35, broken lines 1200 and 2200 show the case where the linear density is set to a predetermined value. In comparison with such a linear density, it will be understood from FIG. 35 that even when the linear density is reduced on the inner rim side, little influence is exerted on the total memory capacity because the capacity contribution degree on the inner rim side is small. Specifically, there is a method of changing a linear density for each of zones 1401, 1402, and 1403, shown in FIG. 39.

According to the invention, when an apparatus of a large memory capacity is realized by combining the edge recording using a medium of a magnetooptic disc and the MCAV method, the phase fluctuation amounts at the inner rim and the outer rim which indicate the reliability of the data can be almost equalized, and reduction of the memory capacity can be suppressed.

Embodiment 9

This embodiment relates to a construction in which a test recording region is provided on the disc in order to obtain control parameters which are necessary when the recording control is executed.

The present invention will now be described in detail by using a particular example. First, a schematic diagram showing a cross sectional structure of a disc is similar to FIG. 21. The manufactured disc has a five-layer structure which is obtained by sequentially laminating $SiN_x$ (75 nm) 51, TbFeCoNb (30 nm) 52, $SiN_x$ (20 nm) 53, Ni (30 nm) 54, and Al (30 nm) 55 onto a polycarbonate substrate 50. The disc is formed by a sputtering method. As conditions for sputtering, the air is exhausted to achieve a vacuum of $10^{-7}$ Torr.

After that, the silicon nitride film 51 is first formed on the disc substrate 50 of polycarbonate. Pure Si is used as a target and $Ar/N_2$ mixture gases are used as a discharge gas, and the sputtering is executed at a turn-on RF electric power density of 6.6 mW/cm² and a discharge gas pressure of 10 mTorr, thereby forming a film of a thickness of 75 nm. The TbFeCoNb magnetooptic recording film 52 is subsequently formed. A TbFeCoNb magnetooptic alloy is used as a target, a high purity Ar gas is used as a discharge gas, and the sputtering is executed at a turn-on RF electric power density of 4.4 mW/cm² and a discharge gas pressure of 5 mTorr, thereby forming a film of a thickness of 30 nm. The silicon nitride 53 is again formed.

Pure Si is used as a target, $Ar/N_2$ mixture gases are used as a discharge gas, and the sputtering is executed at a turn-on RF electric power of 6.6 mW/cm² and a discharge gas pressure of 10 mTorr, thereby forming a film of a thickness of 20 nm.

The Ni film 54 is subsequently formed. Namely, Ni is used as a target, a high purity Ar gas is used as a discharge gas, and the sputtering is executed at a turnon RF electric power density of 3.3 mW/cm² and a discharge gas pressure of 15 mTorr, thereby forming a film of a thickness of 30 nm. The Al film 55 is finally formed. That is, Al is used as a target, a high purity Ar gas is used as a discharge gas, and the sputtering is executed at a turn-on RF electric power density of 3.3 mW/cm² and a discharge gas pressure of 15 mTorr, thereby forming a film of a thickness of 30 nm.

The film surface of the magnetooptic disc manufactured as mentioned above is coated by an ultraviolet hardening type resin. Further, two discs are adhered by an adhesive agent, thereby forming a magnetooptic disc. The structure of the disc used here is merely shown as an example and the effect of the present invention is not limited by the structure of the disc. Although the above disc has a recording film of one layer, it is also effective for an optical disc which can be overwritten by using the exchange coupling function. Further, the present invention is also obviously effective to the recording and control of an optical disc using a phase change.

Figure 37:
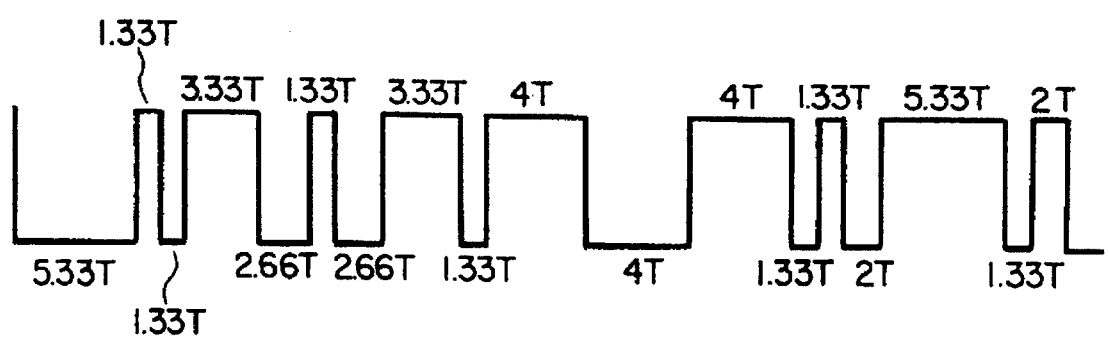
FIG. 37 is a waveform diagram of a test pattern.

FIG. 39 shows a plan view of the disc which has been manufactured as mentioned above. When the disc drive of such a disc is activated, data is recorded onto a test track 1400 for recording and control shown in FIG. 39 by a test pattern 21 shown in FIG. 37. The recorded data is reproduced. By measuring a change in amplitude of the reproduction signal, a fluctuation of the shape of the magnetic domain which is formed due to external factors is detected. On the basis of the result of the detection, user data is recorded into a recording region by controlling at least the laser power upon recording, recording pulse width, or shape of recording pulse.

FIG. 38 shows a schematic diagram of the shape of the recording magnetic domain obtained at that time. When the recording is executed without controlling, a tear-shaped magnetic domain is formed, the width is widened because the magnetic domain width is not controlled, or the magnetic domain length is increased or decreased because no control is performed, so that there is a case of generation of errors when the user tries to execute pit edge recording. A large factor of the occurrence of those changes is the fluctuation of the environmental temperature. Therefore, when the disc drive is activated or inserted, data is recorded onto the test track 1400 for the recording control by using the test pattern. By reproducing the recorded information, the environmental temperature is detected. The result of the detection is fed back when the recording conditions are set, and the recording is executed in consideration of the environmental condition. Even when the environmental temperature changes, consequently, the size of the domain which is recorded on the disc 1 is always constant.

Thus, high density recording can be performed. When there is a variation of recording sensitivity or the like among different media, the sizes of domains which are formed on the respective discs differ, so that errors are generated. When the present invention is used, the test pattern stored in the disc drive is previously recorded to the test track provided by the invention and the recorded data is reproduced, and the amplitude of signal obtained is measured, so that not only the variation among the discs but also the influence by the environmental temperature change can be compensated. The information for control by the test pattern is precisely collected when the disc drive is activated and inserted.

According to the embodiment, the recording region of the disc 1 is previously divided into a plurality of zones 1401, 1402, and 1403, the region 1400 to collect the information to execute the recording control is provided for every zone, and the test pattern is recorded and reproduced into/from such a region. Thus, a difference of the recording magnetic domain sizes which occurs due to a variation of the environmental temperature, a variation among media, or the like can be corrected. Since the fluctuation amount differs in dependence on the disc position, by providing the test track at least for every zone 1401, 1402, and 1403, such a problem can be solved. Consequently, superhigh density optical recording can be realized. By providing a test region in every track, in order to prevent a deterioration of the medium of the test track which can more precisely perform the correction, it is effective not to overlappingly perform the test recording to the same location as the location at which the test recording has already been executed or not to continuously perform the test recording, thereby preventing the number of times rewriting the test track from being one-sided.

When the test recording is executed on the test tracks 1400 of the inner rim, middle rim, and outer rim of the disc as mentioned above, the recording and reproducing characteristics in each of the zones 1401, 1402 and 1403 are previously stored in memory means, and the recording and reproducing characteristics of the disc of the zone in which the test recording is not executed can be extrapolated.

We claim:

1. An optical disc apparatus comprising:

a light source for irradiating a light beam to an optical disc;

an encoder for converting an information signal to be recorded into a code train;

light source driving means for modulating the light beam in accordance with said code train, for irradiating the light beam as a light pulse train to the optical disc, and for recording the code train as recording marks by at least one of a heat function and heat interference;

a detector for photoelectrically converting the light reflected from said optical disc, thereby obtaining an electric signal waveform;

waveform processing means for processing said electric signal waveform;

pulse forming means for obtaining a pulse signal from a signal from said waveform processing means;

a discriminator for detecting the code train recorded on the optical disc from said pulse signal;

a decoder for decoding the code train from said discriminator into the information signal;

trial writing means for modulating the light beam by a special test signal and for forming a test pattern onto the optical disc;

means for reproducing the test pattern and for evaluating output waveforms of the test pattern thus reproduced; and control means for controlling the modulation of the light beam on the basis of results obtained in the evaluation;

wherein said light source driving means irradiates light beams of at least three power levels, including a first power level ($P_w$) for recording said recording marks, a second power level ($P_{as}$) just before the recording of said recording marks by said first power level, and a third power level ($P_r$) just after the recording of said recording marks by said first power level, and wherein said control means controls a value of said second power level.

2. An optical disc apparatus according to claim 1, wherein the test pattern formed by the trial writing means is encoded by the encoder and recorded on the optical disc.

3. An optical disc apparatus according to claim 1, further comprising a change-over switch for supplying the electric signal waveform into the pulse forming means without passing through the waveform processing means.

4. An optical disc apparatus according to claim 1, wherein the light pulse train comprises a plurality of units, one unit forming one of the recording marks comprising a head pulse and a subsequent pulse train whose time width differs from that of said head pulse.

$P_w > P_{as} > P_r$.

5. An optical disc apparatus according to claim 4, wherein at least one of the pulse widths and the pulse intervals of the subsequent pulse train are equal.

6. An optical disc apparatus according to claim 1, further comprising means for controlling edge positions of the pulses constituting the light pulse train on the basis of at least one of a temperature of the optical disc, a recording linear velocity to the optical disc, and the recording mark based on the information signal to be recorded.

7. An optical disc apparatus according to claim 6, further comprising table means for storing information in tables to control the edge positions.

8. An optical disc apparatus according to claim 1, wherein the result of the comparison reflects at least one element which is selected from the width, length, and mark interval of the recording mark.

9. An optical disc apparatus according to claim 1, wherein a recording clock is used to control at least one of the pulse width and the pulse interval of the pulses constructing said light pulse train, and is set to a value which is a fraction of an integer of or is integer times as large as a detection window width which is formed by said recording clock.

10. An optical disc apparatus according to claim 1, wherein said first power level is larger than said second power level, and said second power level is larger than said third power level.

11. An optical information recording and reproducing method comprising the steps of:

converting an information signal to be recorded into a code train;

modulating a light beam into a light pulse train in accordance with said code train;

irradiating the light pulse train onto a recording medium;

recording the code train as recording marks by at least one of a heat function and heat interference of the light pulse train;

photoelectrically converting the light from the recording medium to thereby obtain an electric signal waveform;

processing said electric signal waveform;

converting a signal obtained by processing said electric signal waveform into a pulse signal;

detecting the code train recorded on the recording medium from the pulse signal;

decoding the detected code train to the information signal;

modulating the light beam by a special test signal;

forming a test pattern on the recording medium;

reproducing the test pattern; and evaluating output waveforms of the reproduced test pattern;

wherein a unit of the light pulse train for forming one of said recording marks has pulses of power levels equal to or larger than a first level $P_w$, wherein a light pulse train which does not form said recording marks has pulses of power level equal to or smaller than a second value $P_{as}$, wherein said light pulse train for forming said recording marks has a region of a power level which is equal to or smaller than a third value $P_r$ that is at least one of before and after said light pulse train for forming said recording marks, wherein $P_w > P_{as} > P_r$, and wherein the power level $P_{as}$ is controlled on the basis of results obtained in the evaluation, independently of the power levels $P_w$ and $P_r$.

12. An optical information recording and reproducing method according to claim 11, wherein each time the recording medium is exchanged, the light beam is modulated by the special test signal to thereby form the test pattern onto the recording medium, the test pattern is produced and compared with the test signal, and at least one of the power level, pulse width, and pulse interval of the pulses forming the light pulse train is controlled on the basis of the result of the comparison.

13. An optical information recording and reproducing method, comprising the steps of:

converting an information signal to be recorded into a code train;

modulating a light beam into a light pulse train in accordance with said code train;

irradiating the light pulse train onto a recording medium; and recording the code train as recording marks by at least one of a heat function and heat interference of the light pulse train, wherein said light pulse train includes recording pulses corresponding to said recording marks and auxiliary pulses which do not correspond to said recording marks, wherein power levels of said recording pulses are set higher than power levels of said auxiliary pulses, and wherein shapes of said recording marks are controlled by controlling the power levels of said auxiliary pulses which are applied just before application of said recording pulses.

14. An optical information recording and reproducing method according to claim 13, further comprising, before said converting step, the steps of:

recording a predetermined test pattern;

reproducing said test pattern; and evaluating output waveforms of said test pattern thus reproduced, wherein said step of recording the code train as recording marks comprises a step of controlling the power levels of said auxiliary pulses on the basis of results obtained in the step of evaluating.

15. An optical information recording and reproducing method according to claim 13, wherein said recording pulses have at least a first power level $P_{w1}$ and a second power level $P_{w2}$, and said auxiliary pulses have at least one pulse of a third power level $P_{as}$ just before said recording pulses and at least one pulse of a fourth power level $P_r$ just after said recording pulses, wherein $P_{w1}, P_{w2} > P_{as} > P_r$.

16. An optical information recording and reproducing method, comprising the steps of:

converting an information signal to be recorded into a code train;

modulating a light beam into a light pulse train in accordance with said code train;

irradiating the light pulse train onto a recording medium;

recording the code train as recording marks by at least one of a heat function and heat interference of the light pulse train, wherein said light pulse train includes recording pulses corresponding to said recording marks and auxiliary pulses which are irradiated before said recording pulses and used for preheating said recording medium, and wherein power levels of said auxiliary pulses are controlled; and wherein said step of recording the code train as recording marks comprises a step of providing a period having a power level lower than the power levels of said auxiliary pulses.

17. An optical information recording and reproducing method according to claim 16, further comprising, before said converting step, the steps of:

recording a predetermined test pattern;

reproducing said test pattern; and evaluating output waveforms of said test pattern reproduced, wherein said step of recording the code train as recording marks comprises a step of controlling the power levels of said auxiliary pulses on the basis of results obtained in the step of evaluating.

* * * * *